(12) United States Patent
Powell et al.

(10) Patent No.: US 9,191,464 B2
(45) Date of Patent: Nov. 17, 2015

(54) METHOD AND APPARATUS FOR VIRTUALIZATION OF A FILE SYSTEM, DATA STORAGE SYSTEM FOR VIRTUALIZATION OF A FILE SYSTEM, AND FILE SERVER FOR USE IN A DATA STORAGE SYSTEM

(71) Applicant: Hitachi Data Systems Engineering UK Limited, Berkshire (GB)

(72) Inventors: Richard Powell, Maidenhead (GB);
James Gibbs, Wokingham (GB);
Timothy Warner, Farnborough (GB);
Zahra Tabaaloute, Southhampton (GB)

(73) Assignee: Hitachi Data Systems Engineering UK Limited, Berkshire (GB)

( * ) Notice: Subject to any disclaimer, the term of this patent is extended or adjusted under 35 U.S.C. 154(b) by 0 days.

(21) Appl. No.: 14/447,803

(22) Filed: Jul. 31, 2014

(65) Prior Publication Data
US 2015/0012571 A1    Jan. 8, 2015

Related U.S. Application Data

(63) Continuation-in-part of application No. 14/373,060, filed as application No. PCT/EP2013/063910 on Jul. 2, 2013.

(51) Int. Cl.
*G06F 17/30* (2006.01)
*H04L 29/06* (2006.01)

(52) U.S. Cl.
CPC .......... *H04L 67/42* (2013.01); *G06F 17/30233* (2013.01)

(58) Field of Classification Search
CPC .................................................. G06F 17/30233
See application file for complete search history.

(56) References Cited

U.S. PATENT DOCUMENTS 6,356,915 B1 *  3/2002  Chtchetkine et al. ......... 707/823
6,938,039 B1    8/2005  Bober et al.
(Continued)

FOREIGN PATENT DOCUMENTS

EP    0 926 585 A2    6/1999
EP    1 209 556 A2    5/2002
(Continued)

OTHER PUBLICATIONS

Urbano, Randy, Oracle Database—Advanced Replication 10g Release 1 (10.1), Part No. B10732-01; Dec. 2003; 342 pages.
(Continued)

*Primary Examiner* — Mohammad S Rostami
(74) *Attorney, Agent, or Firm* — Mattingly & Malur, PC

(57) ABSTRACT

The method and an apparatus provides a virtualized file system enabling indirect access to a second file system in a data storage system comprising a plurality of client computers 100 and a second file system managing unit 410 for managing the second file system and enabling client access to the second file system, the method comprising interconnecting a first file system managing unit 310 between the plurality of client computers 100 and the second file system managing unit 410, creating a directory /root in a first file system managed by the first file system managing unit 310, a directory /root of the second file system with the directory /root of the first file system, enabling on-demand virtualization of the second file system by the first file system managing unit 310 based on client requests received from the client computers 100 at the first file system managing unit 310.

26 Claims, 33 Drawing Sheets

(56) References Cited

U.S. PATENT DOCUMENTS

| | | |
|---|---|---|
| 6,959,310 B2 | 10/2005 | Eshel et al. |
| 7,330,950 B2 | 2/2008 | Matsunami et al. |
| 7,457,822 B1 | 11/2008 | Barrall et al. |
| 7,587,436 B2 | 9/2009 | Agetsuma et al. |
| 7,603,397 B1 | 10/2009 | Hagerstrom et al. |
| 2003/0182525 A1 | 9/2003 | O'Connell et al. |
| 2006/0129537 A1 | 6/2006 | Torii et al. |
| 2006/0212481 A1 | 9/2006 | Stacey et al. |
| 2008/0028169 A1 | 1/2008 | Kaplan et al. |
| 2009/0006888 A1 | 1/2009 | Bernhard et al. |
| 2009/0044046 A1 | 2/2009 | Yamasaki |
| 2009/0112947 A1 | 4/2009 | Bourbonnais et al. |
| 2009/0248762 A1 | 10/2009 | Prahlad et al. |
| 2009/0271451 A1 | 10/2009 | Young et al. |
| 2009/0313311 A1 | 12/2009 | Hoffmann et al. |
| 2011/0040812 A1* | 2/2011 | Phillips .................. 707/822 |
| 2011/0078112 A1 | 3/2011 | Takata et al. |
| 2011/0252071 A1* | 10/2011 | Cidon .................. 707/802 |
| 2012/0150799 A1 | 6/2012 | Matsuzawa |
| 2012/0254123 A1* | 10/2012 | Ferguson et al. ........ 707/649 |
| 2013/0297662 A1* | 11/2013 | Sharma et al. ........... 707/827 |
| 2014/0188826 A1* | 7/2014 | Gjaltema et al. ........ 707/696 |

FOREIGN PATENT DOCUMENTS

| | | |
|---|---|---|
| EP | 2178005 A2 | 4/2010 |
| EP | 2 219 106 A2 | 8/2010 |
| JP | 2005316708 A1 | 11/2005 |
| JP | 2008040699 A2 | 2/2008 |

OTHER PUBLICATIONS

European Search Report received in corresponding European Application No. 14176056 dated Aug. 6, 2014.

Anonymous: "Indir(1)—Linux man page", Dec. 6, 2007, XP002727655.

Anonymous: "CP(1)", Dec. 12, 2000, XP002727656.

Elwaywitac et al.: "Recursively symlink", Oct. 28, 2012, XP002727657.

European Search Report received in corresponding European Application No. 14176065 dated Oct. 23, 2014.

International Search Report received in International Application No. PCT/EP2013/063910 dated Jan. 3, 2014.

* cited by examiner

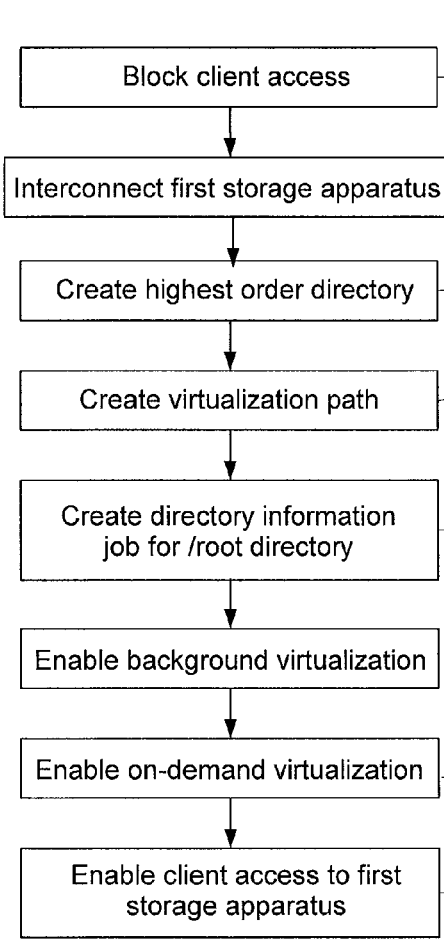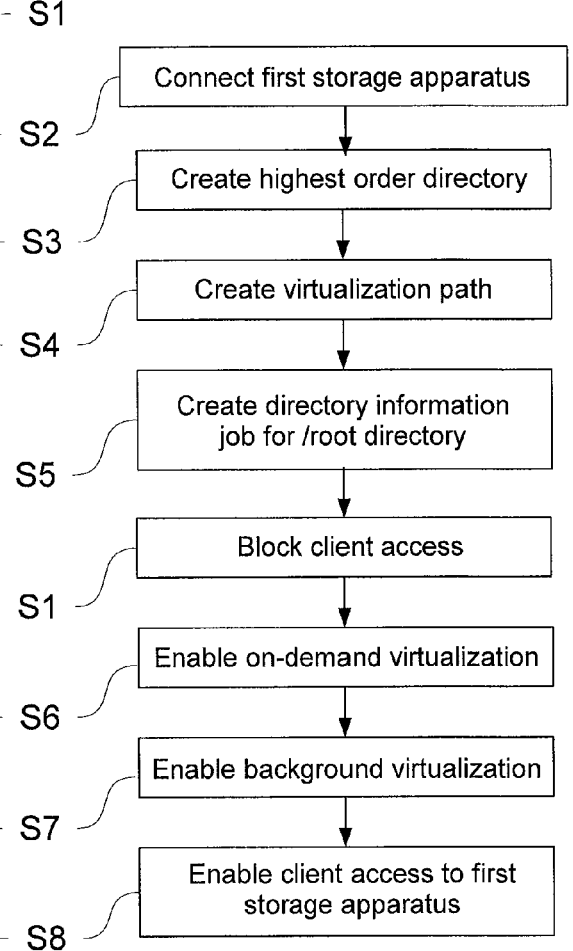
Fig. 6A
Fig. 6B

341

| Name | Object type | Object ID | Virtualization status | Object status |
|---|---|---|---|---|
| /root | directory | 001 | virtualized | incomplete |
| /dir1 | directory | 002 | needs virtualization | incomplete |
| /dir2 | directory | 003 | needs virtualization | incomplete |
| file1 | file | 004 | needs virtualization | needs migration |
| file2 | file | 005 | needs virtualization | needs migration |

Fig. 9
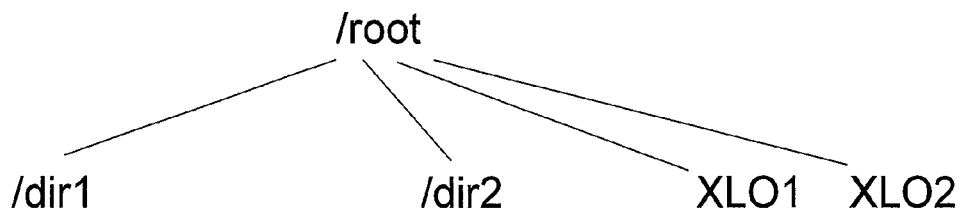
Fig. 10
341
| Name | Object type | Object ID | Virtualization status | Object status |
|------|-------------|-----------|----------------------|---------------|
| /root | directory | 001 | virtualized | complete |
| /dir1 | directory | 002 | virtualized | incomplete |
| /dir2 | directory | 003 | virtualized | incomplete |
| file1 | file | 004 | virtualized | needs migration |
| file2 | file | 005 | virtualized | needs migration |
Fig.11
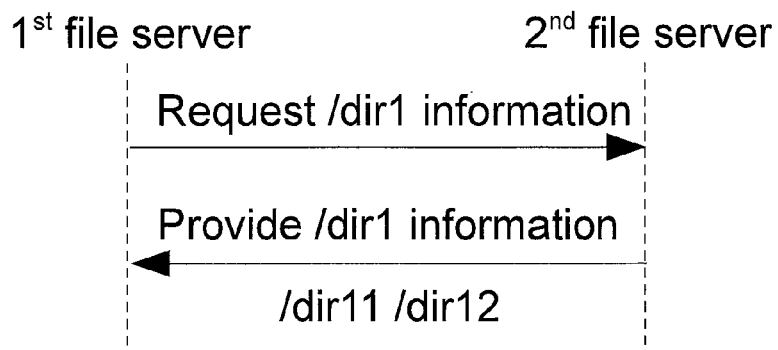

| Name | Object type | Object ID | Virtualization status | Object status |
|---|---|---|---|---|
| /root | directory | 001 | virtualized | complete |
| /dir1 | directory | 002 | virtualized | incomplete |
| /dir2 | directory | 003 | virtualized | incomplete |
| file1 | file | 004 | virtualized | needs migration |
| file2 | file | 005 | virtualized | needs migration |
| /dir11 | directory | 006 | needs virtualization | incomplete |
| /dir12 | directory | 007 | needs virtualization | incomplete |
|  |  |  |  |  |
|  |  |  |  |  |
|  |  |  |  |  |

Fig. 13

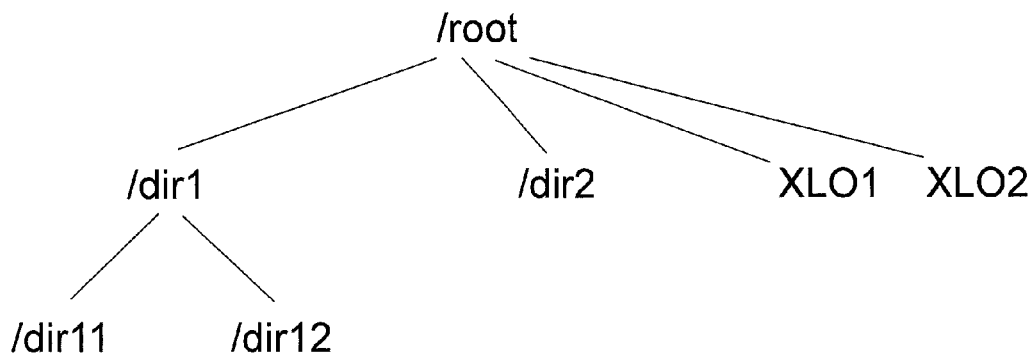

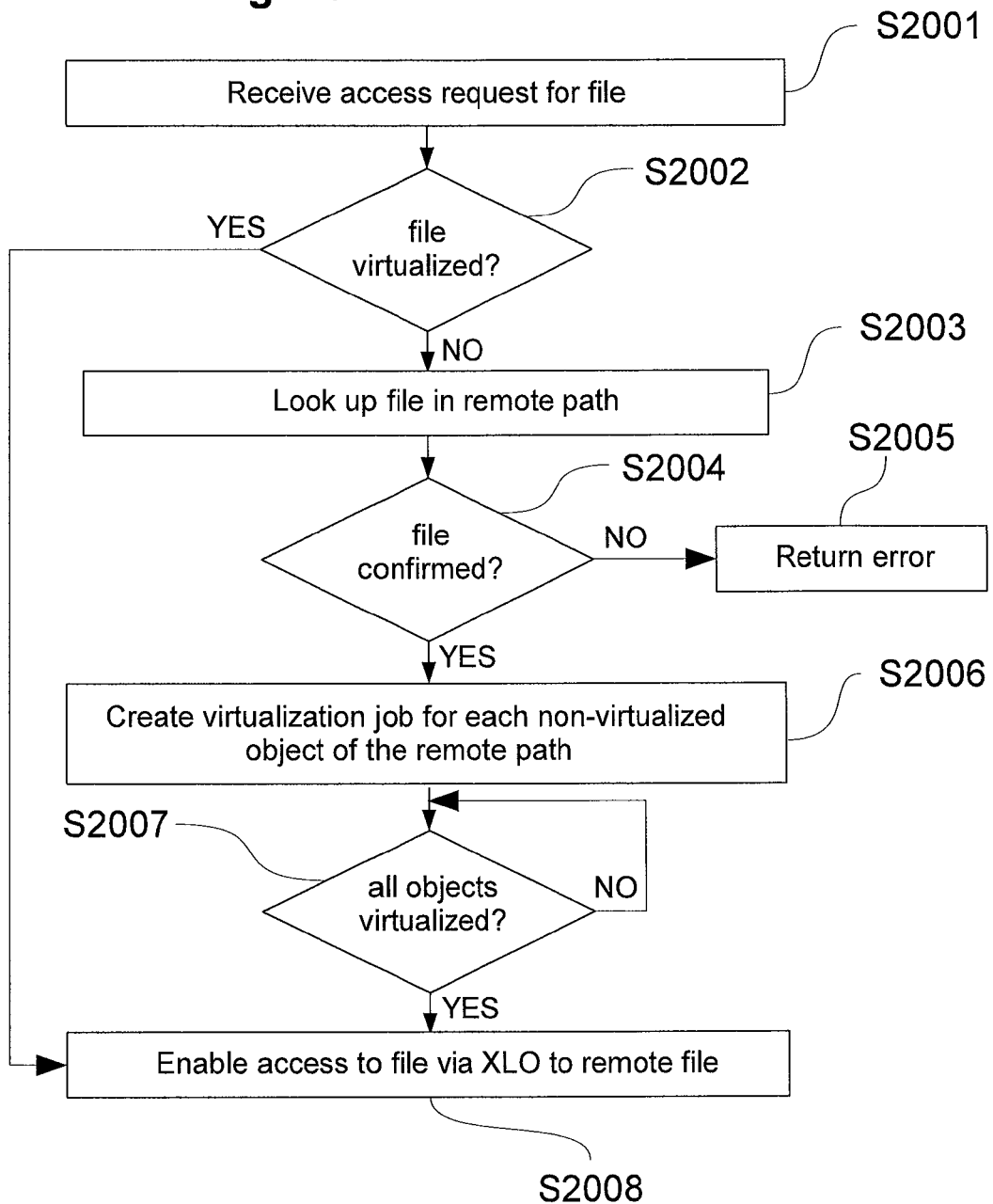

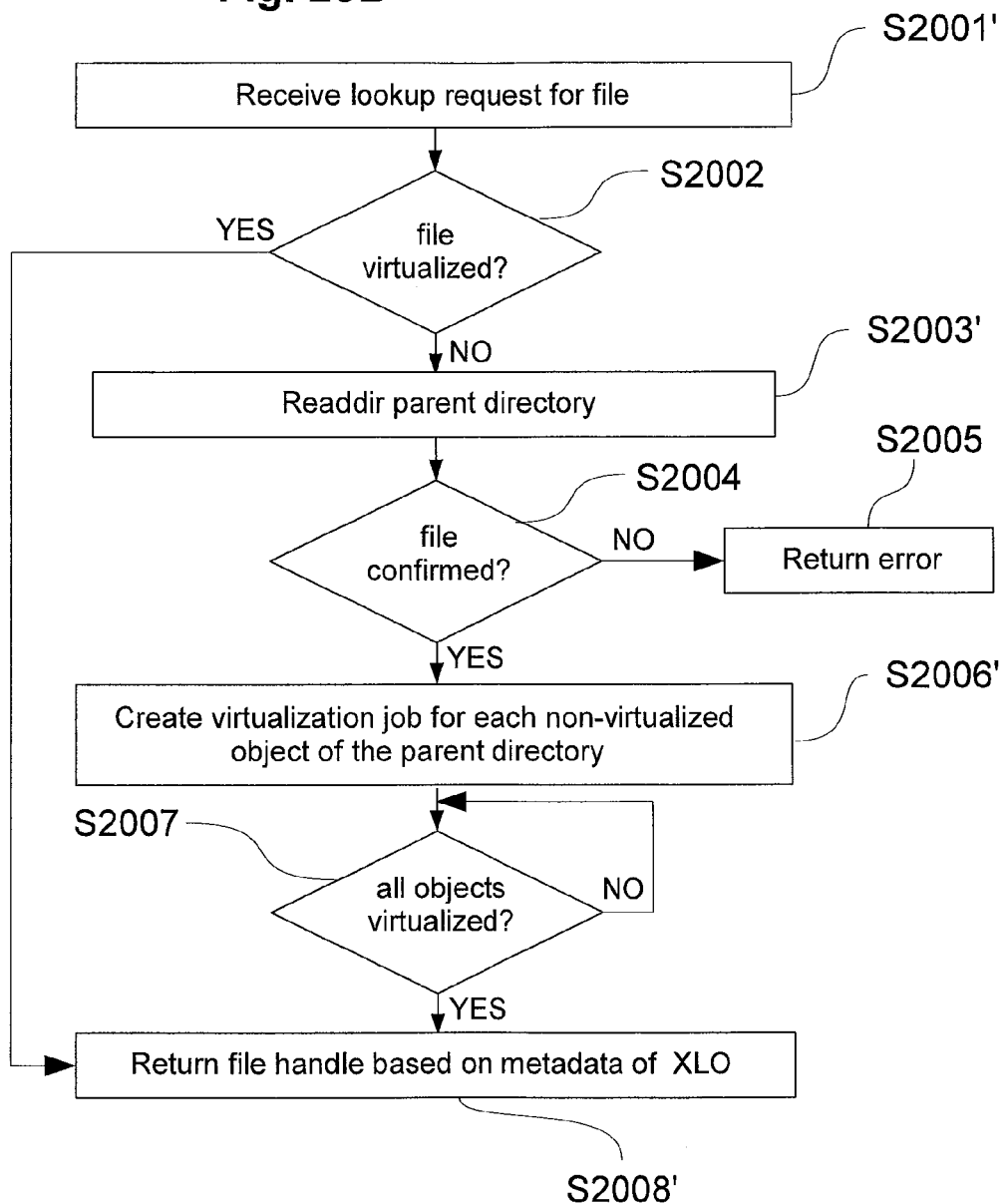

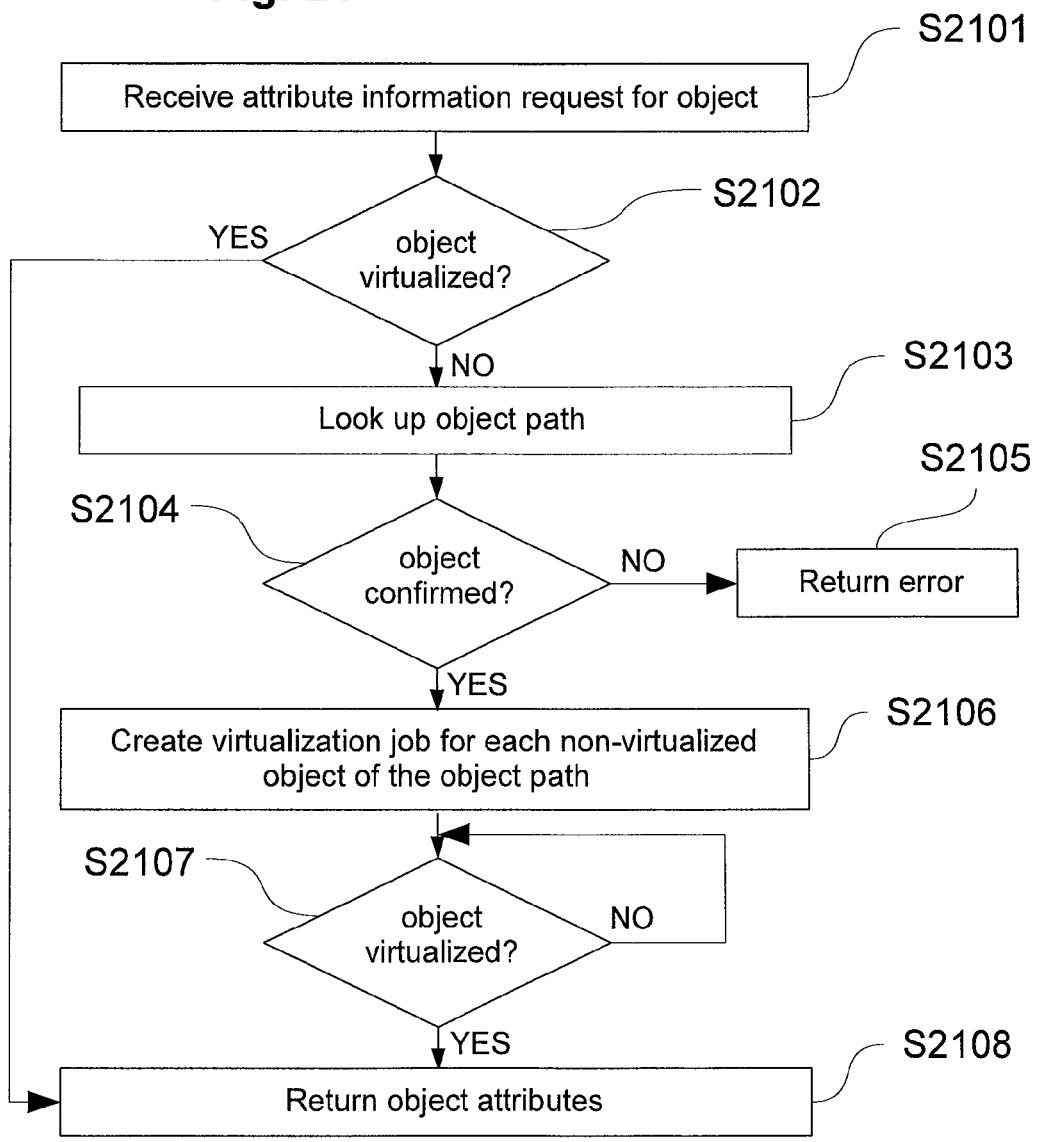

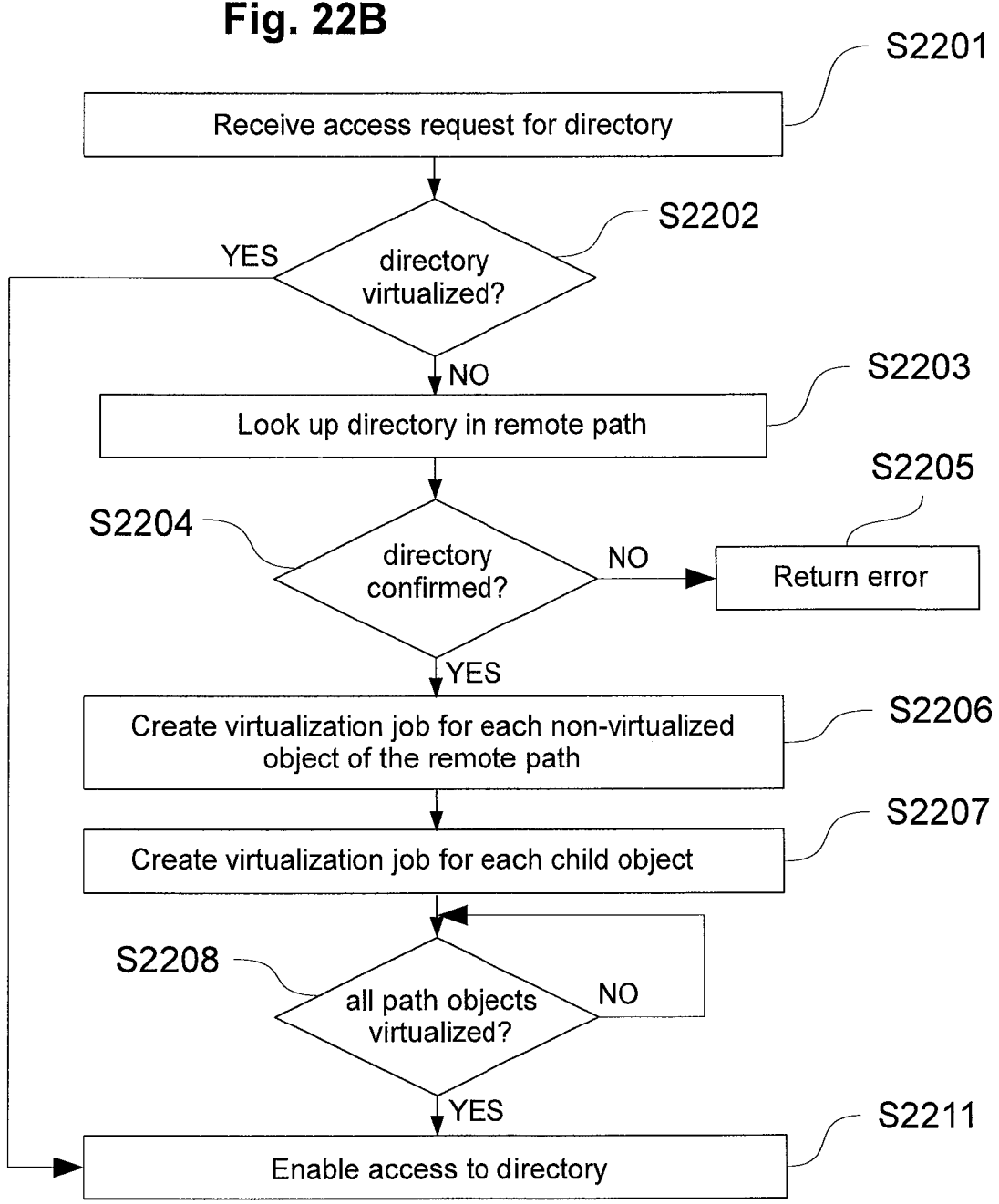

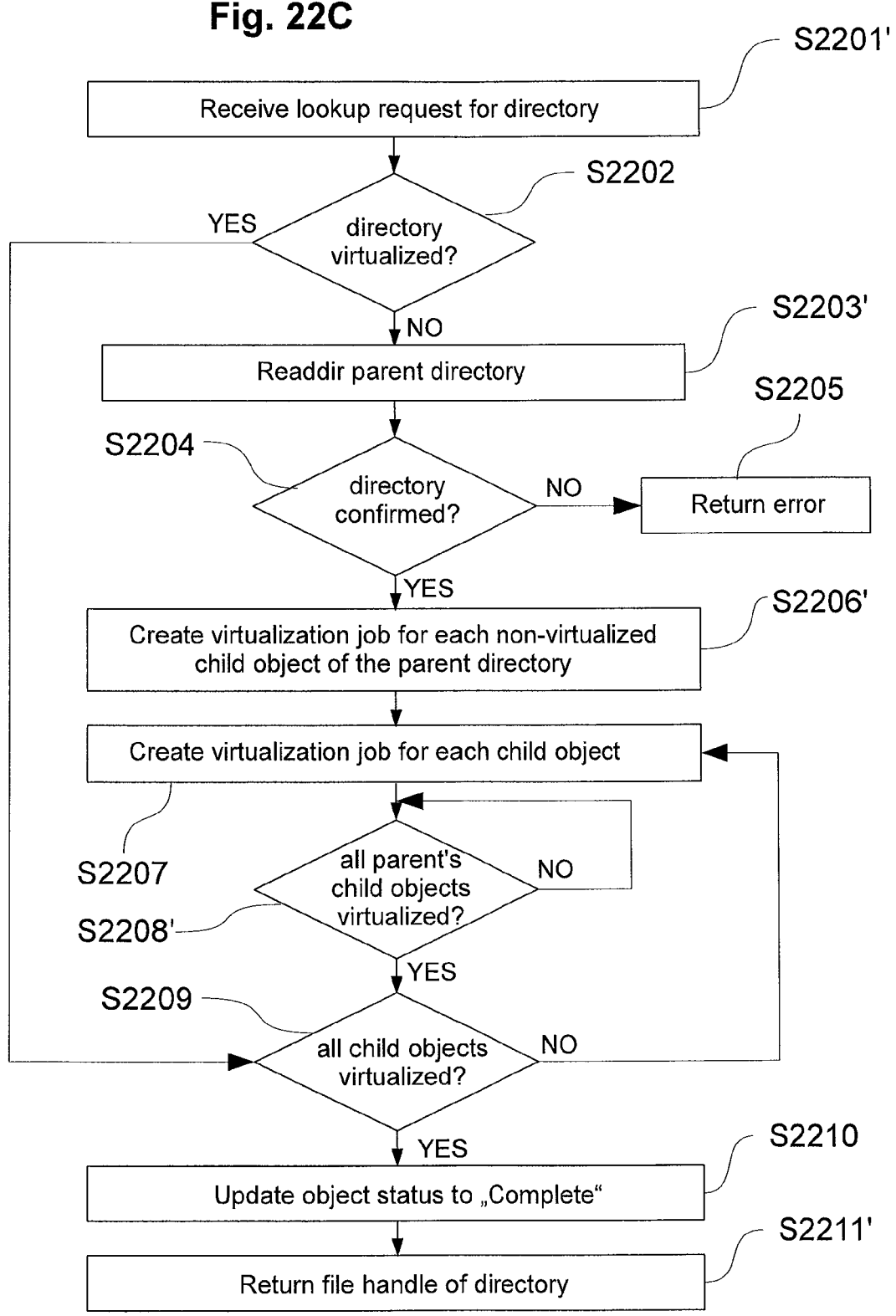

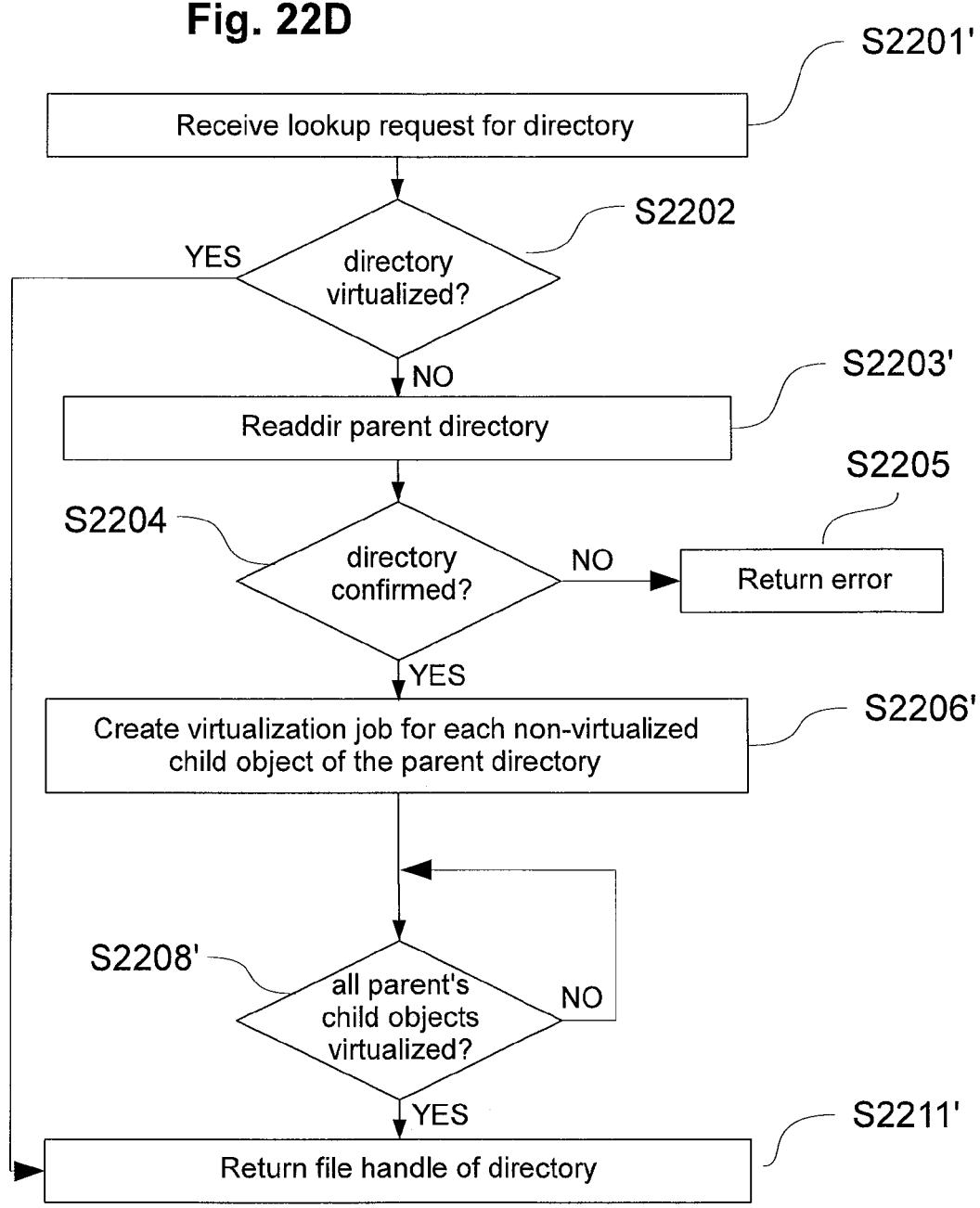

| Name | Object type | Object ID | Virtualization status | Object status |
|---|---|---|---|---|
| /root | directory | 001 | virtualized | complete |
| /dir1 | directory | 002 | virtualized | complete |
| /dir2 | directory | 003 | virtualized | complete |
| file1 | file | 004 | virtualized | needs migration |
| file2 | file | 005 | virtualized | needs migration |
| /dir11 | directory | 006 | virtualized | complete |
| /dir12 | directory | 007 | virtualized | complete |
| /dir21 | directory | 008 | virtualized | complete |
| file8 | file | 015 | virtualized | needs migration |
| /dir111 | directory | 010 | virtualized | complete |
| file4 | file | 011 | virtualized | needs migration |
| file9 | file | 016 | virtualized | needs migration |
| file10 | file | 014 | virtualized | needs migration |
| file5 | file | 012 | virtualized | needs migration |
| file6 | file | 013 | virtualized | needs migration |
| file3 | file | 009 | virtualized | needs migration |
| file7 | file | 014 | virtualized | needs migration |
|  |  |  |  |  |
|  |  |  |  |  |
|  |  |  |  |  |

341a, 341b, 341c, 341d

METHOD AND APPARATUS FOR VIRTUALIZATION OF A FILE SYSTEM, DATA STORAGE SYSTEM FOR VIRTUALIZATION OF A FILE SYSTEM, AND FILE SERVER FOR USE IN A DATA STORAGE SYSTEM

This is a continuation-in-part application of U.S. application Ser. No. 14/373,060, filed Jul. 18, 2014, which is a 371 National Stage of PCT/EP2013/063910, filed Jul. 2, 2013. The entire disclosures of all of these applications are hereby incorporated by reference.

DESCRIPTION

The present invention relates to a method, and apparatus and a data storage system for virtualization of a file system, and a file server for use in such data storage system.

BACKGROUND

In the prior art, there are known data storage systems such as e.g. described in connection with FIG. 1A below, in which multiple client computers are connected via a communication network with one or more file server systems managing one or more file systems for I/O access by the client computers.

At certain times, it may be desirable to exchange the one or more (legacy) file servers with new file servers in order to improve performance of the whole data storage system, e.g., because the newer file servers may be adapted to manage more file systems or larger file systems (including enabling more data storage space and/or larger number of file system objects), enable more efficient input/output (I/O) performance, enable use of larger storage units or storage units containing more efficient storage device technologies. Still, it may be desirable to keep the already existing file system(s) including file system structure (such as an existing file tree structure) and user data (file content) thereof, while it is, in principle, desirable to enable the users to access the existing file system(s) without interruption or at least with only a single interruption that is as short as possible. An example of an apparatus and a method for a hard-ware based file system is described in U.S. Pat. No. 7,457,822 B1, which is herein incorporated by reference.

SUMMARY

As described in more detail below, embodiments of the invention may be related to a data storage system, and parts thereof, in which a (new) first file system managing unit is interconnected between one or more client computers and a (legacy) second file system managing unit which manages one or more file systems accessible by the one or more client computers.

After interconnecting the (new) first file system managing unit, I/O access by the one or more client computers to the one or more file systems of the (legacy) second file system managing unit may be achieved through the (new) first file system managing unit. In a first phase referred to as virtualization, the one or more file systems of the (legacy) second file system managing unit may be represented by one or more virtualized file systems of the (new) first file system managing unit, the virtualized file systems being built incrementally during the virtualization phase. In a second phase (which may overlap with the virtualization phase), referred to migration, user data of the one or more file systems of the (legacy) second file system managing unit may be migrated to the (new) first file system managing unit.

According to some embodiments of the invention, it is an object to provide a method, and apparatus, a data storage system and a file server for building and providing a virtualized file system enabling indirect access to a second file system and enabling client access to the second file system.

According to some embodiments, there may be provided an apparatus for providing a virtualized file system enabling indirect access to a second file system in a data storage system comprising a plurality of client computers, a second file system managing unit for managing the second file system and enabling client access to the second file system, and a first file system managing unit interconnected between the plurality of client computers and the second file system managing unit.

In some embodiments, the apparatus may comprise the first file system managing unit adapted to create a first directory in a first file system managed by the first file system managing unit; associate a first directory of the second file system with the first directory of the first file system; enable on-demand virtualization of the second file system by the first file system managing unit based on client requests received from the client computers at the first file system managing unit and based on the association between the first directory of the first file system and the first directory of the second file system; and/or enable indirect client access to the second file system through the first file system. This has the advantage that the client access to the second file system can be enabled basically immediately after interconnecting the first file system managing unit indirectly through the first file system management unit.

In some embodiments, for executing on-demand virtualization, the first file system managing unit may be adapted to receive, from a client computer, an access request directed to a second directory of the second file system in a second path location with respect to the first directory of the second file system; create, upon receiving the access request directed to the second directory of the second file system, a second directory in the first file system in the second path location with respect to the first directory of the first file system; and/or store metadata of the second directory of the second file system in the first file system as metadata of the second directory of the first file system.

In some embodiments, the first file system managing unit may be adapted to, when the access request is a request for modifying the second directory of the second file system, modify the second directory of the first file system in accordance with the received access request, and send the access request to the second file system managing unit for modifying the second directory of the second file system in accordance with the received access request by the second file system managing unit; and/or, when the access request is a request for reading attributes of the second directory of the second file system, return requested attributes of the second directory of the second file system based on metadata of the second directory of the first file system.

In some embodiments, for executing on-demand virtualization, the first file system managing unit may be adapted to receive, from a client computer, an access request directed to a first file of the second file system in a first path location with respect to the first directory of the second file system; create, upon receiving the access request directed to the first file of the second file system, a first external link object in the first file system in the first path location with respect to the first directory of the first file system; and/or store metadata of the first file of the second file system in the first file system as metadata of the first file together with the first external link object of the first file system.

In some embodiments, the external link object may be a file system object of the first file system representing the first file of the second file system in the first file system and enabling access to the first file of the second file system, the first external link object including link data indicative at least of a unique object ID of the first file in the second file system and the first path location with respect to the first directory of the second file system.

In some embodiments, the first file system managing unit may be adapted to, when the access request is a request for modifying the first file of the second file system, send the access request to the second file system managing unit on the basis of the link data of the first external link object for modifying the first file of the second file system in accordance with the received access request by the second file system managing unit; and/or, when the access request is a request for reading attributes of the first file of the second file system, return requested attributes of the first file of the second file system based on metadata of the first external link object.

In some embodiments, the first file system managing unit may be adapted to enable automatic virtualization of the second file system by the first file system managing unit independent of client requests received from the client computers at the first file system managing unit and based on virtualization management information managed by the first file system managing unit and based on the association between the first directory of the first file system and the first directory of the second file system, the virtualization management information being at least indicative of the first directory existing in the second file system.

In some embodiments, for executing automatic virtualization, the first file system managing unit may be adapted to send, to the second file system managing unit, a directory information request directed to a target directory of the second file system indicated in the virtualization management information for requesting information indicative of child objects existing in the target directory of the second file system; receive, from the second file system managing unit, information indicative of child objects existing in the target directory of the second file system in response to the directory information request; and/or update the virtualization management information based on the received information indicative of child objects existing in the target directory of the second file system.

In some embodiments, for executing automatic virtualization, the first file system managing unit may be adapted to create, for each child object existing in the target directory of the second file system as indicated in the virtualization management information, an associated file system object in the first file system in a path location with respect to the first directory of the first file system corresponding to the path location of the associated child object with respect to the first directory of so the second file system.

In some embodiments, said sending the directory information request is automatically repeated by the first file system management unit for a plurality of target directories of the second file system, and/or said creating, for each child object existing in the target directory of the second file system as indicated in the virtualization management information, the associated file system object in the first file system may be repeated by the first file system management unit for each of the plurality of target directories.

In some embodiments, said repeatedly sending the directory information request for a plurality of target directories of the second file system and said repeatedly creating the associated file system object in the first file system for each of the child directories of the plural target directories may be performed in parallel by the first file system management unit.

In some embodiments, an execution rate per unit time of said repeatedly sending the directory information request for a plurality of target directories of the second file system may be controlled by the first file system management unit based on a storage occupancy of a buffer unit of the first file system managing unit.

In some embodiments, an execution rate per unit time of said repeatedly sending the directory information request for a plurality of target directories of the second file system may be controlled by the first file system management unit based on a rate of availability rate of communication channels between the first and second file system managing units.

In some embodiments, the created file system object may be a third directory of the first file system when the associated child object is a third directory of the second file system.

In some embodiments, for executing automatic virtualization, the first file system managing unit may be further adapted to create a self-reference link in the created third directory of the first file system, calculate and/or determine a fake link count for the created third directory of the first file system based on the number of child directories of the associated third directory in the second file system, and/or store the calculated/determined fake link count in the metadata of the created third directory of the first file system.

In some embodiments, the first file system management unit may be adapted to decrement the fake link count stored in the metadata of the third directory of the first file system associated with the third directory in the second file system, when automatically creating a child directory in the third directory of the first file system being associated with a child directory of the third directory of the second file system.

In some embodiments, the first file system management unit may be further adapted to receive, from one of the client computers, a request for reading a link count of the third directory of the second file system; calculate and/or determine the link count of the third directory of the second file system by adding the fake link count of the third directory of the first file system and a real link count of the third directory of the first file system; and/or send the calculated/determined link count to the client computer in response to the request.

In some embodiments, the created file system object may be a second external link object when the respective child object is a second file of the second file system, the second external link object representing the second file of the second file system in the first file system and enabling access to the second file of the second file system, the second external link object including link data indicative at least of a unique object ID of the second file in the second file system and a path location of the second file with respect to the first directory of the second file system.

In some embodiments, the first file system management unit may be further adapted to divide the virtualization management information into a plurality of data blocks, and/or repeatedly generate, for each data block, a backup copy of each of the data blocks of the virtualization management information.

In some embodiments, a first data block of the plurality of data blocks may include management data associated with a fourth directory of the second file system, and one or more second data blocks may include management data associated with child directories of the fourth directory of the second file system, wherein the first file system management unit may be adapted to generate a backup copy of each of the one or more second data blocks before generating a backup copy of the first data block.

According to some embodiments of another aspect, there may be provided a method for providing a virtualized file system enabling indirect access to a second file system in a data storage system comprising a plurality of client computers and a second file system managing unit for managing the second file system and enabling client access to the second file system.

The method may comprise interconnecting a first file system managing unit between the plurality of client computers and the second file system managing unit; creating a first directory in a first file system managed by the first file system managing unit; associating a first directory of the second file system with the first directory of the first file system; enabling on-demand virtualization of the second file system by the first file system managing unit based on client requests received from the client computers at the first file system managing unit and based on the association between the first directory of the first file system and the first directory of the second file system; and/or enabling indirect client access to the second file system through the first file system.

On-demand virtualization in some embodiments may comprise receiving, at the first file system managing unit, an access request directed to a second directory of the second file system in a second path location with respect to the first directory of the second file system; creating, upon receiving the access request directed to the second directory of the second file system, a second directory in the first file system in the second path location with respect to the first directory of the first file system; and/or storing metadata of the second directory of the second file system in the first file system as metadata of the second directory of the first file system.

In some embodiments, when the access request is a request for modifying the second directory of the second file system, the method may further comprise modifying the second directory of the first file system in accordance with the received access request, sending the access request to the second file system managing unit, and modifying the second directory of the second file system in accordance with the received access request.

In some embodiments, when the access request is a request for reading attributes of the second directory of the second file system, the method may further comprise returning requested attributes of the second directory of the second file system based on metadata of the second directory of the first file system.

On-demand virtualization in some embodiments may comprise receiving, at the first file system managing unit, an access request directed to a first file of the second file system in a first path location with respect to the first directory of the second file system; creating, upon receiving the access request directed to the first file of the second file system, a first external link object in the first file system in the first path location with respect to the first directory of the first file system; and/or storing metadata of the first file of the second file system in the first file system as metadata of the first file together with the first external link object of the first file system.

The external link object may be a file system object of the first file system representing the first file of the second file system in the first file system and enabling access to the first file of the second file system, the first external link object preferably including link data indicative at least of a unique object ID of the first file in the second file system and the first path location with respect to the first directory of the second file system.

In some embodiments, when the access request is a request for modifying the first file of the second file system, the method may further comprise sending the access request to the second file system managing unit on the basis of the link data of the first external link object, and modifying the first file of the second file system in accordance with the received access request.

In some embodiments, when the access request is a request for reading attributes of the first file of the second file system, the method may further comprise returning requested attributes of the first file of the second file system based on metadata of the first external link object.

In some embodiments, the method may further comprise enabling automatic virtualization of the second file system by the first file system managing unit independent of client requests received from the client computers at the first file system managing unit and/or based on virtualization management information managed by the first file system managing unit and based on the association between the first directory of the first file system and the first directory of the second file system, the virtualization management information being preferably at least indicative of the first directory existing in the second file system.

Automatic virtualization in some embodiments may comprise sending, from the first file system managing unit to the second file system managing unit, a directory information request directed to a target directory of the second file system indicated in the virtualization management information for requesting information indicative of child objects existing in the target directory of the second file system; receiving, at the first file system managing unit from the second file system managing unit, information indicative of child objects existing in the target directory of the second file system in response to the directory information request; and/or updating the virtualization management information based on the received information indicative of child objects existing in the target directory of the second file system.

Automatic virtualization in some embodiments may further comprise creating, for each child object existing in the target directory of the second file system as indicated in the virtualization management information, an associated file system object in the first file system in a path location with respect to the first directory of the first file system corresponding to the path location of the associated child object with respect to the first directory of the second file system.

In some embodiments, said sending the directory information request is automatically repeated for a plurality of target directories of the second file system, and/or said creating, for each child object existing in the target directory of the second file system as indicated in the virtualization management information, the associated file system object in the first file system is repeated for each of the plurality of target directories.

In some embodiments, said repeatedly sending the directory information request for a plurality of target directories of the second file system and said repeatedly creating the associated file system object in the first file system for each of the child directories of the plural target directories may be performed in parallel.

In some embodiments, an execution rate per unit time of said repeatedly sending the directory information request for a plurality of target directories of the second file system may be controlled based on a storage occupancy of a buffer unit of the first file system managing unit.

In some embodiments, an execution rate per unit time of said repeatedly sending the directory information request for a plurality of target directories of the second file system may be controlled based on a rate of availability rate of communication channels between the first and second file system managing units.

In some embodiments, the created file system object may be a third directory of the first file system when the associated child object is a third directory of the second file system.

Automatic virtualization in some embodiments may further comprise creating a self-reference link in the created third directory of the first file system, calculating a fake link count for the created third directory of the first file system based on the number of child directories of the associated third directory in the second file system, and/or storing the calculated/determined fake link count in the metadata of the created third directory of the first file system.

In some embodiments, the method may further comprise decrementing the fake link count stored in the metadata of the third directory of the first file system associated with the third directory in the second file system, when automatically creating a child directory in the third directory of the first file system being associated with a child directory of the third directory of the second file system.

In some embodiments, the method may further comprise receiving, at the first file system managing unit from one of the client computers, a request for reading a link count of the third directory of the second file system; calculating, at the first file system managing unit, the link count of the third directory of the second file system by adding the fake link count of the third directory of the first file system and a real link count of the third directory of the first file system; and/or sending the calculated/determined link count to the client computer in response to the request.

In some embodiments, the created file system object may be a second external link object when the respective child object is a second file of the second file system, the second external link object preferably representing the second file of the second file system in the first file system and enabling access to the second file of the second file system, the second external link object preferably including link data indicative at least of a unique object ID of the second file in the second file system and a path location of the second file with respect to the first directory of the second file system.

In some embodiments, the method may further comprise dividing the virtualization management information into a plurality of data blocks, and repeatedly generating, for each data block, a backup copy of each of the data blocks of the virtualization management information.

In some embodiments, a first data block of the plurality of data blocks includes management data associated with a fourth directory of the second file system, and one or more second data blocks include management data associated with child directories of the fourth directory of the second file system, wherein the method preferably further includes generating a backup copy of each of the one or more second data blocks before generating a backup copy of the first data block.

According to another aspect, there may be provided an apparatus for providing a virtualized file system enabling indirect access to a second file system in a data storage system comprising a plurality of client computers, a second file system managing unit for managing the second file system and enabling client access to the second file system, and a first file system managing unit interconnected between the plurality of client computers and the second file system managing unit.

The apparatus may comprising the first file system managing unit being adapted to create a first directory in a first file system managed by the first file system managing unit; associate a first directory of the second file system with the first directory of the first file system; enable on-demand virtualization of the second file system by the first file system managing unit based on client requests received from the client computers at the first file system managing unit and based on the association between the first directory of the first file system and the first directory of the second file system; and/or enable indirect client access to the second file system through the first file system.

In some embodiments, the first file system managing unit of the apparatus may be further adapted to execute steps of one or more of the aspects described above in connection with some embodiments.

According to another aspect, there may be provided a data storage system for providing a virtualized file system enabling indirect access to a second file system in a data storage system comprising a plurality of client computers, a second file system managing unit for managing the second file system and enabling client access to the second file system, and a first file system managing unit interconnected between the plurality of client computers and the second file system managing unit, the first file system managing unit being preferably adapted to create a first directory in a first file system managed by the first file system managing unit; associate a first directory of the second file system with the first directory of the first file system; enable on-demand virtualization of the second file system by the first file system managing unit based on client requests received from the client computers at the first file system managing unit and based on the association between the first directory of the first file system and the first directory of the second file system; and/or enable indirect client access to the second file system through the first file system.

In some embodiments, the first file system managing unit of the data storage system may be further adapted to execute steps of one or more of the aspects described above in connection with some embodiments.

According to another aspect, there may be provided a file system server for use in a data storage system according as described above, preferably comprising a first file system managing unit as described above in connection with some embodiments.

According to another aspect, there may be provided a computer program product comprising computer program code means being configured to cause a processing unit of a file system management unit in a data storage system to execute the steps of one or more of the aspects described above in connection with some embodiments.

BRIEF DESCRIPTION OF DRAWINGS

FIG. 6A shows an exemplary flow chart of a method for virtualization initialization, and FIG. 6B shows another exemplary flow chart of a method for virtualization initialization.

FIG. 9 shows an example of a partially virtualized file system tree structure.

FIG. 10 shows an example of the virtualization management information table at a second point of time during virtualization.

FIG. 11 shows another illustration of information exchange for automatic background virtualization.

FIG. 12 shows an example of the virtualization management information table at a third point of time during virtualization.

FIG. 13 shows an example of a partially virtualized file system tree structure.

FIG. 20A shows an exemplary flow chart of a method for enabling user file access during virtualization, and FIG. 20B shows an exemplary flow chart of a method for enabling user file access during virtualization.

FIG. 21 shows an exemplary flow chart of a method for enabling attributes access during virtualization.

FIG. 22B shows an exemplary flow chart of a method for enabling user directory access during virtualization.

FIG. 22C shows an exemplary flow chart of a method for enabling user directory access during virtualization.

FIG. 22D shows an exemplary flow chart of a method for enabling user directory access during virtualization.

FIG. 24 shows an example of the virtualization management information table upon completion of virtualization of the file system tree of FIG. 4.

DETAILED DESCRIPTION

Figure 1A:
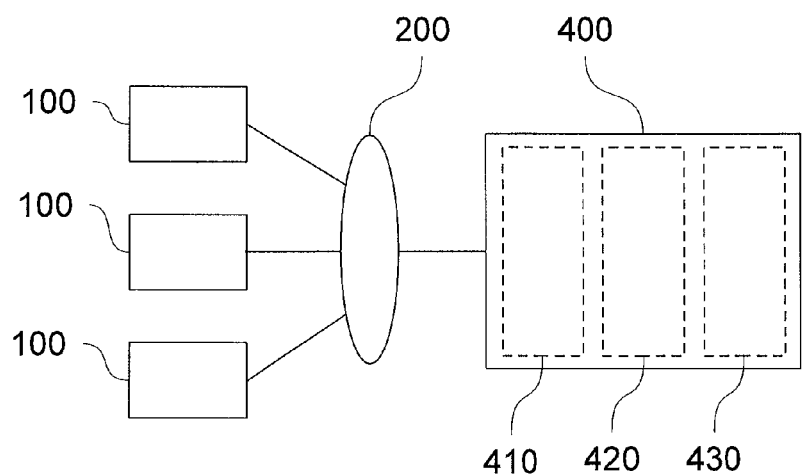
FIG. 1A shows an example of a data storage system.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1A shows an example of a data storage system comprising a plurality of client computers 100 (clients) connected via a communication network 200 to a second storage apparatus 400. The second storage apparatus 400 comprises a file system management unit 410 for managing one or more file systems, a storage unit 420 for storing user data and metadata of user data of the one or more file systems managed by the storage unit 420, and a backup storage unit 430 for performing backup of data stored in the storage unit 420 upon backup request or automatically such as e.g. periodically. The second storage apparatus 400 can be realized as a single computing device or as a system of plural devices connected to each other. For example, the file system management unit 410 can be realized as a system of one or more file system server computers connected to one or more storage devices as storage units 420 and 430 of a network attached storage (NAS).

The communication network 200 (as well as communication networks 500, 600, and 800 discussed below) may be realized as a wired communication network (such as WAN, LAN, local Fibre channel network, an Internet based network, an Ethernet communication network or the like) or a wireless communication network (such as WLAN), or any combination thereof. An underlying communication protocol may be a Fibre Channel protocol or file based protocols such as NFS-based protocols or SMB/CIFS-based protocols.

The clients 100 are adapted to access user data of the one or more file systems managed by the file system management unit 410 of the second storage apparatus 400 via the communication network 200. Specifically, users can write data to the file system, read data from the file system, create files and directories in the file system, set or read attributes of file system objects such as files and directories, modify data of the file system, delete objects of the file system and move file system objects, via each of the clients 100 connected via the network 200 to the second storage apparatus 400 depending on user individual or user group individual access policies (e.g. user access rights, user group access rights, file system permissions etc.).

At certain times, it may be desirable to exchange the second storage apparatus 400 with another newer file system managing storage apparatus in order to improve performance of the whole data storage system, e.g., because the newer file system managing storage apparatus may be adapted to manage more file systems or larger file systems (including enabling more data storage space and/or larger number of file system objects), enable more efficient input/output (I/O) performance, enable use of larger storage units or storage units containing more efficient storage device technologies. Still, it may be desirable to keep the already existing file system(s) including file system structure (such as an existing file tree structure) and user data (file content) thereof, while it is, in principle, desirable to enable the users to access the existing file system(s) without interruption or at least with only a single interruption that is as short as possible.

Figure 1B:
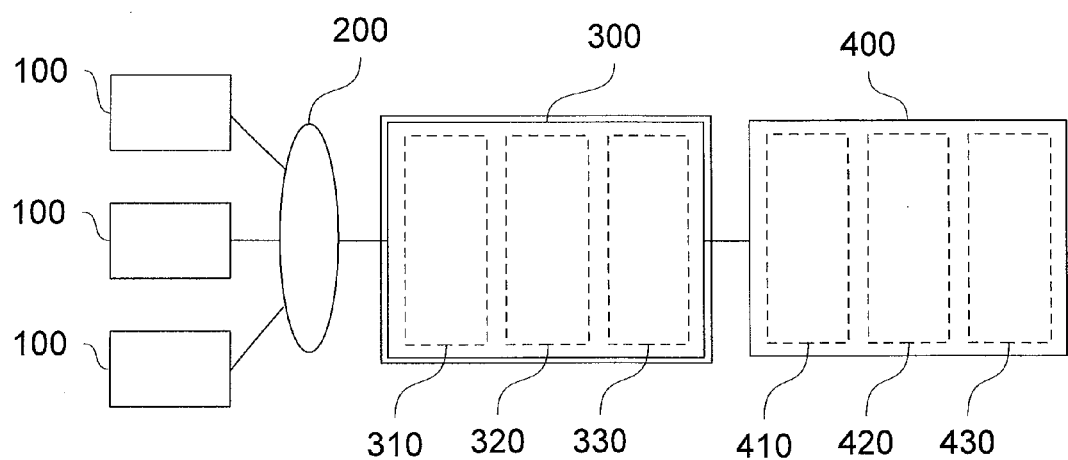
FIG. 1B shows an example of the data storage system of FIG. 1A having interconnected an additional storage apparatus.

According to some preferred aspects of the invention, it is an underlying idea that a newer first storage apparatus 300, which shall be used instead of the older legacy second storage apparatus 400 for managing the existing file system(s), is interconnected between the accessing clients 100 and the legacy second storage apparatus 400 as exemplarily illustrated in FIG. 1B, with only a single brief service interruption.

FIG. 1B shows an example of the data storage system of FIG. 1A having interconnected the additional first storage apparatus 300 in between the communication network 200 and the second storage apparatus 400 according to preferred aspects of the invention. The first storage apparatus 300 comprises a file system management unit 310 for managing one or more file systems, a storage unit 320 for storing user data and metadata of user data of the one or more file systems managed by the storage unit 320, and a backup storage unit 330 for performing backup of data stored in the storage unit 320 upon backup request or automatically such as e.g. periodically. The first storage apparatus 300 can be realized as a single computing device or as a system of plural devices connected to each other. For example, the file system management unit 310 can be realized as a system of one or more file system server computers connected to one or more storage devices as storage units 320 and 330 of a network attached storage (NAS).

Interconnecting the first storage apparatus 300 in between the communication network 200 and the second storage apparatus 400 requires only a single short interruption of file system services, during which interruption the clients 100 are disconnected and cannot access the existing file system(s) for a short period, i.e. clients 100 cannot read user data, write user data, create new file system objects such as files and directories or access file system object attributes.

After interconnecting the first storage apparatus 300 in between the communication network 200 and the second storage apparatus 400, the clients 100 remain disconnected from the second storage system 400 and can, therefore, not directly access the file system(s) managed by the second file storage apparatus 400 but only can access the file system(s) managed by the second storage apparatus 400 indirectly through the first storage apparatus 300. According to preferred aspects, it is desirable that all user access will only be addressed to the first storage apparatus 300 and no direct connections to the second storage apparatus 400 exist.

First, after interconnecting the first storage apparatus 300, the one or more file systems to be accessed by the users via the clients 100 are still held on the second storage apparatus 400 (including the user data of files and directories for organizing the files, and including metadata of the file system objects) and the first storage apparatus 300 does not hold any data of the existing file system(s).

In order to be able to handle all user access requests to the file system(s) locally on the first storage apparatus 300 and disconnect the second storage apparatus 400, all file system data (including user data and file system metadata) may eventually need to be migrated from the second storage apparatus 400 to the first storage apparatus 300. However, for large file systems containing a large number of directories and files, such data migration may take very long, and if user access were disabled during migration of data until all file system data (including user data and file system metadata) would exist on the first storage apparatus 300, this would lead to disadvantageously long periods of undesirable non-accessibility of the file system(s) by the clients 100.

For minimizing the period of undesirable non-accessibility of the file system(s), the first storage system 300 is adapted to enable indirect user access to the file system(s) managed by the second storage apparatus 400 immediately after interconnecting the first storage apparatus 300.

Then, in a first phase after interconnecting the first storage apparatus 300, referred to as "Virtualization" in the following, the first storage apparatus 300 performs virtualization of the file system tree(s) of the file system(s) in which the file system tree(s) of the file system(s) which exist on the second storage system 400 is/are virtually created on the first storage apparatus 300 without actually migrating user data stored on the storage unit 420 of the second storage apparatus.

In a second phase, referred to "Migration" in the following, the actual user data including the actual data contents of files and the like will be transferred from the second storage apparatus 400 to the first storage apparatus 300.

Upon completion of both of the virtualization phase and the migration phase, the first storage apparatus 300 will be able to handle locally the existing file system(s), which may very likely have been changed in the meantime due to ongoing user access to the file system(s) during the virtualization and migration phases, and the second storage apparatus 400 can be disconnected completely thereafter.

During both of the virtualization phase and the migration phase, however, the second storage apparatus 400 will need to remain accessible by the first storage apparatus 300.

While the virtualization phase and the migration phase will be described in more detail below with respect to some preferred aspects as distinct phases, in which data migration is not started until completion of the virtualization phase, it is to be understood that the present invention is not limited to such configuration, and that these phases can also overlap in a timely manner in that migration of file data content of files of already virtualized portions of the file system(s) may be performed already while virtualization is still ongoing for other portions of the file system(s).

When exemplarily considering the virtualization phase and the migration phase as distinct subsequently performed operational phases, no user data (i.e. contents of files) will exist on the first storage system 300 (e.g. stored in the storage unit 320) because during the virtualization phase, the first file system management unit 310 will build a virtualized file tree structure of the file system(s) managed by the second file system management unit 410 in that the first file system management unit 310 will create an external link object stored by the storage unit 320 for each file that exists in the file system(s) of the second storage apparatus 400.

The external link objects will be file system objects of the file system(s) managed by the first file system management unit 310, each external link object enabling access to the corresponding file of the file system(s) managed by the second file system management unit 410 as long as the actual user data of the file (i.e. the file content itself) has not been migrated to the storage unit 320 of the first storage apparatus 300.

The details of user access to files of the file system(s) existing on the second storage apparatus 400 through external link objects existing on the first storage apparatus 300 will be described below.

While the connection of the first and second storage apparatuses 300 and 400 in all of the configurations of FIGS. 1B to 1D below may be realized in various ways, e.g. similar to the communication network 200 discussed above, and it may be particularly desirable to provide a Fibre channel connection having plural Fibre channels allowing parallel communication in the different plural Fibre channels. Furthermore, it may be desirable to use a file-based communication protocol such as e.g. FTP-based protocols, NFS-based protocols (e.g. NFSv3 or NFSv4) or SMB/CIFS-based protocols, or the like.

Figure 1C:
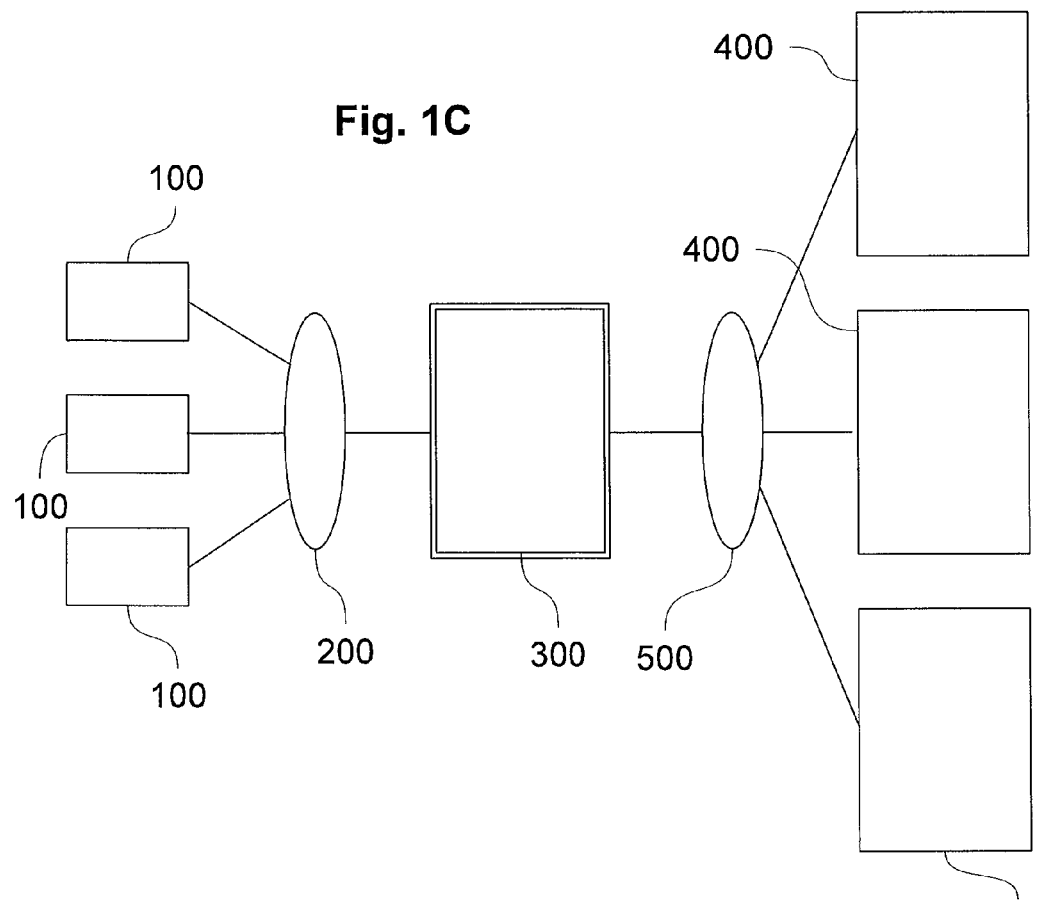
FIG. 1C shows another example of a data storage system.

FIG. 1C shows another example of a data storage system having interconnected an additional first storage apparatus 300 in between the communication network 200 and another communication network 500, which is connected to plural second storage apparatuses 400. That is, the difference to the data storage system as shown in FIG. 1B is that the first storage apparatus 300 can be used to be exchanged with a plurality of previously existing legacy storage apparatuses 400, each managing one or more file system(s) to be accessed by the clients 100. The first storage apparatus 300 is adapted to perform virtualization and migration of the file systems managed by the plural legacy storage apparatuses 400.

Upon completion of both of the virtualization phase and the migration phase, the first storage apparatus 300 will be able to handle locally the existing file systems, which may very likely have been changed in the meantime due to ongoing user access to the file system(s) during the virtualization and migration phases, and one or more or all of the second storage apparatuses 400 can be disconnected completely thereafter. During both of the virtualization phase and the migration phase, however, the second storage apparatuses 400 will need to remain accessible by the first storage apparatus 300.

In the example of FIG. 1C, it becomes apparent that it may even be advantageous in some cases to only perform virtualization of file systems by the first storage apparatus 300 without any subsequent migration phase. For example, after completion of the virtualization of all file systems managed by the legacy storage apparatuses 400, while the actual user data (file content) of the file systems will remain to be stored only on the storage units of the legacy storage apparatuses 400, all file systems of the plural legacy storage apparatuses 400 can be accessed by the clients 100 through the virtualized file systems managed by the first storage apparatus 300 as a single access point.

Figure 1D:
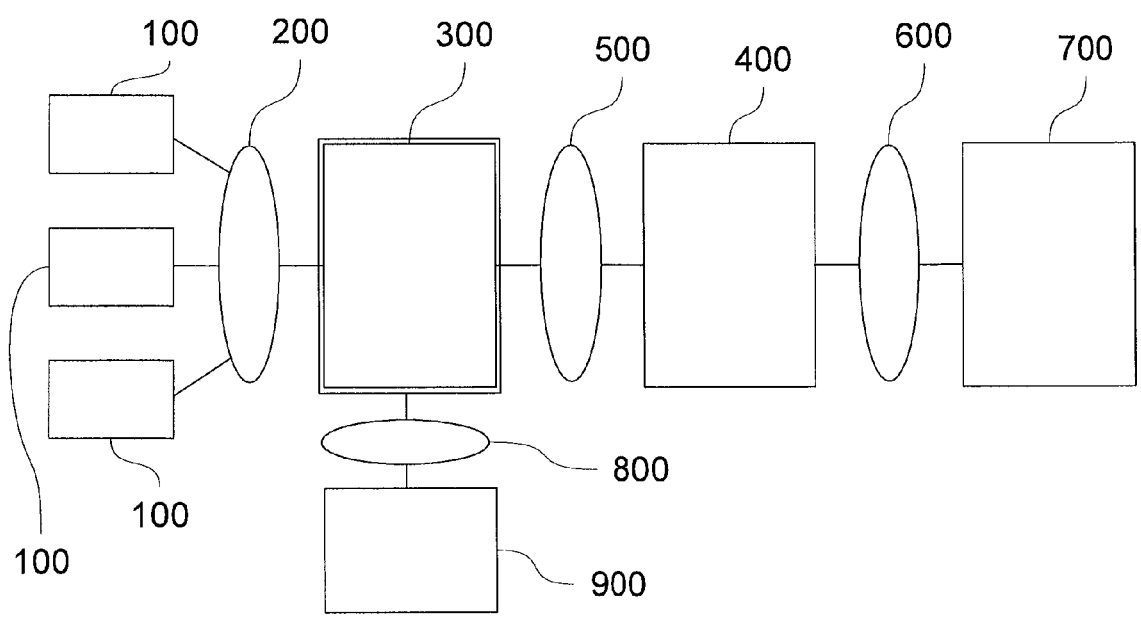
FIG. 1D shows another example of a data storage system.

FIG. 1D shows another example of a data storage system. Again, clients 100 are connected via a communication network 200 to the first storage apparatus 300, and the first storage apparatus 300 is connected via another communication network 500 to the second (legacy) storage apparatus 400. In addition, the first storage apparatus 300 is connected via yet another communication network 800 to a remote storage apparatus 900 while the second storage apparatus 400 is connected via yet another communication network 600 to another remote storage apparatus 700.

Such configuration also allows remote data replication, in which user data stored on the storage unit 320 of the first storage apparatus 300 can be remote replicated via the communication network 800 to a storage unit of the first remote storage apparatus 900 and user data stored on the storage unit 420 of the second storage apparatus 400 can be remote replicated via the communication network 600 to a storage unit of the second remote storage apparatus 700. Of course, remote replication of data via the networks 800 and 600 can be performed synchronously or asynchronously.

In principle, for a large number of legacy data storage systems, there will exist a configuration having a second storage apparatus 400 at a first site and a remote storage apparatus 700 for synchronous or asynchronous remote replication of user data of the file system(s) managed by the second storage apparatus 400. After interconnecting the first storage apparatus 300 as described above in connection with FIG. 1B, the first storage apparatus 300 will perform virtualization of the file system(s) managed by the second storage apparatus 400 but will not actually migrate user data until the start of the migration phase.

According to an exemplary embodiment, during virtualization phase without migration, all user access to the file system(s) by the clients 100 will be passed through to the second storage apparatus 400, including all data modifying user requests such as write access, attribute changing user access, creation of new file and directories, renaming operations etc., and the second storage system 400 will continue to manage the current (canonical) version of the file system(s). In such embodiments, it will not be necessary to perform data replication from the first storage apparatus 300 to the remote storage apparatus 900 as long as all data modifying user access to the file system(s) by the clients 100 will be passed through to the second storage apparatus 400, because the canonical data version of the file system(s) will be held completely on the second storage apparatus 400 and be replicated synchronously or asynchronously to the storage apparatus 900, and the remote storage apparatus 900 can be connected later.

However, in some other embodiments in which migration is started already during (or after virtualization), and modifying user access is not passed through anymore to the second storage apparatus 400 for file system objects which have been fully migrated and are fully held on the first storage apparatus 300, and/or for creation of new files and/or new directories being only performed in the file system(s) being managed by the first storage apparatus 300, i.e. when the file systems may start to differ, additional data replication to the remote storage apparatus 900 may become desirable at least for file system objects which have been fully migrated and are fully held on the first storage apparatus 300 and/or for newly created files and/or newly created directories.

Similarly, in all of the above configurations, for backup of data, it will not be necessary to perform data backup from the storage unit 320 of the first storage apparatus 300 to the backup storage unit 330 as long as all data modifying user access to the file system(s) by the clients 100 will be passed through to the second storage apparatus 400, when the still canonical version of the file system(s) will be held still on the second storage apparatus 400, and backup of the canonical version will be performed from the storage unit 420 of the second storage apparatus 400 to the backup storage unit 430.

However, in some other embodiments in which migration is started already during (or after virtualization), and modifying user access is not passed through anymore to the second storage apparatus 400 for file system objects which have been fully migrated and are fully held on the first storage apparatus 300, and/or for creation of new files and/or new directories being only performed in the file system(s) being managed by the first storage apparatus 300, i.e. when the file systems may start to differ, additional data backup to the remote storage unit 330 may become desirable at least for file system objects which have been fully migrated and are fully held on the first storage apparatus 300 and/or for newly created files and/or newly created directories.

Figure 2:
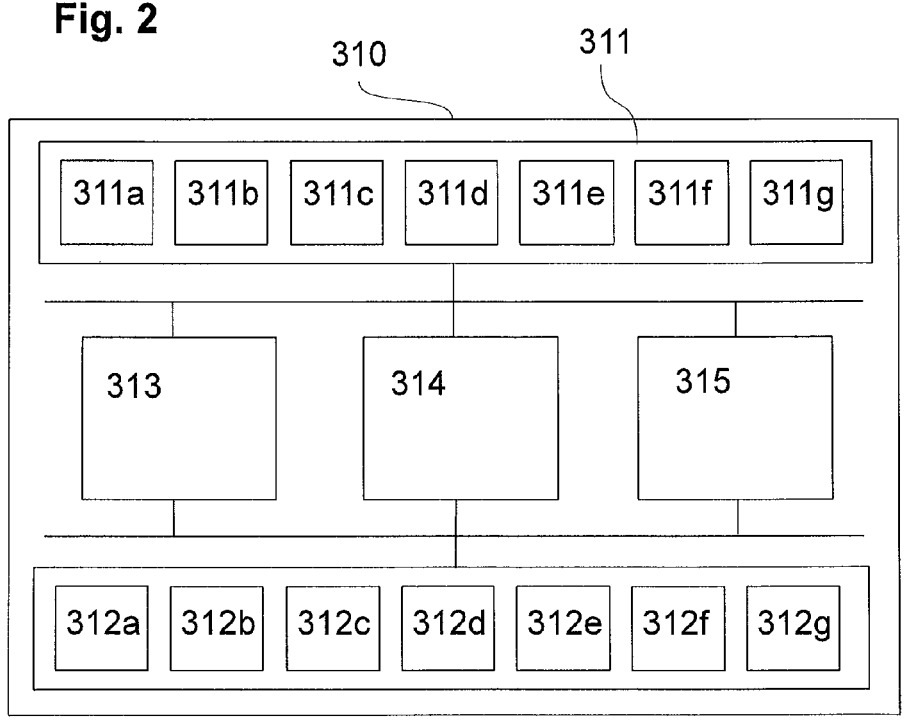
FIG. 2 exemplarily shows a schematic view of the structure of a file system management unit.

FIG. 2 exemplarily shows a schematic view of the structure of the file system management unit 310. The file system management unit 310 comprises a host interface unit 311 comprising a plurality of host interfaces 311a to 311g for connection to plural host devices (such as client computers 100) via the network 200 and a storage interface unit 312 comprising a plurality of storage interfaces 312a to 312g for connection to plural storage devices of the storage units 320 and 330. In addition, the file system management unit 310 comprises a processing unit 313 comprising one or more central processing units, a memory unit 314 for temporarily storing data used for processing including management data, and a storage device 315 for storing application data and management data.

Figure 3:
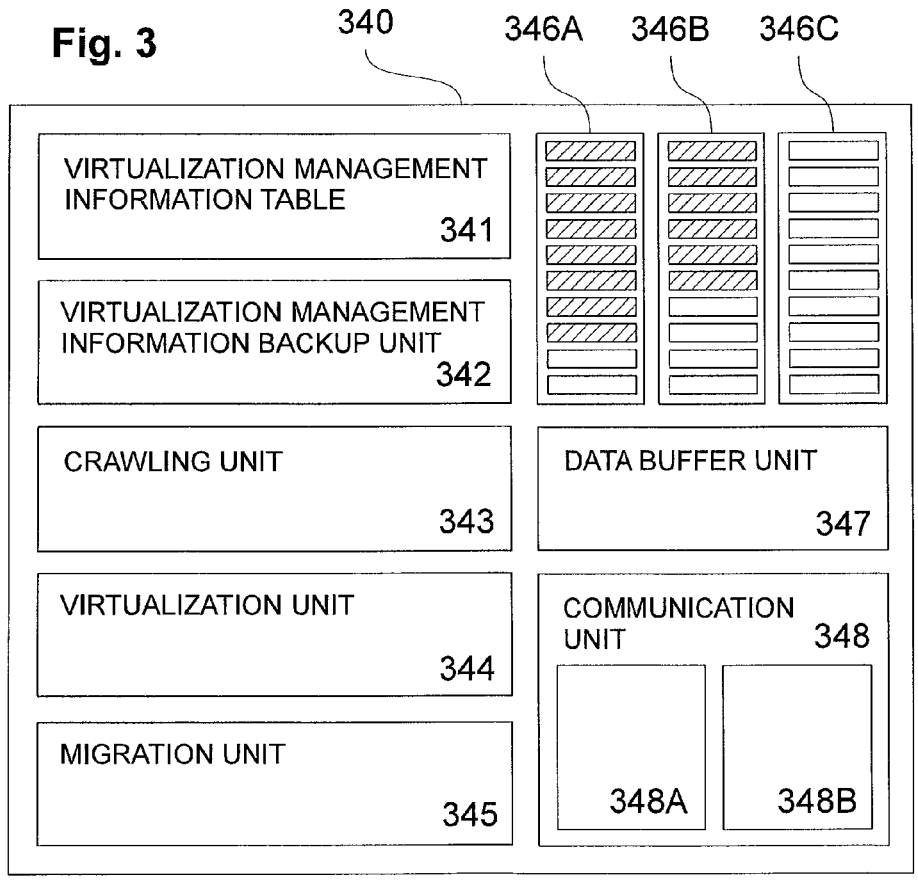
FIG. 3 exemplarily shows a schematic functional view of a virtualization and migration unit.

FIG. 3 exemplarily shows a schematic functional view of a virtualization and migration unit 340 of the file system management unit 310, which can be realized by hardware, software, or a combination thereof.

The virtualization and migration unit 340 comprises a virtualization management information table 341 for managing virtualization management data and migration management data (stored in the memory unit 314 and/or the storage device 315) and a virtualization management information backup unit 342 for performing backup of virtualization management data and migration management data (to the storage device 315 and/or to storage units 320 and/or 330).

For communication purposes, the virtualization and migration unit 340 comprises a communication unit 348 having a client communication unit 348A for receiving access requests from clients 100 and for responding to access requests from clients 100 and a file system communication unit 348B for issuing access requests to the file system management unit 410 of so the second storage apparatus 400 and for receiving responses from the file system management unit 410 of the second storage apparatus 400.

For performing virtualization and migration, the virtualization and migration unit 340 comprises a crawling unit 343 for automatically crawling (observing) the file tree structure of the file system(s) managed by the file system management unit 410 of the second storage apparatus 400, and for creating virtualization jobs for instructing virtualization of file system objects discovered in the file system(s) managed by the file system management unit 410 of the second storage apparatus 400.

The virtualization and migration unit 340 further comprises a virtualization unit 344 for executing virtualization jobs for virtualizing file system objects discovered by the crawling unit 343, and for creating migration jobs for instructing migration of virtualized file system objects, and a migration unit 345 for executing migration jobs for migrating file system objects virtualized by the virtualization unit 344.

The virtualization and migration unit 340 further comprises a plurality of job queues 346A, 346B and 346C for subsequently storing jobs for file system crawling, file system object virtualization, and for file system object migration.

For example, the first job queue 346A may hold directory information jobs, the second job queue 346B may hold virtualization jobs and the third job queue 346C may hold migration jobs. That is, the virtualization and migration may be performed in a multi-threaded and/or parallelized manner in that different units are provided for file system crawling (crawling unit 343) based on jobs held in the job queue 346A, for file system object virtualization (virtualization unit 344) based on jobs held in the job queue 346B, and for file system object migration (migration unit 345) based on jobs held in the job queue 346C.

The above-mentioned units may be multi-threaded in that the crawling unit 343 may be adapted to execute plural crawling jobs (e.g. directory information jobs as discussed further below) taken from the job queue 346A in parallel, the virtualization unit 344 may be adapted to execute plural virtualization jobs taken from the job queue 346B in parallel, and the migration unit 345 may be adapted to execute plural migration jobs taken from the job queue 346C in parallel.

The present invention is, however, not limited to the use of three queues as described above, and there may be provided plural job queues for each of directory information jobs, virtualization jobs and migration jobs, or less than three queues, e.g. in that one queue is provided for all of directory information jobs, virtualization jobs and migration jobs. In the latter case of only one queue, the crawling unit 343, the virtualization unit 344, and the migration unit 345 may be realized as a single multi-threaded unit being adapted to execute a plurality of jobs taken from the single job queue, and adding all newly created jobs (including directory information jobs, virtualization jobs and migration jobs to the same queue).

A "directory information job" is a job associated with a certain directory of the file system(s) managed by the file system management unit 410 of the second storage apparatus 400 which has been discovered by the crawling unit 343, the "directory information job" instructing the crawling unit 343 to observe the file system objects (including subdirectories and files) in the certain directory of the file system(s) managed by the file system management unit 410 of the second storage apparatus 400.

A "virtualization job" is a job associated with a certain file system object (such as a file or directory) of the file system(s) managed by the file system management unit 410 of the second storage apparatus 400 which has been discovered by the crawling unit 343, the "virtualization job" instructing the virtualization unit 344 to virtualize the certain file system object on the first storage apparatus 300.

Basically, virtualization of a directory discovered by the crawling unit 343 means that a corresponding directory (having the same name) will be created in the file system(s) managed by the first file system management unit 310, while virtualization of a file or similar object (such as a hard linked file) discovered by the crawling unit 343 means that a virtual object, referred to as external link object (abbreviated as XLO in the following), will be created in the directory of the file system(s) managed by the first file system management unit 310 corresponding to the directory of the file system(s) managed by the second file system management unit 410 having the corresponding file.

An "external link object" is an object existing in the file system(s) managed by the first file system management unit 310 being associated with a file or similar object (such as a hard linked file). An "external link object" does not store any actual user data of the corresponding file but includes an external reference to the corresponding file in the file system(s) managed by the second file system management unit 410 such that the "external link object" of the file system(s) managed by the first file system management unit 310 represents the corresponding file of the file system(s) managed by second file system management unit 410 in the file system(s) managed by the first file system management unit 310 and allows access to the corresponding file.

An "external link object" may at least comprise information on a remote object ID used for the corresponding file in the file system(s) managed by the second file system management unit 410 and information on a remote path of the file in the file system(s) managed by the second file system management unit 410.

A "migration job" is a job associated with a certain file or similar object (such as a hard linked file) of the file system(s) managed by the file system management unit 410 of the second storage apparatus 400 which has been virtualized by the virtualization unit 344, the "migration job" instructing the migration unit 345 to migrate the certain file or similar object to the first storage apparatus 300. That is, by executing the migration job" instructing the migration unit 345 to migrate the certain file, the actual user data as content of the file is transferred to the first storage apparatus 300 to be stored in the storage unit 320.

In case jobs are created while the job queues become occupied with jobs, there is provided a in buffer unit 347 for temporarily storing directory information jobs, virtualization jobs and migration jobs when one or more of the job queues 346A to 346C are occupied. When jobs are held by the buffer unit 347, the jobs will be added to the respective job queues once another job is executed and removed from the job queues.

Further exemplary details in connection with terms "virtualization", "migration", "external link object", "directory information job", "virtualization job", and "migration job" will become apparent in the discussion of the more detailed description and examples below.

Figure 4:
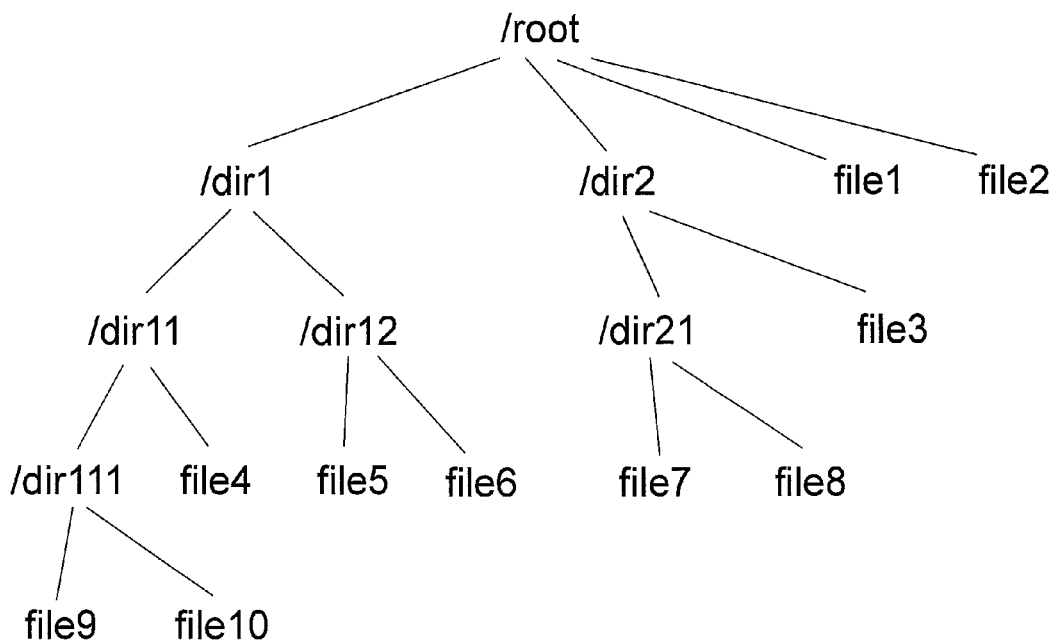
FIG. 4 shows an example of a file system tree structure.

FIG. 4 shows an example of a file system tree structure of a file system as exemplarily managed by the second file system management unit 410 of FIGS. 1A and 1B. Specifically, it is exemplarily assumed that the file system managed by the second file system management unit 410 and stored on the storage unit 420 of FIG. 1A has the structure of FIG. 4 at the time of disconnecting the second storage apparatus 400 and interconnecting the first storage apparatus 300 before start of virtualization of the file system on the first storage apparatus 300 to be managed by the first file system management unit 310.

The exemplary file system of FIG. 4 has a highest order directory /root and plural subdirectories. Specifically, the child directories /dir1 and /dir2 exist in the /root directory in addition to files "file1" and "file2". That is, the /root directory represents the parent directory of the child directories /dir1 and /dir2. The directory /dir1 has child directories /dir11 and /dir12 and the directory /dir2 has one child directory /dir21 and the file "file3". In the child directory /dir111 of directory /dir11, there exist files "file9" and "file10". Further, a file "file4" is stored in directory /dir11, while files "file5" and "file6" exist in the directory /dir12. Finally, the directory /dir21 has files "file7" and "file8".

Once the first storage apparatus 300 is interconnected between the clients 100 and the second storage apparatus 400 as e.g. shown in FIG. 1B, 1C or 1D, virtualization of the file system managed by the second file system management unit 410 and stored on the storage unit 420 of FIG. 1A can be initiated as soon as an initial virtualization path is created, which virtualization path associates one newly created directory in the file system managed by the first file system management unit 310 of the first storage apparatus 300 (e.g. a highest order directory) with a highest order directory of the portion of the file system managed by the second file system management unit 410 of the second storage apparatus 400 to be virtualized and/or migrated.

For example, in case no previous file system exists on the first storage apparatus 300, a new highest order directory /root can be created in the file system managed by the first file system management unit 310 of the first storage apparatus 300 and be associated by a newly established virtualization path with the highest order directory /root of the file system managed by the second file system management unit 410 of the second storage apparatus 400, resulting in virtualization of the tree structure of all file system objects having a lower order than the /root directory.

Figure 5A:
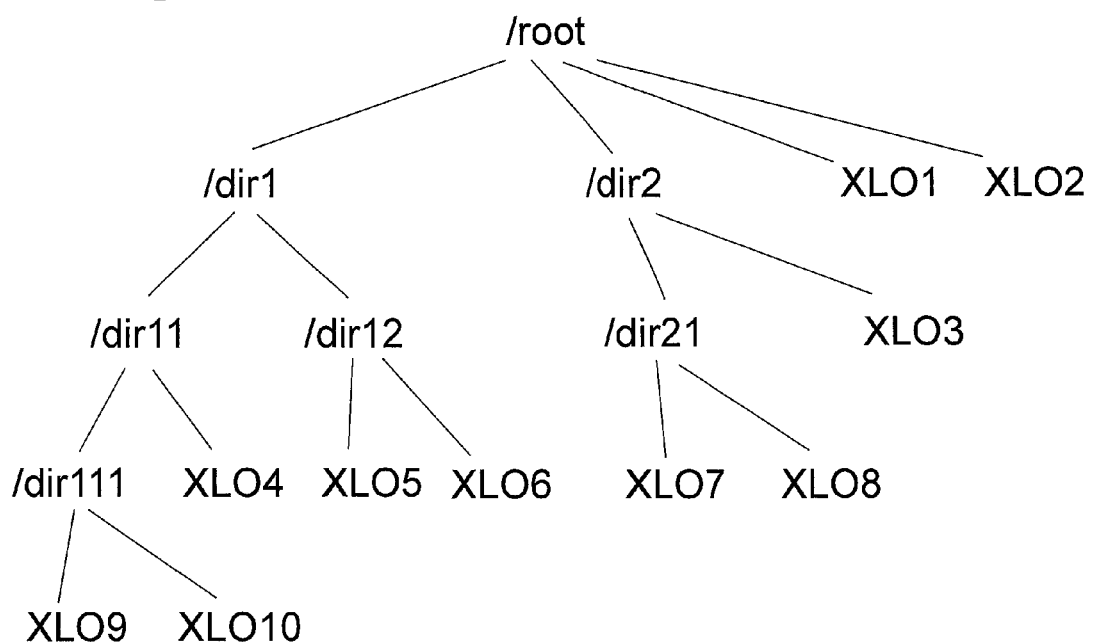
FIG. 5A shows an example of a virtualized file system tree structure based on the tree structure of FIG. 4.

FIG. 5A shows an example of a virtualized file system tree structure based on the tree structure of FIG. 4 in which the highest order directory /root of the file system managed by the first file system management unit 310 is associated with the highest order directory /root of the file system managed by the second file system management unit 410 according to a first virtualization path <storage apparatus 300>:/root→<storage apparatus 400>:/root.

After complete virtualization of the file system of the second file system management unit 410 according to the first virtualization path, the first file system management unit 310 will manage a file system having a tree structure according to FIG. 5A in which each of the directories /dir1, /dir2, /dir11, /dir12, /dir21 and /dir111 of the file system managed by the second file system management unit 410 will have been created also in the file system as managed by the first file system management unit 310, having the same tree structure in that directories /dir1 and /dir2 are created as child directories of the highest order directory /root, directories /dir11 and /dir12 are created as child directories of the directory /did and so on.

However, regarding the files (and similar objects such as hard linked files), the file system managed by the first file system management unit 310 in the first storage apparatus 300 will not have the actual files after virtualization but have a respective external link object XLO for each file of the file system managed by the second file system management unit 410 in the second storage apparatus 300.

Accordingly, after virtualization being completed, the external link objects XLO1, XLO2, XLO3, XLO4, XLO5, XLO6, XLO7, XLO8, XLO9, and XLO10 will exist in the file system managed by the first file system management unit 310 in the first storage apparatus 300 instead of the respective files file1, file2, file3, file4, file5, file6, file7, file8, file9, and file10 of the file system managed by the second file system management unit 410 in the second storage apparatus 400. It is to be noted that the external link objects in the first file system will be presented as files to the clients, i.e. the clients will not be able to see the external link objects in the first file system but will see the actual file names, e.g., "file1", "file2", "file3", "file4", "file5", "file6", "file7", "file8", "file9", and "file10". Each of the respective external link objects will exist in the directory of the file system managed by the first file system management unit 310 in the first storage apparatus 300 that corresponds to the respective directory of the file system managed by the second file system management unit 410 in the second storage apparatus 400 having the respective file.

For example, while file10 exists in the remote path /root/dir1/dir11/dir111/file10 in the file system managed by the second file system management unit 410 in the second storage apparatus 400, the corresponding external link object XLO10 exists in the corresponding local path /root/dir1/dir11/dir111/XLO10 in the first file system management unit 310 of the first storage apparatus 300, and XLO10 represents file10 and allows external access to file10 when a user attempts to access file 10 in the file system at the first storage apparatus 300 by means of an access request. That is, preferably, the local paths names will be the same as the remote paths, and from the viewpoint of the clients, the virtualized first file system will be appearing to the clients undistinguishable from the second file system.

Figure 5B:
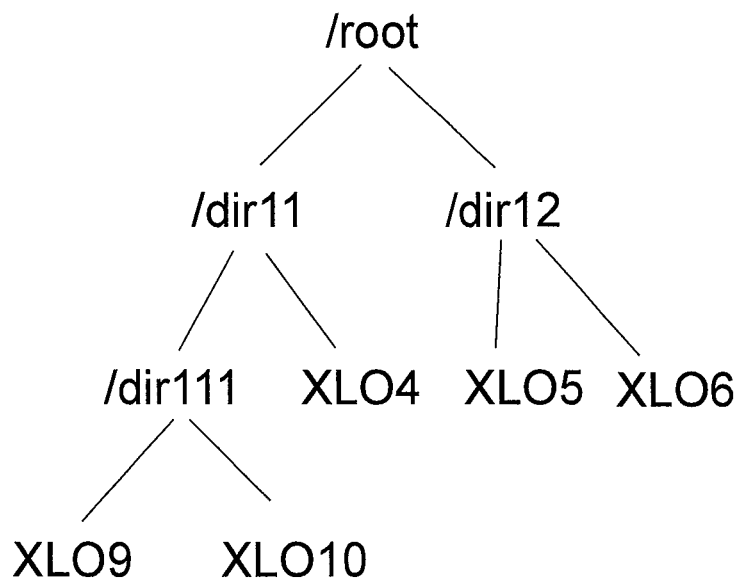
FIGS. 5B and 5C show examples of other virtualized file system tree structures based on the tree structure of FIG. 4.

FIG. 5B shows an example of another virtualized file system tree structure based on the tree structure of FIG. 4 in accordance with another possible virtualization path. For example, in a situation in which current users only access files and directories existing below /dir1 while file1, file2 and all objects existing below directory /dir2 are not accessed anymore, another virtualization path may be set such as <storage apparatus 300>:/root→<storage apparatus 400>:/root/dir1 resulting in the virtualized tree structure of FIG. 5A in which only objects below directory /dir1 can be accessed after virtualization.

Figure 5C:
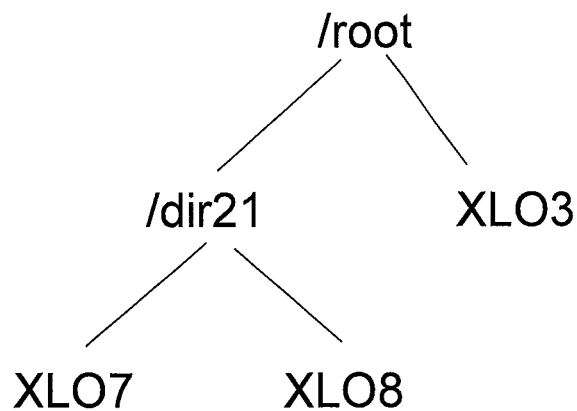

FIG. 5C shows an example of a corresponding virtualized tree structure according to a virtualization path <storage apparatus 300>:/root→<storage apparatus 400>:/root/dir2. Further, it is possible to divide the one single file system of FIG. 4 into two separate file systems according to FIGS. 5B and 5C in case the contents of /dir1 and /dir2 shall be organized in separate file systems managed by the file system management unit 310.

In the above example, the second file system is virtualized in that it is identically rebuilt in the first file system in that each directory of the second file system is created under the similar path in the first file system and each file of the second file system is associated with a respective external link object under the similar path in the first file system. However, in some embodiments, there may be provided additionally implemented mechanisms to ensure that directories and files related to user data in the second file system are virtualized in the first file system, while other file system objects of the second file system, such as for example temporary directories, snapshot directories or other file system objects that behave differently than user-data related file system objects, are not virtualized in the first file system. For example, directories such as temporary directories or snapshot directories of the second file system may not be created in the first file system in such embodiments.

FIG. 6A shows an exemplary flow chart of a method for virtualization initialization. The method comprises a step S1 of blocking all user/client access from clients 100 to the second storage apparatus 300 (in a situation similar to e.g. FIG. 1A) and a step S2 of interconnecting the first storage apparatus 300 between the second storage apparatus 400 and the clients 100.

Furthermore, the method for virtualization initialization comprises a step S3 of creating a highest order directory in the file system managed by the first file system management unit 310 and a step S4 of creating (setting) a virtualization path associating the highest order directory created in step S3 with a highest order directory of the portion of the file system managed by the second file system management unit 410 that is to be virtualized (e.g. the highest order directory or one of the lower directories as illustrated in connection with FIGS. 5A to 5C).

Furthermore, the method for virtualization initialization comprises a step S5 of creating a directory information job for the highest order directory set in step S3. The method further comprises a step S6 of enabling automatic background virtualization and another step S7 of enabling user access dependent on-demand virtualization before directly enabling client access to the first storage apparatus 300 in step S8. It is to be noted that the order of steps S1 to S7 can be interchanged in plural different manners, with the conditions that step S1 is performed before step2, steps S4 and S5 are performed after step S3, steps S6 and S7 are performed after step S4, and step S8 is performed after step S7.

Most importantly, user access to the file system can be enabled (step S8) immediately as soon as the second storage apparatus is interconnected (step S2), a virtualization path is set (step S4) and on-demand virtualization is enabled (step S7). Specifically, as soon as a user tries to access a not-yet-virtualized file system object in the file system, the respective file system object will be virtualized by means of the enabled on-demand virtualization (as exemplarily described in more detail below) so as to allow access to the file system object via the virtualized file system object, and in case the user tries to access an already virtualized file system object, the respective file system object can be accessed via the respective virtualized file system object.

Accordingly, a data storage system according to the above aspect can immediately enable user access to the file system very shortly after interconnecting the first storage apparatus 300 under the condition that a virtualization path has been created and on-demand virtualization has been enabled independent of whether automatic background virtualization (as exemplarily described in more detail below) has yet begun and independent of the status of automatic background virtualization. That is, access to the file system by clients 100 can be enabled again advantageously very shortly after the single interruption for interconnecting the first storage apparatus 300 in between the clients 100 and the second storage apparatus 400.

In the following description, exemplary aspects of automatic background virtualization (enabled in step S6 above) will be described in more detail below. The automatic background virtualization is performed automatically and will lead to a result that the complete file tree structure of the file system(s) managed by the second file system management unit 410 of the second storage apparatus 400 will be virtualized completely (i.e. will be reconstructed completely in the virtualized manner as described in connection with FIGS. 5A to 5C above) on the first storage apparatus 400.

The principle exemplary aspects of automatic background virtualization will be first described in connection with automatically background virtualizing the file tree of FIG. 4. The automatic background virtualization can be performed by the crawling unit 343 and the virtualization unit 344 of FIG. 3 above. And first, the crawling unit 343 will execute the directory information job created in the step S5 above. Specifically, upon execution of step S5, the job queue 346A will contain the directory information job for the highest order directory in the file system managed by the file system management unit 310 according to the virtualization path set in step S4 (e.g. the two respective /root directories in the above example of FIGS. 4 and 5A).

FIG. 6B shows another exemplary flow chart of a method for virtualization initialization.

In FIG. 6B, it is exemplarily assumed that step S2 does not interconnect the first storage apparatus between the second storage apparatus and the clients to temporarily disconnect the connection after the step S1 of blocking user access. Instead, according to some embodiments, it is assumed that the second storage apparatus and the clients remain connected at first for a limited period of time while the first storage apparatus is set up (including steps S2, S3, S4 and/or S5) and interconnected in parallel, but the second storage apparatus still solely stays responsible to handle the access requests (while the access via the first storage apparatus is not yet enabled). That is, in the exemplary method of FIG. 6B the process starts with step S2 of connecting the first storage apparatus to the second storage apparatus (directly or indirectly via a network) and to the clients (directly or indirectly via a network), while the clients are still only enabled to directly access the live file system as managed by the second storage apparatus through the second storage apparatus.

Similar to the method of FIG. 6A, the method of FIG. 6B continues with the steps S3, S4, and S5 of creating the highest order directory (e.g. /root) at the file system of the first storage apparatus (S3), creating the virtualization path which associates the created highest order directory with a selected directory at the file system of the second storage apparatus (S4), and creating the first directory information job for the created highest order directory (S5). It is to be noted that the steps S3, S4 and S5 can be performed in multiple orders or even within a simultaneous operation, and until execution of step S1 of blocking the access to the second storage apparatus, the first storage apparatus does not handle any file system requests because step S8 has not yet been executed. In all preferred embodiments, the step S8 is executed after step S1 in order to prohibit a situation in which clients could access the file system on the second storage apparatus directly and indirectly at the same time. In particular, until step S1 the client access is only possible directly to the second storage apparatus, in between steps S1 and S8 the client access to the file system is not possible and interrupted, and as soon as step S8 is executed (after or simultaneously with one or both of steps S6 and S7) the client access becomes possible and enabled indirectly through the first storage apparatus.

Then, in steps S7 and S6, on-demand virtualization and automatic background virtualization are enabled.

It is to be noted that, in order to be able to enable automatic background virtualization, steps S4 and S5 are required, wherein to be able to enable on-demand virtualization, only step S5 would required and step S5 is optional (because otherwise a first access request of a user would lead to on-demand virtualization of the highest order directory and its child objects).

In the example of FIG. 6B, the access to the second storage apparatus is blocked after steps S3 to S5 are performed, and simultaneously or shortly thereafter the access to the first storage apparatus (to indirectly access the file system managed by the second storage apparatus through the building virtualized file system of the first storage apparatus) can be enabled by steps S6 to S8. Here, the access can be enabled even more quickly than in the exemplary embodiment of FIG. 6A.

In the above, it is to be noted that steps S6 and S7 may be interpreted in some embodiments also as receiving one instruction to virtualize or plural instructions to virtualize, e.g. step S6 may be interpreted in some embodiments as receiving an instruction to start automatic background virtualization, and step S7 may be interpreted in some embodiments as receiving an instruction to start on-demand virtualization.

Figures 7, 8:
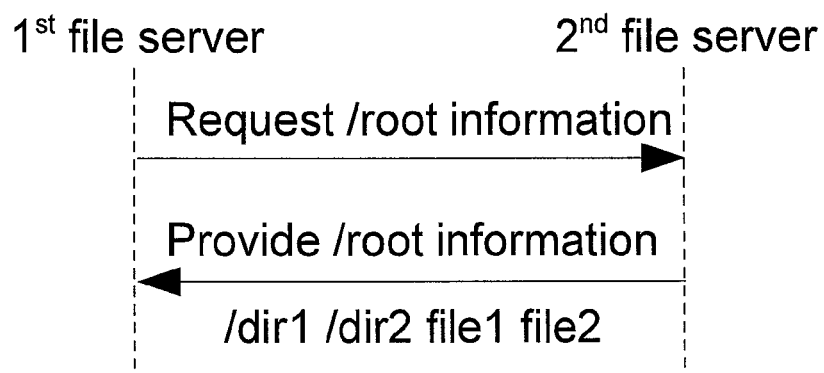
FIG. 7 shows an illustration of information exchange for automatic background virtualization.
FIG. 8 shows an example of a virtualization management information table at a first point of time during virtualization.

FIG. 7 shows an illustration of information exchange between the first and second file system servers (embodying the first and second file system management units 310 and 410) for automatic background virtualization.

Upon executing the directory information job for the /root directory by the crawling unit 343, the first file system management unit 310 will issue a request for /root directory information ("request /root information") in connection with the /root directory of the file system of FIG. 4 (the highest order directory of the file system managed by the second file system management unit 410 as indicated by the set virtualization path, i.e. for the virtualization paths of FIGS. 5B and 5C, the first issued directory information request would already directed to /dir1 and /dir2, respectively) to the second file system management unit 410.

In response to the request for /root directory information, the second file system management unit 410 responds by providing /root directory information including information on the child directories /dir1 and /dir2 and the files "file1" and "file2". Specifically, the response will indicate at least that directories /dir1 and /dir2 and the files "file1" and "file2" exist in the /root directory of the file system managed by the second file system management unit 410.

Upon receipt of the response indicating that directories /dir1 and /dir2 and the files "file1" and "file2" exist in the /root directory of the file system managed by the second file system management unit 410 at the first file system management unit 310, the crawling unit 343 will update the virtualization management information table 341 for registering that it was discovered that directories /dir1 and /dir2 and the files "file1" and "file2" exist in the /root directory of the file system managed by the second file system management unit 410, and that these directories /dir1 and /dir2 and the files "file1" and "file2" need virtualization by the virtualization unit 344.

FIG. 8 shows an example of a virtualization management information table at a first point of time during virtualization after receiving the response of FIG. 7.

Exemplarily, the virtualization management information table includes various information about each file system object which has been discovered by the crawling unit 343 including a name of the file system object as used by the client 100 and the second file system management unit 410, an object type thereof (e.g. indicating whether the file system object is a directory or a file), an object ID thereof as used by the second management file system management unit 410, a virtualization status of the file system object, and an object status of the file system object.

In addition to the above, the virtualization management information table may store further information such as parent directory of the respective file system object, remote path location of the respective file system object, one or more attributes of the respective file system object and so on.

As an "object ID", the virtualization management information table preferably stores an object ID that uniquely identifies the respective file system object in the file system as managed by the second management file system management unit 410. Such object IDs may be represented by or include information on IDs such as file handles, (node numbers, server identifiers, device numbers and the like, and identify uniquely the respective file system object independent of name and remote path location. Such object IDs typically exist in file systems managed by known file system servers because any object needs to be uniquely identified independent of the name and path location (e.g. in case a file is renamed and/or moved from one, particular path location to another path location, the object ID may remain the same while name and/or path location thereof ma change).

Under "virtualization status", the current status of virtualization of the discovered file system object may be indicated, and a newly discovered file system object will be labeled as "needs virtualization" so as to indicate that the file system object needs to be virtualized, i.e. that a corresponding directory needs to be created for a discovered directory and that a corresponding external link object needs to be created for a discovered file.

Once the respective file system object has been virtualized, i.e. when a corresponding directory has been created for a discovered directory or a corresponding external link object has been created for a discovered file, the virtualization status in the virtualization management information table is updated to "virtualized".

In FIG. 8, the /root directory has been created already in step S3 of FIG. 6A above, and is labeled as "virtualized" already with respect to its virtualization status. On the other hand all other discovered file system objects, i.e. directories /dir1 and /dir2 and files "file1" and "file2" have just been discovered and no corresponding virtualized file objects yet exist in the file system as managed by the first file system management unit 310 so that the objects are referred to as having the virtualization status "needs migration".

Under "object status", the current status of the discovered file system object may be indicated, and a newly discovered file is labeled as "needs migration" indicating that no user data (file content) corresponding to the respective file yet exists on the storage units 320 and 330 of the first storage apparatus 300 and that the file needs to be migrated to the first storage apparatus 300 (after migration will be enabled), and a newly discovered directory is labeled as "Incomplete" indicating that not all of the file system objects existing directly below the respective directory have been virtualized yet. It is to be noted that all file system objects (/dir1, /dir2, file1 and file2) that exist in the /root directory according to the tree structure of FIG. 4 have been discovered already, but since these objects have not been virtualized yet, the /root directory remains to be labeled as having the object status "Incomplete".

Once the directories /dir1 and /dir2 have been created in the /root directory of the file system managed by the first file system management unit 310 and the external link objects XLO1 and XLO2 have been created in the /root directory of the file system managed by the first file system management unit 310, the /root directory can be updated to have the object status "Complete" (see below).

It is to be noted that in addition to updating the virtualization management information table as described above after receiving the response of FIG. 7, the crawling unit 343 of the first file system management unit 310 will automatically create virtualization jobs for each of the newly discovered file system objects which can be added to the virtualization job queue 346B to be executed by the virtualization unit 344 (e.g. a virtualization job for /dir1, a virtualization job for /dir2, a virtualization job for file1, and a virtualization job for file2), and will automatically create directory information jobs for each of the newly discovered child directories which can be added to the crawler job queue 346A to be executed by the crawling unit 343 (e.g. a directory information job for /dir1 and a directory information job for /dir2).

Accordingly, virtualization of already discovered file system objects and discovering new file system objects can be performed in a highly efficient manner in parallel to each other in that existing virtualization jobs can be executed by the virtualization unit 344 while further directory information jobs can be executed, in parallel, by the crawling unit 343 for discovering new file system objects and for creating new virtualization jobs and/or directory information jobs for these newly discovered objects.

FIG. 9 shows an example of a partially virtualized file system tree structure. Specifically, once the directories /dir1 and /dir2 have been created in the /root directory of the file system managed by the first file system management unit 310 and the external link objects XLO1 and XLO2 have been created in the /root directory of the file system managed by the first file system management unit 310 by executing all four virtualization jobs created by the crawling unit 343, the tree structure of the file system being managed by the first file system management unit 310 will be as shown in FIG. 9. Because each of the file system objects /dir1, /dir2, file1 and file2 that directly exists below the /root directory as a parent directory have been virtualized according to FIG. 9, the object status of the /root directory can be updated as being "Complete" as indicated in FIG. 10.

In the above example, the number of file system objects existing below the/root directory as a parent directory is rather low, and, in principle, it must be assumed that a large number of file system objects may exist below a certain parent directory, e.g. in some file systems, millions of files and child directories may exist below a certain parent directory. In typical file system communication protocols, standard requests for receiving directory information (such as e.g. READDIR or READDIRPLUS in NFS-based file system communication protocols), the number of entries to be returned in the response may be limited to a maximum number so that not all entries may be known already after issuing a single directory information request. In such scenarios, the crawling unit 343 may repeatedly issue directory information requests to the same parent directory of the file system until all file system objects thereof (child entries including files and child directories) have been returned.

Preferably, in such scenarios as discussed in the above paragraph, the crawling unit 343 may further update the virtualization management information table after each response before issuing the next directory information request in connection with the same parent directory, and/or the crawling unit 343 may already create directory information jobs for each of the child directories discovered so far and/or virtualization jobs for all file system objects discovered in the respective parent directory so far after each response before issuing the next directory information request in connection with the same parent directory.

Furthermore, in order to be able to restart the directory crawling by the crawling unit 343 at a correct crawling start position after an undesirable interruption of the crawling process, the crawling unit 343 preferably further updates the object status of the respective parent directory upon receipt of each response so as to add information indicating the entry position up to which the respective parent directory has been read (which may correspond to a position indicating data item provided by the last response, such as a position indicating cookie).

FIG. 11 shows another illustration of information exchange between the first and second file system management units 310 and 410 for automatic background virtualization. Specifically, as discussed already above, it is assumed that the crawling unit 343 has created a respective directory information job for each of the child directories /dir1 and /dir1 upon receipt of the response of FIG. 7 and upon updating the virtualization management information table as shown in FIG. 8). Next, when returning to the next job in the directory information job queue 346A, the crawling unit 343 will be able to obtain the directory information job for directory /dirt, and will then issue a request for directory information with regard to the /dir1 directory. Specifically, upon executing the directory information job for the /dir1 directory by the crawling unit 343, the first file system management unit 310 will issue the request for /dir1 directory information ("request /dir1 information") in connection with the /dir1 directory of the file system of FIG. 4 as managed by the second file system management unit 410. In response to the request for /dir1 directory information, the second file system management unit 410 responds by providing /dir1 directory information including information on the child directories /dir11 and /dir12. The response may indicate at least that directories /dir11 and /dir12 exist in the /dir1 directory of the file system managed by the second file system management unit 410.

Upon receipt of the response indicating that directories /dir11 and /dir12 exist in the /dir1 directory of the file system managed by the second file system management unit 410 at the first file system management unit 310, the crawling unit 343 will update the virtualization management information table 341 for registering that it was discovered that directories /dir11 and /dir12 exist in the /dir1 directory of the file system managed by the second file system management unit 410, and that these directories /dir11 and /dir12 need virtualization by the virtualization unit 344, please see the correspondingly updated virtualization management information table as shown in FIG. 12.

As shown in FIG. 12, all directories for which not all child entries have been discovered and virtualized are labeled as having the object status "Incomplete", and all non-virtualized file system objects are referred to as having the virtualization status "needs virtualization". Accordingly, in case of interruption of the virtualization procedure, file system virtualization can be reliably and efficiently started at a convenient starting point and does not need to be reset completely, even in the worst case in which all or at least some existing jobs in the job queues may be lost, in that the virtualization procedure may continue, after the undesirable interruption, easily by creating a virtualization job for each file system object indicated as "needs virtualization" in the virtualization management information table 341, and by creating a directory information job for each directory indicated as being "Incomplete" in the virtualization management information table 341.

As exemplarily shown in FIG. 12, the virtualization management information table 341 can be stored in blocks 341a and 341b (which also can be referred to as chunks) of a pre-determined number of file system object entries. In the example of FIG. 12 there are only 5 entry lines per block 341a and 341b but it is to be noted that this is only for explanatory reasons, and the entry number per block may much larger for an actual implementation.

Storing the virtualization management information in blocks (chunks), however, provides the advantage that the separate blocks can be conveniently written from the memory 314 (where the data contents of the virtualization management information table 341 may be stored for purposes of ongoing virtualization processing and updating by the crawling unit 343, the virtualization unit 344 and the migration means 345) to the storage device 315 for backup purposes by the virtualization management information backup unit 342.

Specifically, backup can be performed more efficiently without significantly affecting the ongoing crawling and virtualization or migration processing by the crawling unit 343, the virtualization unit 344 and the migration means 345, in that only the one block to be currently backup-copied to the storage device 315 needs to be temporarily blocked by the virtualization management information backup unit 342, while all other blocks of the virtualization management information table 341 will be read- and write-accessible by the crawling unit 343, the virtualization unit 344 and the migration means 345.

Preferred aspects in connection with backup processing for backup of the virtualization management information table 341 in backup blocks 341a and 341b will be described in more detail further below.

In addition to the above, upon receiving the response of FIG. 11, the crawling unit 343 creates directory information jobs for each of the directories /dir11 and /dir12 to be added to the queue 346A and virtualization jobs for each of the directories /dir11 and /dir12 to be added to the queue 346B.

Once the virtualization jobs for the directories /dir11 and /dir12 will have been executed by the virtualization unit 344, the directories /dir11 and /dir12 will exist directly below the respective parent directory /dir1 in the file system managed by the first file system management unit 310 under the similar local path corresponding to the respective remote path in the file system managed by the second file system management unit 410.

FIG. 13 shows an example of the respective partially virtualized file system tree structure in which the child directories /dir11 and /dir12 of parent directory /dir1 have been created for virtualization.

Complete and reliable automatic background virtualization may be achieved efficiently and reliably by being continued according to the above aspects including parallel loops of executing directory information jobs by the crawling unit 343, updating of the virtualization management information table 341 by the crawling unit 343, creating new directory information jobs and virtualization jobs by the crawling unit 343, executing virtualization jobs by the virtualization unit 344 and so on, until the complete tree structure of the file system managed by the second file system management unit 410 is virtually reconstructed completely in the file system managed by the first file system management unit 310.

That is, the complete tree structure of the file system managed by the second file system management unit 410 is virtually reconstructed completely in the file system managed by the first file system management unit 310, when there exists a corresponding directory in the file system managed by the first file system management unit 310 for each directory of the file system managed by the second file system management unit 410 and when there exists a corresponding external link object in the file system managed by the first file system management unit 310 for each file (or similar object such as hard linked files) of the file system managed by the second file system management unit 410.

While the above description was made with reference to a specific example of a file tree structure as shown in FIG. 4, a more general aspects of a virtualization procedure will be given in connection with the below flow charts.

Figure 14:
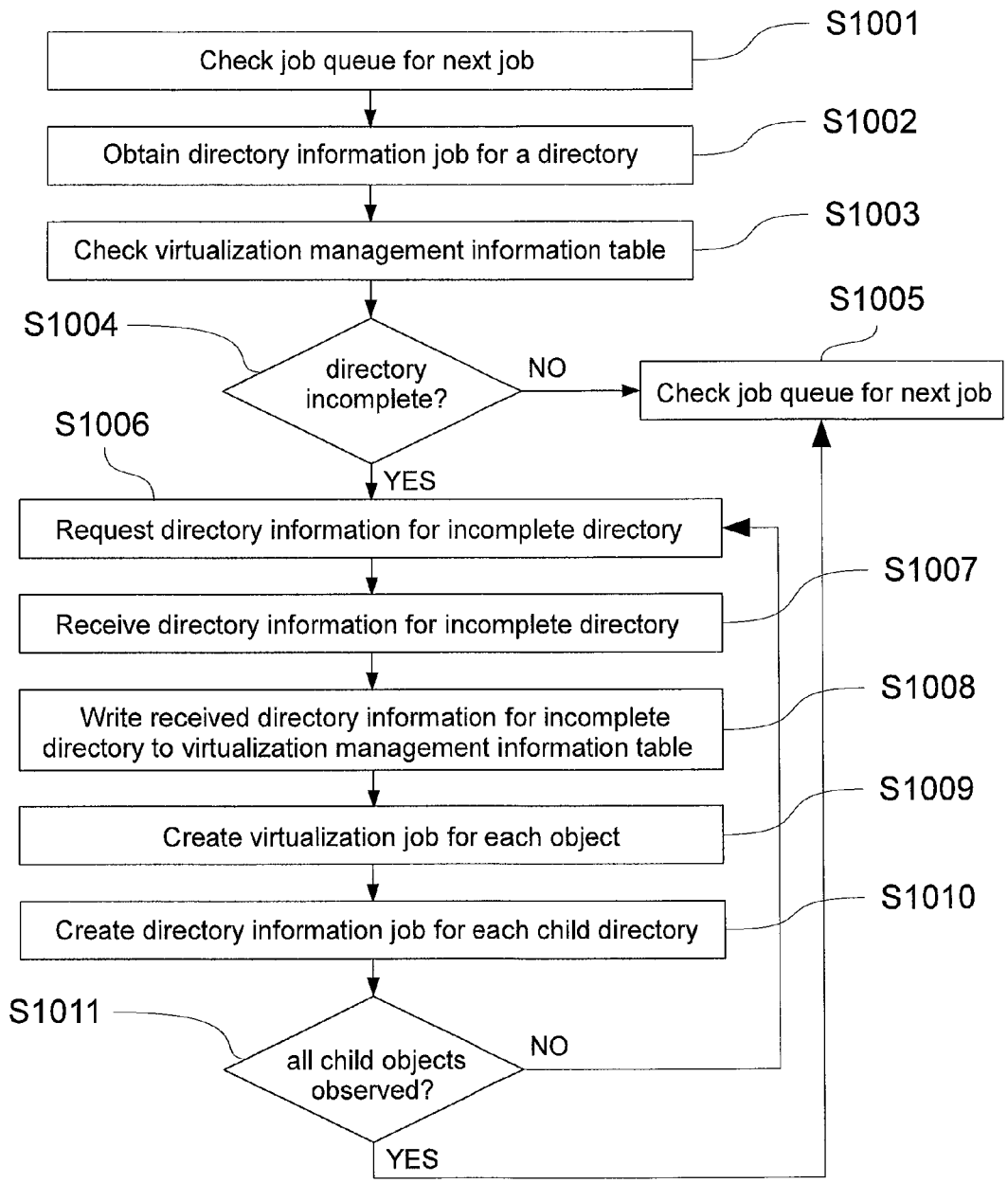
FIG. 14 shows an exemplary flow chart of automatic background virtualization management.

FIG. 14 shows an exemplary flow chart of automatic background virtualization management as may be performed by the crawling unit 343.

The automatic background virtualization management method of FIG. 14 comprises a step S1001 of checking for a next job in the job queue. Specifically, in case multiple job queues are provided as exemplarily shown in FIG. 3, the crawling unit 343 may search for a next directory information job in the job queue 346A. In the next step S1002, the crawling unit 343 can observe a new directory information job for a certain previously discovered directory existing in the file system as managed by the second file system management unit 410 (or in case no child directories have been discovered yet, e.g. at the beginning of the virtualization phase, the crawling unit 343 will at least observe the directory information job created in step S5 of FIG. 6A above).

In the step S1003, the crawling unit 343 checks the virtualization management information table 341 for the target directory of the directory information job obtained in step S1002. Specifically, when the target directory is already present in the virtualization management information table 341, the crawling unit 343 checks the object status of the target directory in the virtualization management information table 341 as to whether the target directory is indicated as being Complete or Incomplete.

If the target directory exists in the virtualization management information table 341 and is already indicated as being Complete (i.e. all child entries have been virtualized already), i.e. when step S1004 returns NO, the crawling unit 343 will check the job queue for a next job in step S1005.

On the other hand, if the target directory is not yet complete (or does not exist yet in the virtualization management information table 341), i.e. when step S1004 returns YES, the crawling unit 343 requests directory information for the target directory in a next step S1006 in that it issues one or more directory information requests in connection with the target directory to the second file system management unit 410 of the second storage apparatus 400.

In step S1007, the corresponding one or more responses from the second file system management unit 410 of the second storage apparatus 400 are received, providing the directory information indicating all or at least of some of the child entries of the target directory.

In the next step S1008, the crawling unit 343 updates the virtualization management information table 341 and writes the received directory information for the target directory to the virtualization management information table 341. Specifically, for each child entry (e.g. an entry indicating a file existing in the target directory or an entry indicating a child directory existing in the target directory) included in the information received in step S1007, a corresponding entry will be added to the virtualization management information table 341 as discussed above, the object status and the virtualization status being indicated according to the type of file system object, i.e. virtualization status "needs virtualization" for each file system object and object status "incomplete" for discovered child directories or object status "needs migration" for discovered files or similar objects such as hard linked files.

Furthermore, the crawling unit 343 creates a respective virtualization job for each of the newly discovered child objects in step S1009 and further creates a respective directory information job for each newly discovered child directory in step S1010, and adds the newly created jobs to the respective job queue or job queues.

If all child objects of the target directory up to the last child object have been observed in step S1007 (step S1011 returns YES), the crawling unit 343 will continue with the next job in the job queue (step S1005), and otherwise steps S1006 to S1010 will be repeated until all child objects of the target directory have been observed. Alternatively to the loop of steps S1006 to S1010, the crawling unit 343 may also just create a new directory information job for the same target directory when step S1011 returns NO and then continue with step S1005, allowing for further parallelization of job execution.

As previously discussed further above, in case the crawling unit 343 did already previously receive directory information for some of the child entries of the respective target directory, e.g. in connection with previous jobs for the same target directory or when repeating steps S1006 to S1010 in a loop after step S1011 returned NO (e.g. due to a limitation in the number of returned child entries according to the used file system communication protocol), the crawling unit 343 may further repeatedly update a start position (e.g. based on a position indicated in the response of step S1007 or by using, for example, a cookie) for the request for directory information for the target directory in the virtualization management information table 341 in step S1008, allowing to request directory information for the next not-yet-discovered child entries by using the start position in the request of step S1006.

Due to new directory information job creation in step S1010, the automatic background virtualization will be performed continuously until all directory information jobs are executed and no further directory information jobs exist, indicating that all directories of the file system have been observed, and all child entries (files and further child directories) have been discovered, so that a respective virtualization job as created in step S1009 exists (or has been already executed) for each of the discovered file system objects.

In parallel to the above procedure, the virtualization unit 344 will automatically execute virtualization jobs created by the crawling unit 343 as discussed further below. However, for very large directories, there may occur a problem when the crawling unit 343 creates a very large number of virtualization jobs in the loop of steps S1006 to S1010, in particular in the repeating of step S1009 for all of the various child objects. It may, therefore, be desirable that the crawling speed of the crawling unit 343 is variable and can be automatically (and/or manually) decreased depending on the conditions.

For example, when it is detected that the data buffer unit 347 for temporarily storing jobs as soon as one or more of the job queues are occupied, becomes occupied itself (e.g. when the number of jobs held in the data buffer unit 347 exceeds a threshold, when the available storage space in the data buffer unit 347 falls below a threshold, or when the ratio of available buffer storage space to the buffer capacity exceeds a threshold, or the like), the processing speed of the crawling unit 343 may be decreased, and the crawling unit 343 may even be stopped until the data buffer unit 347 becomes less occupied (e.g. when the number of jobs held in the data buffer unit 347 falls below another threshold, when the available storage space in the data buffer unit 347 exceeds another threshold, or when the ratio of available buffer storage space to the buffer capacity falls below another threshold, or the like).

Also, when the communication between the storage apparatus 300 and the storage apparatus 400 is realized by a Fibre channel connection having a plurality of parallel Fibre channels, it may be desirable to control the processing speed of the crawling unit 343 based on Fibre channel availability, in that the processing speed of the crawling unit 343 is increased for increasing Fibre channel availability and in that the processing speed of the crawling unit 343 is decreased for decreasing Fibre channel availability (allowing for more efficient connections for communications due to actual user access and on-demand virtualization, and for more efficient connections for communications in connection with virtualization jobs and/or migration jobs). Also, in order to allow for efficient user access, the processing of the crawling unit 343 may be paused in case the Fibre channel availability falls below a threshold in order to avoid delays in user access communications due to limited Fibre channel availability.

Figure 15:
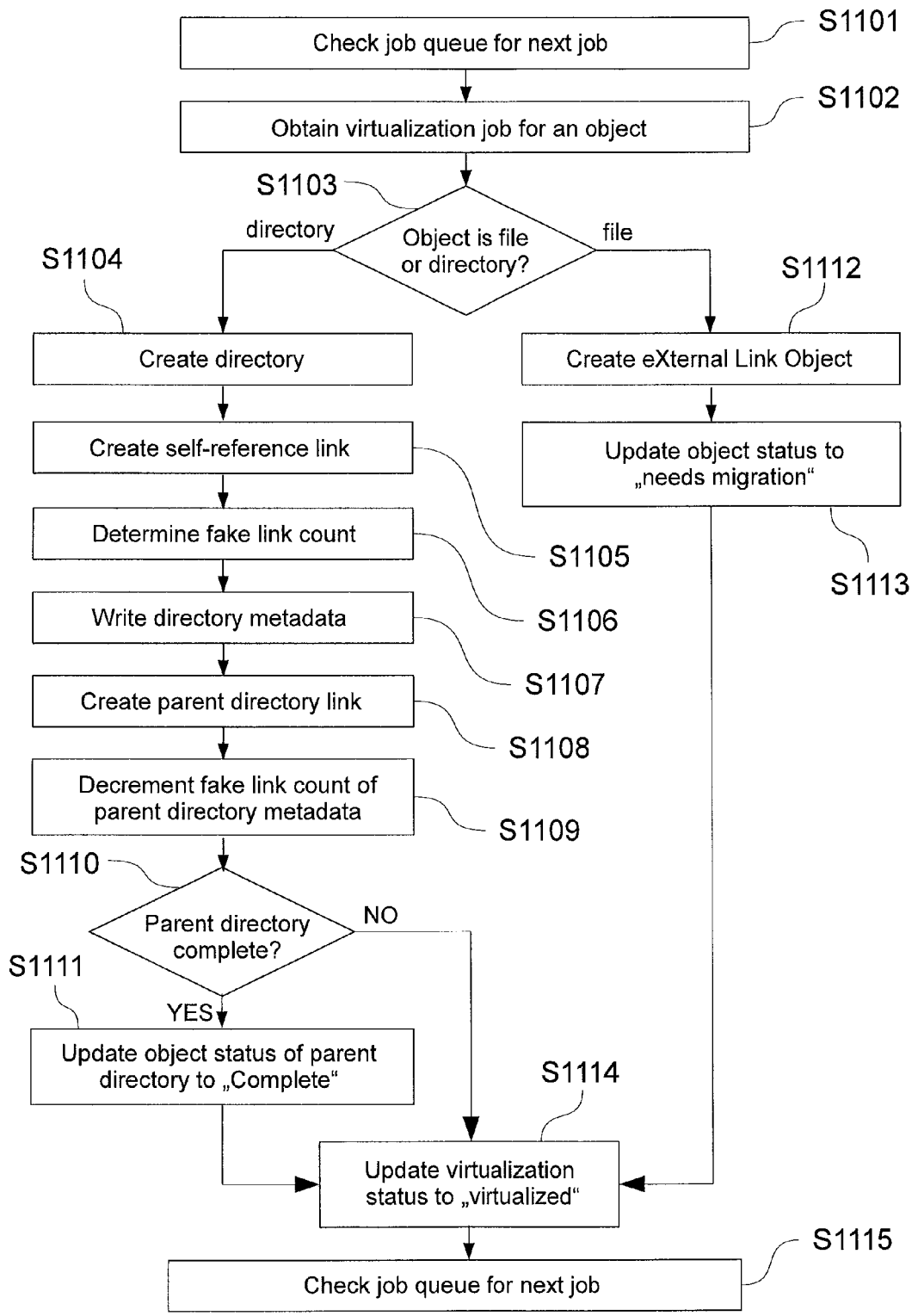
FIG. 15 shows an exemplary flow chart of automatic background virtualization.

FIG. 15 shows an exemplary flow chart of automatic background virtualization as performed by the virtualization unit 344. In a first step S1101, the virtualization unit 344 checks the job queue for a next job, and obtains a virtualization job for a certain file system object in step S1102. If the target file system object of the respective virtualization job is a directory (step S1103 returns directory), the method continues with step S1104, and, if the target file system object of the respective virtualization job is a file (step S1103 returns file), the method continues with step S1112.

For a directory of the file system managed by the second file system management unit 410 to be virtualized, the virtualization unit 344 creates a new directory in the file system managed by the first file system management unit 310 in a local path location within the parent directory, which corresponds to the respective parent directory of the directory to be virtualized within the file system managed by the second file system management unit 410.

The new directory is created with the same name as the directory to be virtualized so as to be able to present the same file tree structure to clients 100. Not creating a virtual directory but already creating true directories even during the virtualization phase has the advantage that a directory corresponding directory can be created in the file system of the first storage apparatus 300 having the identical path tree structure than the file system of the second storage apparatus 400 to be virtualized, and all external link objects of the file system in the first storage apparatus 300 can be stored already in the correct directory tree structure, so that both file systems will have the identical tree structure after virtualization. Also, creating the directories allows to additionally store directory metadata and file metadata already in association with the created directory.

When creating the directory in step S1104 (or already before-hand during steps S1006 and S1007), all directory attributes of the directory to be virtualized are transferred from the second storage apparatus 400 to the first storage apparatus 300, and are stored in association with the newly created directory in the file system as managed by the first file system management unit 310. This has the advantage that user requests directed to attributes of the respective directory can be handled locally by the first file system management unit 310 and do not necessarily require communication with the second storage apparatus 400.

According to some aspects of the invention, it may be desirable to be able to locally return user requests which inquire about the link count of the respective directory after virtualization thereof even during ongoing virtualization. In principle, the real underlying link count of any directory in a typical file system can be calculated/determined as N+2, wherein N is the total number of child directories of the particular directory (the number N can be retrieved from the second file system management unit). The reason is that the parent directory of the particular directory includes, of course, a link to the particular directory and the particular directory itself includes a child entry which represents a self-reference link to the particular directory (sometimes referred to as the on-dot-link or /.), and each of the child directories of the particular directory includes a link to their respective parent directory (sometimes referred to as the double-dot-link or /..).

However, during virtualization phase, when a particular directory is created in the file system managed by the first file system management unit 310, the corresponding child directories in the file system managed by the second file system management unit 410, may not be discovered completely yet by the crawling unit 343 or, if discovered, may not be virtualized yet, so that no corresponding child directories or at least not all of the corresponding child directories may exist yet in the file system managed by the first file system management unit 310.

In order to be able to reliably, efficiently and correctly handle attribute request relating to the link count of a virtualized directory locally on the first storage apparatus 300, when creating a directory during virtualization thereof in step S1104, the method continues (in any possible order) with the optional steps S1105 of creating a self-reference link in the respective directory, S1106 of calculating a fake link count, S1107 of writing directory metadata, S1108 of creating a parent directory link, and S1109 of decrement the fake link count in the metadata of the parent directory by one.

Accordingly, when creating the particular directory in step S1104 in its respective parent directory, the link to the particular directory inside of the parent directory will be automatically created by way of directory creation, and the self-reference link (such as the single-dot-link or /.) will be created in step S1105, leading to a real link count of 2 (because no child directories with parent directory links /.. have been created yet), while the underlying actual link count of the corresponding directory in the file system as managed by the second file system management unit 410 is N+2, N being the number of child directories of the particular directory.

Therefore, a fake link count will be calculated in step S1106 based on the number N of child directories of the particular directory in the file system as managed by the second file system management unit 410, e.g. by requesting the real link count of the particular directory from the second file system management unit 410 and subtracting 2, and is written to the directory metadata in step S1107. Then, when a user requests the link number of the particular directory, the first file system management unit 310 can efficiently handle the request locally without requiring further communication with the second storage apparatus 400 by just adding the real link count as observed on the file system as managed by the first file system management unit 310 and the fake link count as stored in the directory metadata, and by returning the sum of the real link count and the fake link count.

For the above procedure, the fake link count stored in the metadata of a virtualized directory needs to be updated whenever child directories thereof are created for purposes of their own virtualization. That is, in the method of FIG. 15, the virtualization of a directory further includes the steps S1108 of creating the parent directory link in the particular directory (i.e. the double-dot link or /..) and S1109 of decrementing the fake link count as stored in the metadata of the parent directory by one.

For example, in the FIG. 9 above, directory /dir has already been created in the virtualized file system tree structure, and its real link count is 2 (for the self-reference link in /dir1 and the /dir1 link in the /root directory) but the actual link count that needs to be returned to a user inquiring about the link count of directory /dir1 is 4 because the directory /dir in FIG. 4 additionally has two more links, namely, one additional parent directory link /.. from each of the child directories /dir11 and /dir12. Therefore, in FIG. 9, the fake link count of directory /dir1 will be calculated as 2. Once directory /dir11 and the parent directory link /.. therein will be created upon execution of a virtualization job for directory /dir11, the real link count will be 3 and, thus, the fake link count will be decremented by one resulting in 1. Still, the sum of real link count and the fake link count is 4 and returns the correct true link count of the directory /dir1 in FIG. 4.

Once all child directories of a particular directory have been virtualized, the fake link count of the particular directory should have become 0, and if the fake link count of a directory for which no further virtualization jobs exist or a directory which is indicated to have the object status "Complete" is still larger than zero, such situation may indicate about a problem that not all child directories have been discovered, and a directory information job can be created again for the particular directory in order to guarantee the completeness of the virtualized directory.

Vice versa, it is possible to detect whether a directory is complete in that it is checked whether the fake link count of the parent directory of the particular directory as created in step S1104 has become 0, and if step S1110 returns YES, when the parent directory is indicated as being "Incomplete", the virtualization management information table 341 is updated in that the object status of the parent directory is updated to "Complete" (step S1111). Thereafter (or directly after step S1110 returns NO), the virtualization status of the particular directory is updated to "virtualized" in step S1114, and the virtualization unit 344 checks the job queue for the next job (step S1115, corresponding to step S1101).

On the other hand, when step S1103 returns "file" when the object to be virtualized according to the virtualization job of S1102 is a certain file, the virtualization unit 344 creates a respective external link object, referred to as XLO, representing the certain file and allowing access to the certain file of the file system managed by the second file system management unit 410, in the local path location corresponding to the remote path location of the file, i.e. in the virtualized directory that corresponds to the directory of the file system managed by the second file system management unit 410 in which the certain file exists.

On the other hand, instead of steps S1112 and S1113 of FIG. 14 as described above, a more detailed method as described exemplarily with reference to FIG. 16 below may optionally be implemented for file virtualization so as to be able to enable more efficient handling of hard linked files, also referred to as hard links. It is to be noted that "hard links" may refer to a group of files which are associated with the same actual user data.

That is, while each hard link of a group of hard links from the view point of the user(s) has the appearance of an independent file, the hard links potentially having different names and/or different path locations, each hard link points to the same actual user data stored on the storage unit 410. And, if that user data were to be modified, e.g. by writing data to one of the hard linked files, the underlying data were to be modified for all hard links, and, if one or more of the hard links were to be renamed and/or moved to different path locations, other hard links would not recognize such moving or renaming of hard links (which is different for so-called soft links).

When the crawling unit 343 discovers a file which represents one hard link of a group of hard links pointing to the same file data content, the crawling unit 343 still cannot easily discover the other hard links of the group of hard links, but the crawling unit 343 or the virtualization unit 344 can determine the total number of hard links by reading the link count from the file attributes in the metadata for the discovered hard link. Similar to the situation in connection with link counts of directories, it is desirable that the first file system management unit 310 can return link counts of hard links locally upon virtualization of only one of the link counts, and it is desirable to efficiently handle virtualization of hard links.

Figure 16:
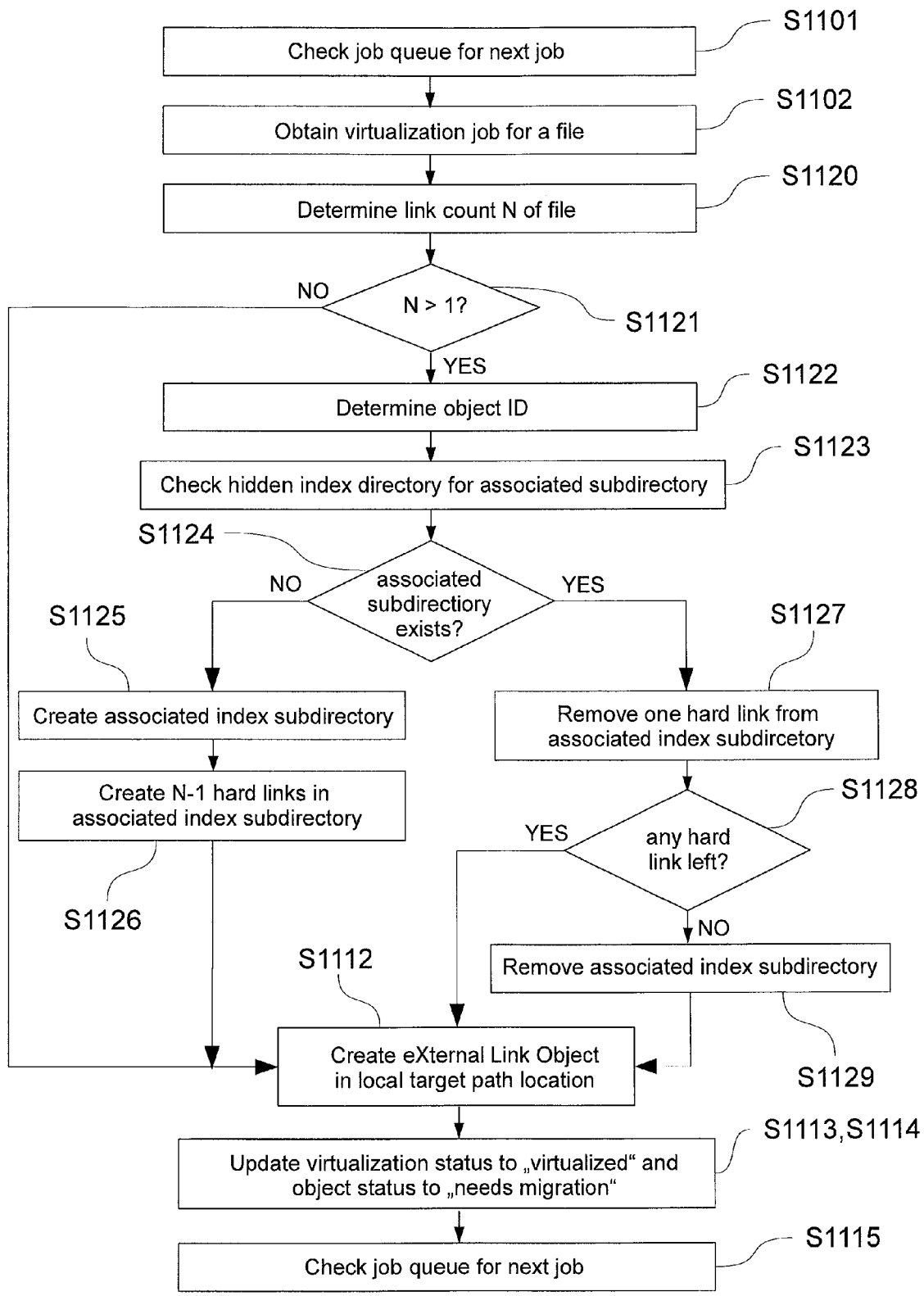
FIG. 16 shows another exemplary flow chart of automatic background migration.

FIG. 16 shows another exemplary flow chart of automatic background migration for more efficiently and reliably handling hard linked files (hard links). Steps S1101, S1102, S1112, S1113, S1114 and S1115 are similar to the steps of the same reference numeral in FIG. 15 as described above.

Upon obtaining the virtualization job for a certain file, the link count N of the file is determined in step S1120 (e.g. by requesting the link count information for the respective file from the second file system management unit 410 or by receiving metadata indicating the link counts of files already with the responses of step S1007 of FIG. 14), and it is checked whether the link count is larger than one (step S1121). When step S1121 returns NO, the method continues similar to the file virtualization of FIG. 15 (i.e. steps S1112, S1113, S1114 and S1115/S1101).

However, when the link count N of the particular file to be virtualized is larger than one (i.e. when there exists at least one other hard link) and step S1121 returns YES, the object ID of the file is determined (step S1122) and a hidden index directory, which has been created previously in the file system managed by the first file system management unit 310, is checked for the existence of a subdirectory which is associated with the object ID of the hard link/file (step S1123).

As will become apparent in the following, the existence of the subdirectory, which is associated with the object ID of the hard link/file in the hidden index directory, would indicate that another hard link of the same group of hard links (having the same object ID but differing names and/or remote path locations) was already discovered previously by the crawling unit 343. On the other hand, if no such associated subdirectory exists in the hidden index directory, this indicates that no other hard link of the same group of hard links was previously discovered.

Accordingly, if no associated subdirectory exists in the hidden index directory, indicating that no other hard link of the same group of hard links was previously discovered, an index subdirectory being associated with the object ID of the discovered hard link (i.e. of the particular file) is created in the hidden index directory in step S1125 and within the created associated index subdirectory, N−1 hard links are created within the associated index subdirectory in step S1126, and the external link object that is created in the local path location corresponding to the remote path location of the file/hard link to be virtualized in step S1112 is created as another hard link of the group of hard links as created in step S1126. Therefore, the actual link count of the external link object created in step S1112 is N−1+1=N and corresponds identically to the underlying actual link count N of the file/hard link to be virtualized.

On the other hand, if it is determined in step S1124 that an index subdirectory being associated with the object ID of the file/hard link to be virtualized already exists in the hidden index directory (step S1124 returns YES), one of the hard links existing in the associated index subdirectory is removed in step S1127 and a corresponding hard linked external link object is created in the local path location corresponding to the remote path location of the file/hard link to be virtualized in step S1112, the hard linked external link object being created as another hard link of the group of hard links of the associated index subdirectory.

By steps S1127 and S1112, the underlying true total link number remains the same in the file system of the first storage apparatus 300, namely, the hard link number N of the corresponding hard link group in the second storage system 400, independent of whether all other hard links have been discovered yet or not.

Instead of separately performing steps S1127 and S1112, the similar effect may be achieved even more efficiently by providing only one single step of a renaming operation in connection with one of the hard links stored in the associated index subdirectory (the renaming operation including changing the name of one hard link and/or moving that hard link from the index subdirectory to the local target path location of the file to be virtualized according to the job of step S1102).

Finally, if no further hard links remain in the index subdirectory after step S1127 or after a renaming operation as discussed above (step S1128 returns NO), the associated index subdirectory may be removed (e.g. deleted) in step S1129.

Figure 17A:
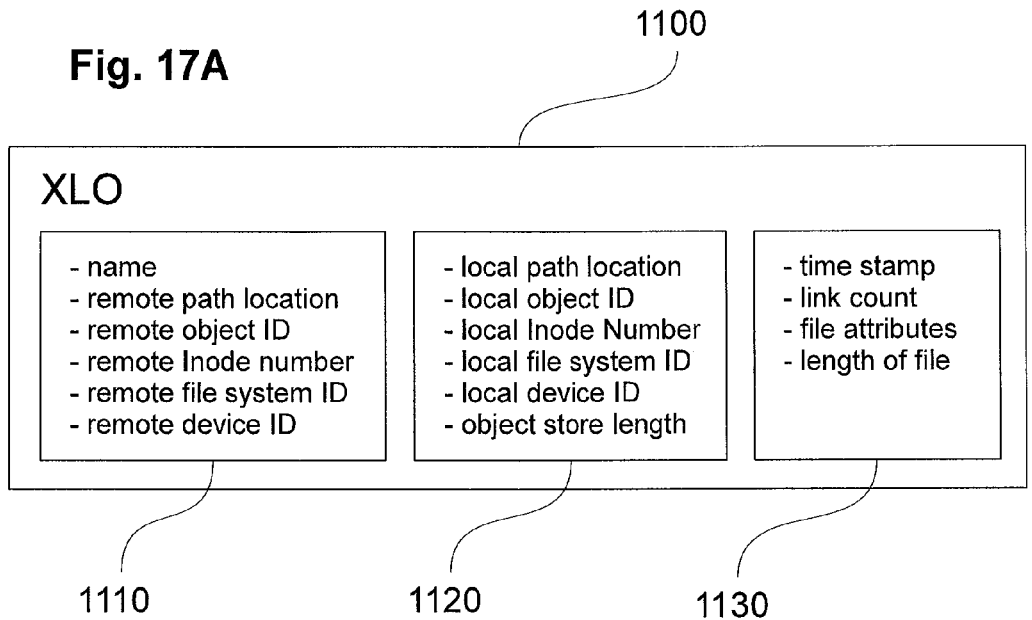
FIG. 17A shows an exemplary schematic data structure of an external link object for a virtualized file.

FIG. 17A shows an exemplary schematic data structure of an external link object 1100 for a file (or hard linked file). The external link object 1100 exemplarily includes a first information section 1110 having metadata on the file regarding the external file system as managed by the second file system management unit 410 including a name as used in the external file system, a remote path location of the file in the external file system, a remote object ID as used in the external file system, a remote Inode number as used in the external file system, a remote file system ID of the external in file system (e.g. in case plural file systems are handled by the second file system management unit 410), and a remote device ID indicating the device of the storage unit 420 in which the file data content is stored.

By referencing the name and the remote path location and/or the remote object ID, the external link object allows access to the file in the external file system, when a user tries to access the file by access request referring to the name and the remote path location and/or the remote object ID as used in the external file system.

The external link object 1100 exemplarily further includes a second information section 1120 having metadata on the file regarding the internal (local) file system as managed by the first file system management unit 310 including a name as used in the local file system, a local path location of the external file object in the internal file system, a local object ID as used in the internal file system, a local (node number as used in the internal file system, a local file system ID of the internal file system (e.g. in case plural file systems are handled by the first file system management unit 310), and a local device ID indicating the device of the storage unit 320 in which the file data content is stored or in which data blocks may be allocated already for later migration of data.

In addition, the second information section 1120 may indicate an object store length corresponding to the size of file content data already stored in the storage unit 420 (i.e. when the object store length of the file corresponds to the length of the file on the external file system, this means that all data of the actual file content has been fully migrated). Before initiating migration, since no actual file content data will be transferred, the object store length will remain to be zero during virtualization.

The external link object 1100 exemplarily further includes a third information section 1130 having metadata on attributes of the file including a current time stamp (indicating time of last modifying access to the file), a link count of the file, a length of the file (in the external file system), and further file attributes. Since file attributes are stored with the external link object in the third information section 1130, attribute requests sent from the users via clients 100 can be conveniently and efficiently handled locally by the first file system management unit 310 as soon as the external link object is created, i.e. as soon as the file is virtualized.

Figure 17B:
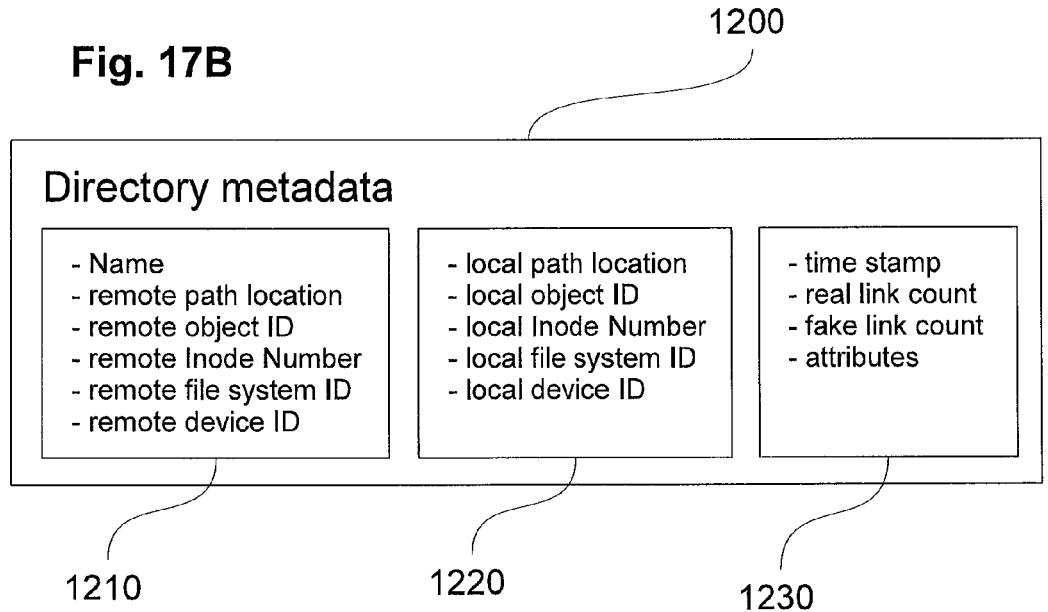
FIG. 17B shows an exemplary schematic data structure of metadata for a virtualized directory.

FIG. 17B shows an exemplary schematic data structure 1200 of metadata for a virtualized directory. The directory metadata 1200 exemplarily includes a first information section 1210 having metadata on the directory regarding the external file system including a name as used in the external file system, a remote path location of the directory in the external file system, a remote object ID as used in the external file system, a remote Inode number as used in the external file system, a remote file system ID of the external file system (e.g. in case plural file systems are handled by the second file system management unit 410), and a remote device ID indicating the device of the storage unit 420 in which the directory is stored.

The directory metadata 1200 exemplarily further includes a second information section 1220 having metadata on the directory regarding the internal (local) file system as managed by the first file system management unit 310 including a name as used in the local file system, a local path location of the directory in the internal file system, a local object ID as used in the internal file system, a local Inode number as used in the internal file system, a local file system ID of the internal file system (e.g. in case plural file systems are handled by the first file system management unit 310), and a local device ID indicating the device of the storage unit 320 in which the directory is stored.

The directory metadata 1200 exemplarily further includes a third information section 1230 having metadata on attributes of the directory including a current time stamp (indicating time of last modifying access to the directory), a real link count of the directory, a fake link count of the directory, and further directory attributes. Since directory attributes are stored with the directory metadata in the third information section 1230, attribute requests sent from the users via clients 100 can be conveniently and efficiently handled locally by the first file system management unit 310 as soon as the directory and its metadata are created, i.e. as soon as the directory is virtualized.

While the above description related to the automatic background virtualization, further preferable aspects of the present invention may relate to automatic on-demand virtualization as described below which may be triggered by receiving access request from a client 100 directed to a certain file system object.

Figure 18A:
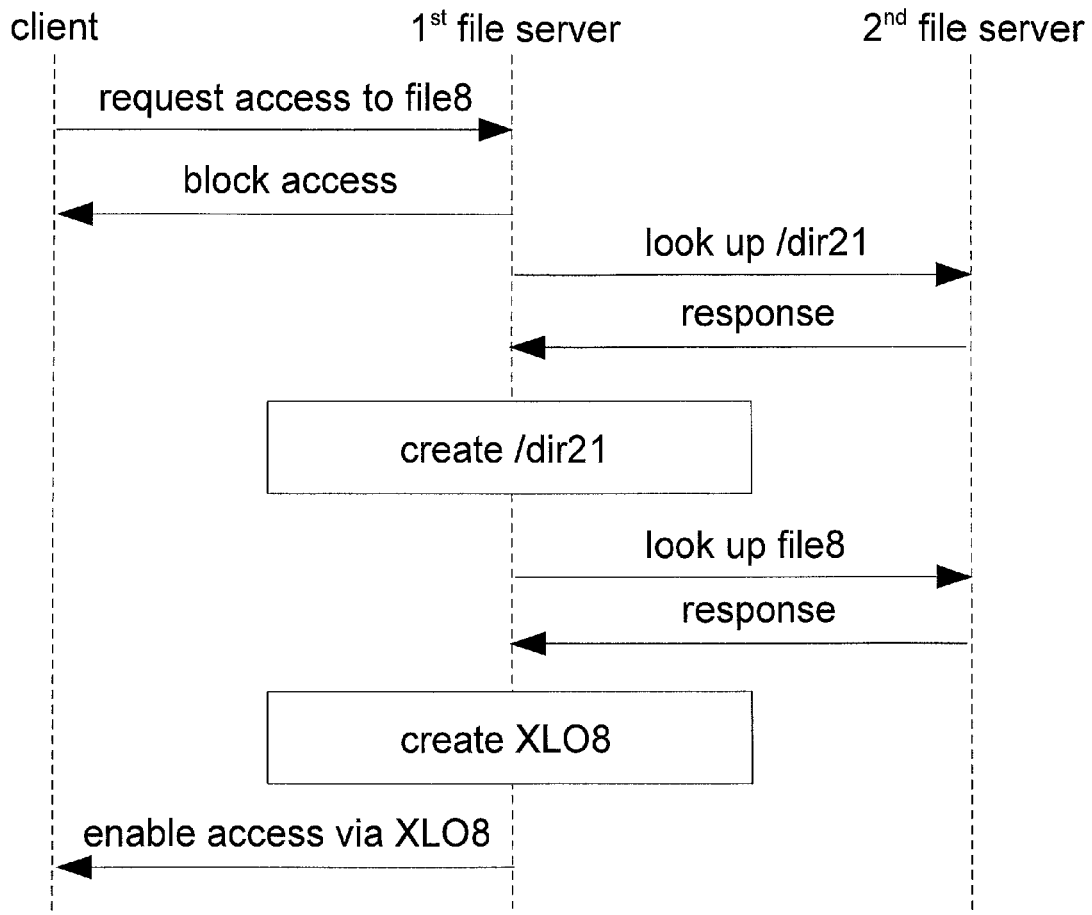
FIG. 18A shows an exemplary illustration of information exchange for on-demand virtualization.

FIG. 18A shows an illustration of information exchange between the first and second file system management units 310 and 410 for on-demand virtualization. For example, when a request is received from a client 100 directed to file8 in a situation of virtualization according to FIG. 13, neither file8 nor the corresponding virtualized external link object XLO8 will exist in the directory /dir21 and /dir21 will not exist either. Therefore, when receiving the access request to file 8, which was not yet virtualized by automatic background virtualization, the first file system management unit 310 will block access to file8 for the client 100 and issue a request for looking up the remote path as indicated by the user (e.g. /root/dir2/dir21/file8).

Since /dir2 was previously discovered and virtualized already during automatic background virtualization, the first file system management unit 310 will issue subsequently requests to the second file system management unit 410 for looking up (e.g. a LOOKUP request in NFS-based file system communication protocols) all remaining unknown file system objects in the remote path of the target file "file8", i.e. it will issue look up requests with respect to directory /dir21 in /dir2 and file8 in /dir21 and wait for the respective responses. Then, once the existence of /dir21 and file8 are confirmed by responses from the second file system management unit 410, the first file system management unit 310 performs user-triggered on-demand virtualization of /dir21 and file8 in that it locally creates /dir21 in the previously virtualized /dir2 and an external link object XLO8 in the newly created /dir21. Thereafter, user access to file8 is enabled immediately via the newly created external link object XLO8, before virtualizing all other remaining file system objects in /dir2 and /dir21.

Figure 19A:
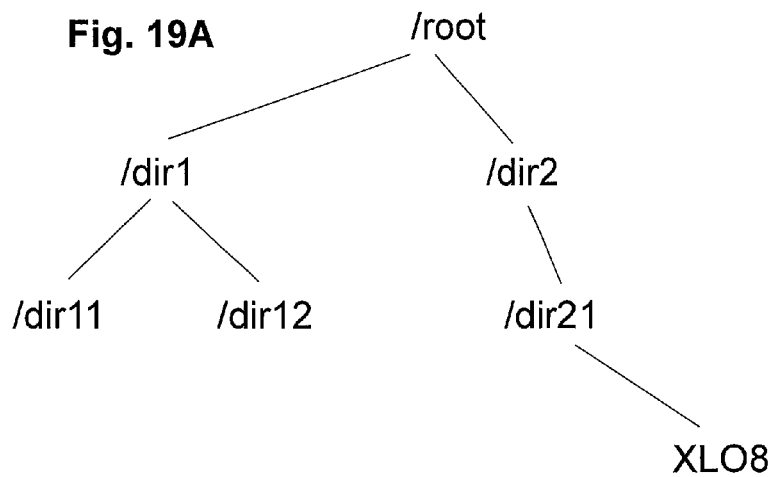
FIG. 19A shows an example of a partially virtualized file system tree structure after on-demand virtualization according to FIG. 18A.

FIG. 19A shows an example of a partially virtualized file system tree structure after on-demand virtualization according to FIG. 18A. Accordingly, the directory /dir21 and the external file system object XLO8 exist in the file system locally managed by the first file system management unit 310.

In the above FIG. 18A, it was exemplarily assumed that the user directly tried to access a remote path (e.g. by typing the exact path \dir2\dir21\file8). However, in Window-based click-control file system management applications (such as e.g. Microsoft Windows or others), the user will rather click on a directory icon (e.g. an icon of /dir2) to see the contents of the directory and then click on a subdirectory icon (e.g. an icon of /dir21) to then see the file8 and click on the file to open the file or the like.

Figure 18B:
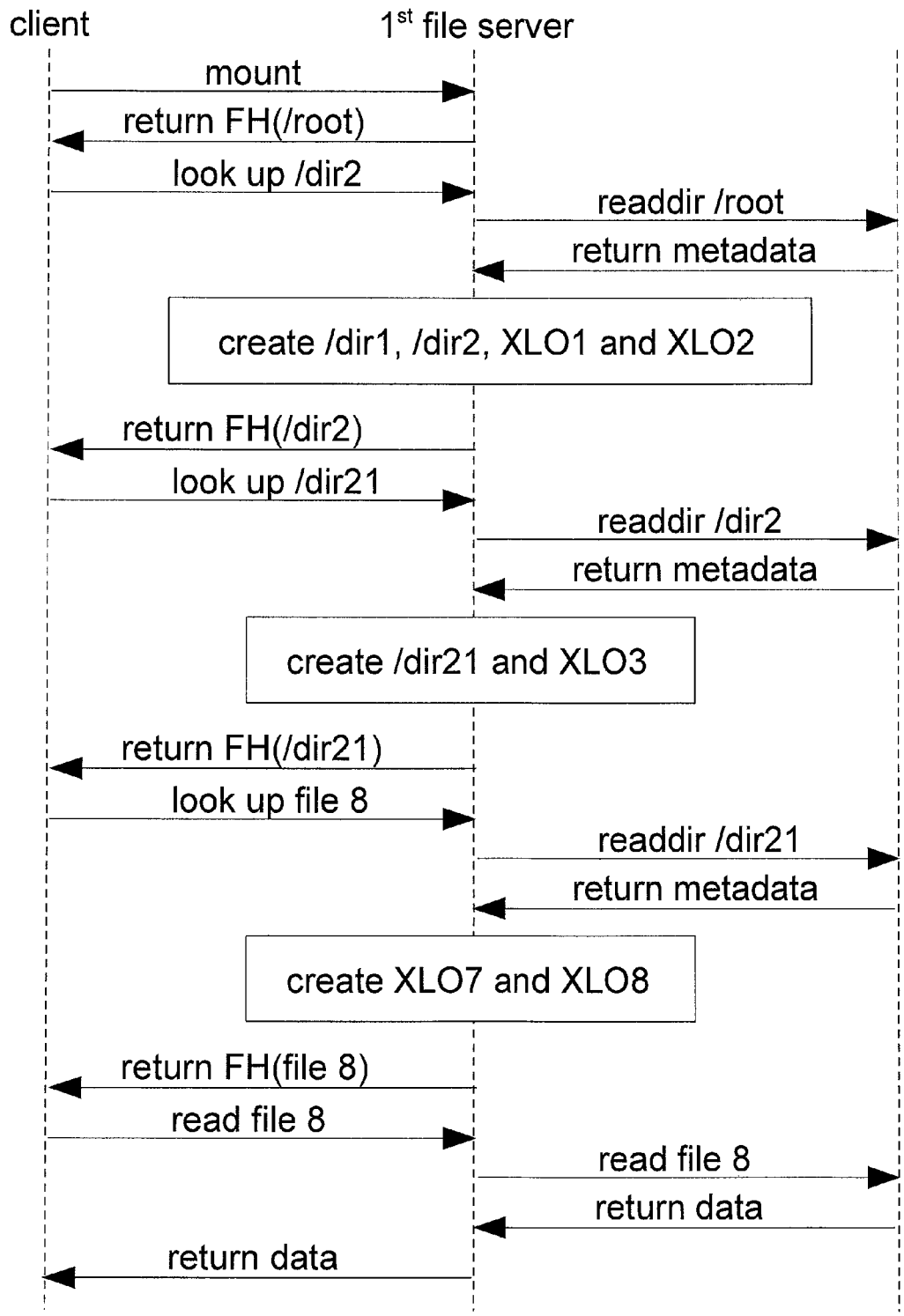
FIG. 18B shows another exemplary illustration of information exchange for on-demand virtualization.
Figure 19B:
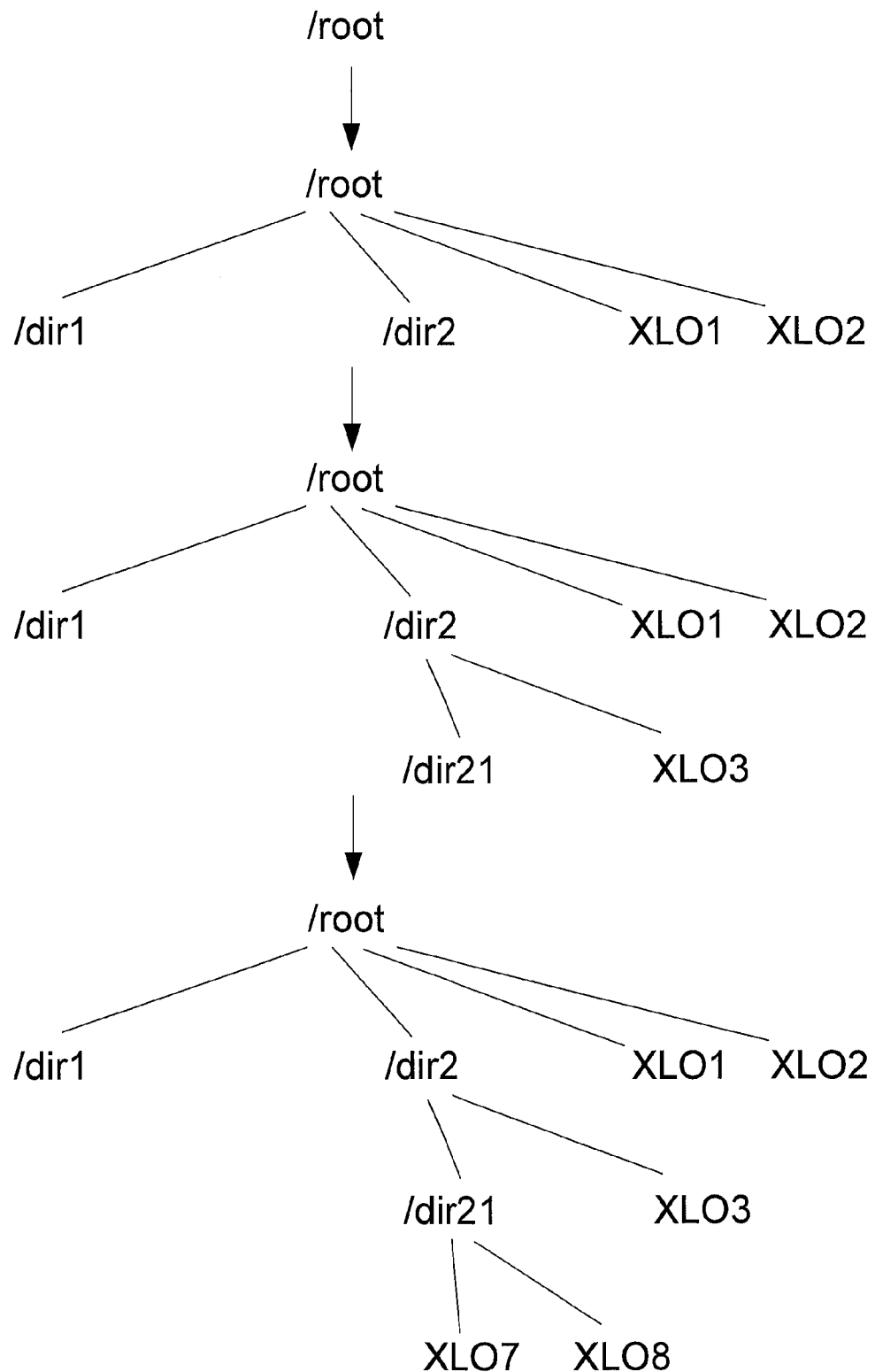
FIG. 19B illustrates an example of building partially virtualized file system tree structure during and after on-demand virtualization according to FIG. 18B.

FIG. 18B exemplarily shows a flow of operations in such scenario, in which the user does not actually access the full remote path but accesses the remote path layer by layer, e.g. by clicking on the respective icons. FIG. 19B illustrates an example of building partially virtualized file system tree structure during and after on-demand virtualization according to FIG. 18B.

In FIG. 18B, it is exemplarily assumed that the user tries to access, at the end, the file8 in the remote path \dir2\dir21\file8 (similar to FIG. 18A), and at the beginning of the operation, it is assumed that only the /root directory exists in the file system at the first file server (please see the upper situation in FIG. 19B), i.e. no background virtualization has been executed yet. At first, the user mounts the file system and the first file system management unit 310 returns the file handle of the /root directory (referred to as FH(/root)). Since the /root directory has been virtualized already, it already has the metadata indicating its child objects, even though none of the child objects are virtualized yet (i.e. the /root directory is actually empty).

The user therefore can see all the child objects of the /root directory and can issue a LOOKUP request directed to the child directory /dir2.

In response to the LOOKUP request directed to the child directory /dir2, since the child objects of the /root directory including /dir2 are not yet virtualized, the on-demand virtualization activates to virtualize the child objects of the /root directory (e.g. similar to a directory information job of the automatic background virtualization), and one or more READDDIR requests (or READDIRplus requests) directed to the /root directory of the file system managed by the second file system management unit 410 are issued from the first file system management unit 310 to the second file system management unit 410, which returns the corresponding metadata.

Then, the on-demand virtualization process creates the child objects of the /root directory at the file system managed by the first file system management unit 310, i.e. in the present example the directories /dir1 and /dir2 are created and the eXternal Link Objects XLO1 and XLO2 for files 1 and 2 are created (see e.g. second row of FIG. 19B). During this time, the access from the client is held off, but as soon as the directory /dir2 is created, the first file system management unit 310 is enabled to respond to the LOOKUP request directed to directory /dir2 and returns the file handle of directory /dir2 to the client (referred to as FH(/dir2)).

The user therefore can see the child objects of the /dir2 directory and can issue a LOOKUP request directed to the child directory /dir21.

In response to the LOOKUP request directed to the child directory /dir21, since the child objects of the /dir2 directory including /dir21 are not yet virtualized, the on-demand virtualization activates to virtualize the child objects of the /dir2 directory (e.g. similar to a directory information job of the automatic background virtualization), and one or more READDDIR requests (or READDIRplus requests) directed to the /dir2 directory of the file system managed by the second file system management unit 410 are issued from the first file system management unit 310 to the second file system management unit 410, which returns the corresponding metadata.

Then, the on-demand virtualization process creates the child objects of the /dir2 directory at the file system managed by the first file system management unit 310, i.e. in the present example the directory /dir21 and the eXternal Link Object XLO3 and for file3 is created (see e.g. third row of FIG. 19B). During this time, the access from the client is held off, but as soon as the directory /dir21 is created, the first file system management unit 310 is enabled to respond to the LOOKUP request directed to directory /dir21 and returns the file handle of directory /dir21 to the client (referred to as FH(/dir21)).

The user therefore can see the child objects of the /dir21 directory and can issue a LOOKUP request directed to the file8 that is desired to be accessed.

In response to the LOOKUP request directed to the file8, since the child objects of the /dir21 directory including file8/XLO8 are not yet virtualized, the on-demand virtualization activates to virtualize the child objects of the /dir21 directory (e.g. similar to a directory information job of the automatic background virtualization), and one or more READDDIR requests (or READDIRplus requests) directed to the /dir21 directory of the file system managed by the second file system management unit 410 are issued from the first file system management unit 310 to the second file system management unit 410, which returns the corresponding metadata.

Then, the on-demand virtualization process creates the child objects of the /dir21 directory at the file system managed by the first file system management unit 310, i.e. in the present example the eXternal Link Objects XLO7 and XLO8 for files 7 and 8 are created (see e.g. fourth row of FIG. 19B). During this time, the access from the client is held off, but as soon as the XLO8 is created, the first file system management unit 310 is enabled to respond to the LOOKUP request directed to file8 and returns the file handle of file8 to the client (referred to as FH(file8)).

Then, based on the retrieved file handle FH(file8), the client can access file 8, e.g. by issuing a read request directed to file 8, which is passed through by XLO8 from the first file system management unit 310 as a request to read file 8 to the second file system management unit 410, which returns the data. The first file system management unit 310 then returns the received data and sends it to the client in response to the read request. In addition, the first file system management unit 310 may update the metadata of XLO8 (e.g. update the last access time thereof). Other access requests may be handled as discussed in connection with the multiple FIGS. 25 and 26 further below.

FIG. 20A shows an exemplary flow chart of a method for enabling user file access during virtualization (including on-demand virtualization, if the target file has not yet been virtualized).

When an access request is received from a user via a client 100 directed to a particular target file in the file system in step S2001, the first file system management unit 310 checks the virtualization management information table 341 as to whether the target file has been virtualized yet (step S2002). If step S2002 returns YES, user access to the target file in the file system is immediately enabled through the external link object corresponding to the target file (step S2008).

On the other hand, in case the target file has not yet been virtualized (step S2002 returns NO), the first file system management unit 310 will look up the target file in the remote path of the target file as indicated in the access request received in step S2001. If the existence of the target file (or any of the directories of the remote path) is not confirmed by the second file system management unit 410 (e.g. when the user has provided an incorrect remote path) and step S2004 returns NO, an I/O error is returned to the client 100 which sent the access request.

If the existence of the target file is confirmed by the second file system management unit 410 by response to the look up request(s) of step S2003 (step S2004 returns YES), the first file system management unit 310 will create virtualization jobs for each of the non-virtualized objects of the remote path (i.e. for all non-virtualized directories in the remote path and for the target file) in step S2006. In further preferred aspects, the first file system management unit 310 may additionally create directory information jobs for each of the non-virtualized directories of the remote path. And the above-mentioned jobs may be added ad-hoc to the same job queue(s) as used for the automatic background virtualization as mentioned above.

Once all previously non-virtualized objects of the remote path, including the target file, have been virtualized (step S2007 returns YES), the user access to the target file in the file system is enabled through the external link object corresponding to the target file (step S2008).

Exemplarily, there may occur a situation in which a delete request is received which is directed to a file (or to a directory) that has not yet been virtualized. In exemplary embodiments, the delete request may just be passed through to be performed only at the file system as managed by the second file system management unit 410. However, in preferred embodiments, such delete request directed to a file (or directory) which has not yet been virtualized is still executed at both systems in that the file (or directory) is first virtualized by creating the corresponding XLO (or virtualized directory) in the file system as managed by the first file system management unit 310, and then deleting the file (or directory) in the file system as managed by the second file system management unit 410 before finally deleting the XLO (or virtual directory) in the file system as managed by the first file system management unit 310.

FIG. 20B shows an exemplary flow chart of a method for enabling user file access during virtualization (including on-demand virtualization, if the target file has not yet been virtualized), however in connection with a "lookup request" similar to FIG. 18B above. It is assumed that the parent directory of the file has been virtualized already by on-demand virtualization or automatic background virtualization.

When a lookup request is received from a user via a client 100 directed to a particular target file in the parent directory in the file system in step S2001', the first file system management unit 310 checks the virtualization management information table 341 as to whether the target file has been virtualized yet (step S2002). If step S2002 returns YES, the file handle of the target file in the file system is immediately returned in response to the lookup request by using the metadata stored in the external link object corresponding to the target file (step S2008').

On the other hand, in case the target file has not yet been virtualized (step S2002 returns NO), the first file system management unit 310 will issue a READDIR request (or READDIRplus request) directed to the parent directory of the target file. If the existence of the target file (or any of the directories of the remote path) is not confirmed by the second file system management unit 410 (e.g. when the target file does not exist in the parent directory) and step S2004 returns NO, an I/O error is returned to the client 100 which sent the lookup request.

If the existence of the target file can be confirmed, (step S2004 returns YES), the first file system management unit 310 will create virtualization jobs for each of the non-virtualized objects of the parent directory (i.e. for all non-virtualized object in the parent directory including the target file) in step S2006. Alternatively, in some embodiments, the first file system management unit 310 will create virtualization jobs for each of the non-virtualized objects of the parent directory (i.e. for all non-virtualized object in the parent directory), even if step S2004 returns NO. In further preferred aspects, the first file system management unit 310 may additionally create directory information jobs for each of the non-virtualized child directories of the parent directory. And the above-mentioned jobs may be added ad-hoc to the same job queue(s) as used for the automatic background virtualization as mentioned above.

Once all previously non-virtualized child objects of the parent directory, including the target file, have been virtualized (step S2007 returns YES), the file handle of the target file is returned in response to the lookup request based on metadata retrieved from the external link object corresponding to the target file (step S2008').

FIG. 21 shows an exemplary flow chart of a method for enabling attributes access during virtualization (including on-demand virtualization, if the target object has not yet been virtualized).

When an attribute information request is received from a user via a client 100 directed to a particular file system object in the file system in step S2101, the first file system management unit 310 checks the virtualization management information table 341 as to whether the target object has been virtualized yet (step S2102). If step S2102 returns YES, the request is handled locally and the requested attribute information is returned based on attribute information stored in connection with the external link object or the directory metadata (step S2108).

On the other hand, in case the target object has not yet been virtualized (step S2102 returns NO), the first file system management unit 310 will look up the target object in the remote path of the target object as indicated in the attribute information request received in step S2101. If the existence of the target object (or any of the directories of the remote path) is not confirmed by the second file system management unit 410 (e.g. when the user has provided an incorrect remote path) and step S2104 returns NO, an error is returned to the client 100 which sent the request.

If the existence of the target object is confirmed by the second file system management unit 410 by response to the look up request(s) of step S2103 (step S2104 returns YES), the first file system management unit 310 will create virtualization jobs for each of the non-virtualized objects of the remote path in step S2106. In further preferred aspects, the first file system management unit 310 may additionally create directory information jobs for each of the non-virtualized directories of the remote path. And the above-mentioned jobs may be added ad-hoc to the same job queue(s) as used for the automatic background virtualization as mentioned above.

Once all previously non-virtualized objects of the remote path, including the target object, have been virtualized (step S2107 returns YES), the request is handled locally and the requested attribute information is returned based on attribute information stored in connection with the external link object or the directory metadata (step S2108).

Figure 22A:
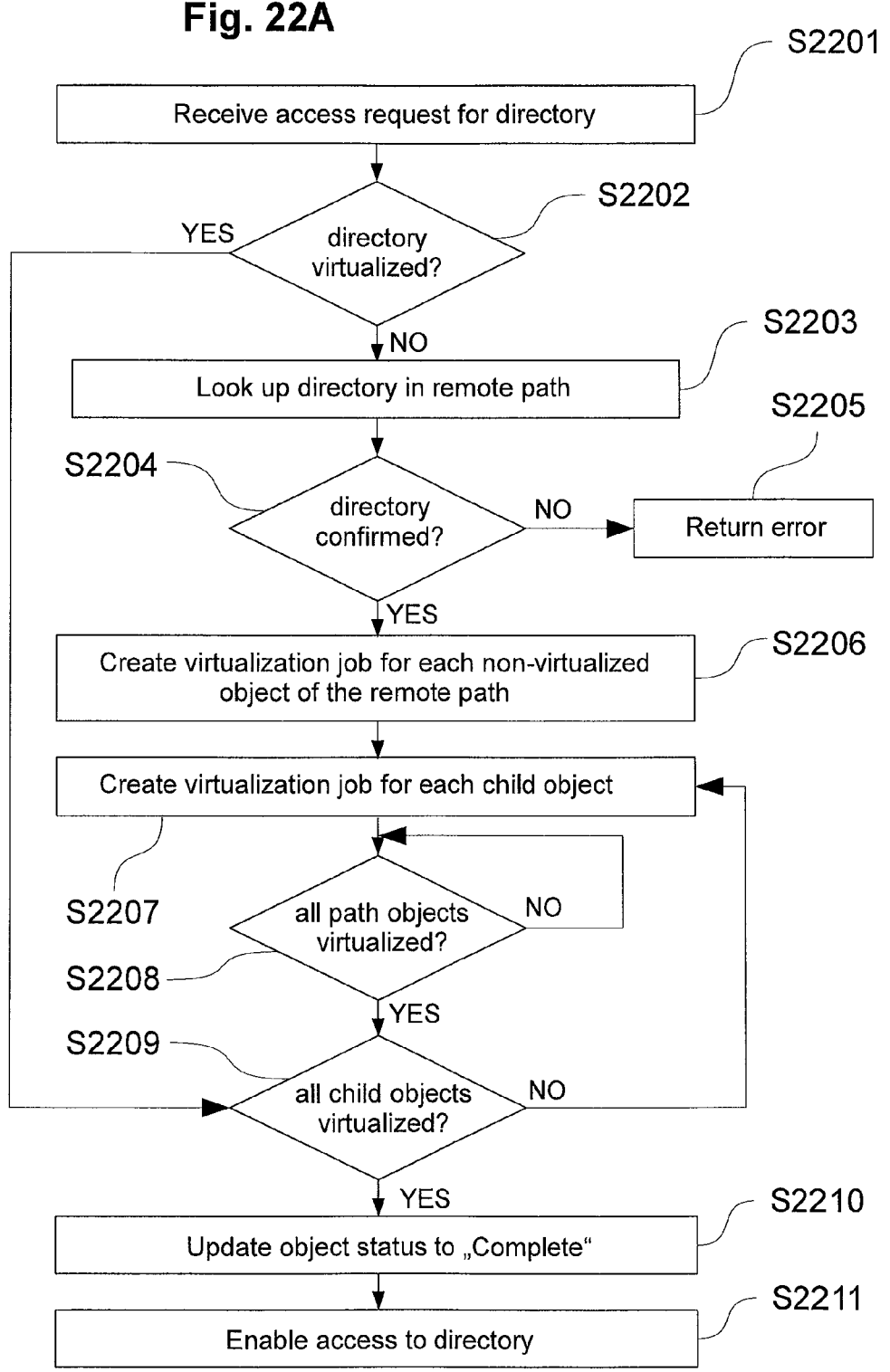
FIG. 22A shows an exemplary flow chart of a method for enabling user directory access during virtualization.

FIG. 22A shows an exemplary flow chart of a method for enabling user directory access during virtualization (including on-demand virtualization, if the target directory has not yet been virtualized).

When an access request is received from a user via a client 100 directed to a particular target directory in the file system in step S2201, the first file system management unit 310 checks the virtualization management information table 341 as to whether the target directory has been virtualized yet (step S2202). If step S2202 returns YES, the method continues with step S2209 according to this exemplary aspect (described further below).

On the other hand, in case the target directory has not yet been virtualized (step S2202 returns NO), the first file system management unit 310 will look up the target directory in the remote path of the target directory as indicated in the access request received in step S2201. If the existence of the target directory (or any of the directories of the remote path) is not confirmed by the second file system management unit 410 (e.g. when the user has provided an incorrect remote path) and step S2204 returns NO, an I/O error is returned to the client 100 which sent the access request.

If the existence of the target directory is confirmed by the second file system management unit 410 by response to the look up request(s) of step S2203 (step S2204 returns YES), the first file system management unit 310 will create virtualization jobs for each of the non-virtualized objects of the remote path (i.e. for all non-virtualized directories in the remote path) in step S2206. According to this exemplary aspect, the method continues with step S2207 of additionally create virtualization jobs for each of the child objects of the target directory (including all child directories of the target directory and all files contained in the target directory).

In further preferred aspects, the first file system management unit 310 may additionally create directory information jobs for each of the non-virtualized directories of the remote path and/or directory information jobs for each of the child directories of the target directory. And the above-mentioned jobs may be added ad-hoc to the same job queue(s) as used for the automatic background virtualization as mentioned above.

Once all previously non-virtualized objects of the remote path, including the target directory, have been virtualized (step S2208 returns YES), and all child directories of the target directory have been virtualized (step S2209 returns YES), the method goes to step S2210 and updates the object status of the target directory to "Complete". Thereafter, client access to the target directory is enabled in step S2211.

However, if step S2209 returns NO (e.g. when not all jobs created in step S2207 have been yet executed, or in case the method went from step S2202 to S2209), the method waits or may even return to step S2207 for precautionary reasons. On the other hand, in some embodiments, if step S2209 returns NO, the method may just wait because the virtualization jobs have been previously created in step S2209 or upon virtualization of the target directory according to step S1009 of the automatic background migration, when step S2202 returns YES.

In the above, while it may be desirable to have virtualized all child directories of the target directory before enabling user access to the target directory (because all lookup and directory information requests from the user can be conveniently handled locally), such method may lead to undesirable delays for target directories having a large number of child entries.

In order to avoid such undesirable delays for target directories having a large number of child entries, another alternative method may be provided in which the child directories of the target directory are not necessarily virtualized before enabling user access to the target directory. Accordingly, FIG. 22B shows an alternative exemplary flow chart of a method for enabling user directory access during virtualization. Steps S2201, S2202, S2203, S2204, S2205, S2206, S2207, S2208, and S2211 are the same as in FIG. 22A described above, however, steps S2209 and S2210 are omitted.

Accordingly, even for target directories having a large number of child entries (such as millions of entries), user access to the target directory can be enabled without any undesirable delays due to virtualization of the large number of child entries immediately upon virtualization of the target directory. Still, due to step S2207, background migration of the child entries will be ongoing.

Regarding directory information requests sent from the user, it needs to be determined whether the request can be handled locally or needs to be passed through to the second storage apparatus 300. For example, when a file system communication protocol used does limit the number of child entries that are returned in response to a directory information request to a maximum number M so that a list of M child entries is typically returned in response to a directory information request, and the request does not indicate any start position, the request needs to respond by a list of the first M child entries, and it can be handled locally if already at least the first M child objects have been virtualized yet.

If less than M child objects of the target directory have been virtualized yet, the request must be passed through to the second file system management unit 410, and the response of the second file system management unit 410 is returned to the requesting client 100. Similarly, when the directory information request indicates a start position (e.g. indicating that the list of returned entries shall start with a P-th child entry), and the request can be handled locally if already at least the first M+P child objects have been virtualized yet, and otherwise the request needs to be passed through.

FIG. 22C shows an exemplary flow chart of a method for enabling user directory access during virtualization in embodiments similar to FIG. 22A, however (in contrast to FIG. 22A) exemplarily in connection with a lookup request directed to a target directory (similar to the situation in FIG. 18B above) which is located in a parent directory that has been virtualized already.

When an lookup request is received from a user via a client 100 directed to a particular target directory as a child directory in a virtualized parent directory of the file system in step S2201', the first file system management unit 310 checks the virtualization management information table 341 as to whether the target directory has been virtualized yet (step S2202). If step S2202 returns YES, the method continues with step S2209 according to this exemplary aspect (described further below).

On the other hand, in case the target directory has not yet been virtualized (step S2202 returns NO), the first file system management unit 310 will exemplarily issue one or more READDIR requests (or one or more READDIRplus) requests directed to the parent directory of the target directory as indicated in the lookup request received in step S2201'. If the existence of the target directory cannot be confirmed on the basis of the metadata returned from the second file system management unit 410 and step S2204 returns NO, an I/O error is returned to the client 100 which sent the access request (step S2205).

If the existence of the target directory can be confirmed on the basis of the metadata returned from the second file system management unit 410 in response to the READDIR request(s) of step S2203' (step S2204 returns YES), the first file system management unit 310 will create virtualization jobs for each of the non-virtualized child objects of parent directory in step S2206'. In some embodiments, the first file system management unit 310 can create virtualization jobs for each of the non-virtualized child objects of parent directory in step S2206' even if step S2204 returns NO.

According to this exemplary aspect, the method continues with step S2207 of additionally creating virtualization jobs for each of the child objects of the target directory (including all child directories of the target directory and all files contained in the target directory).

In further preferred aspects, the first file system management unit 310 may additionally create directory information jobs for each of the non-virtualized child directories of the parent directory and/or directory information jobs for each of the child directories of the target directory. And the above-mentioned jobs may be added ad-hoc to the same job queue(s) as used for the automatic background virtualization as mentioned above.

Once all previously non-virtualized child objects of the parent directory, including the target directory, have been virtualized (step S2208' returns YES), and all child directories of the target directory have been virtualized (step S2209 returns YES), the method goes to step S2210 and updates the object status of the target directory to "Complete". Thereafter, the file handle of the target directory is returned to the client in step S2211' in response to the lookup request of step S2201'.

However, if step S2209 returns NO (e.g. when not all jobs created in step S2207 have been yet executed, or in case the method went from step S2202 to S2209), the method waits or may even return to step S2207 for precautionary reasons. On the other hand, if step S2209 returns NO, the method may just wait because the virtualization jobs have been previously created in step S2209 or upon virtualization of the target directory according to step S1009 of the automatic background migration, when step S2202 returns YES.

FIG. 22D shows an exemplary flow chart of a method for enabling user directory access during virtualization in embodiments similar to FIG. 22B, however (in contrast to FIG. 22B) exemplarily in connection with a lookup request directed to a target directory (similar to the situation in FIG. 18B above) which is located in a parent directory that has been virtualized already. Steps S2201', S2202, S2203', S2204, S2205, S2206', S2207, S2208', and S2211' are the same as in FIG. 22C described above, however, steps S2209 and S2210 are omitted.

Figure 23:
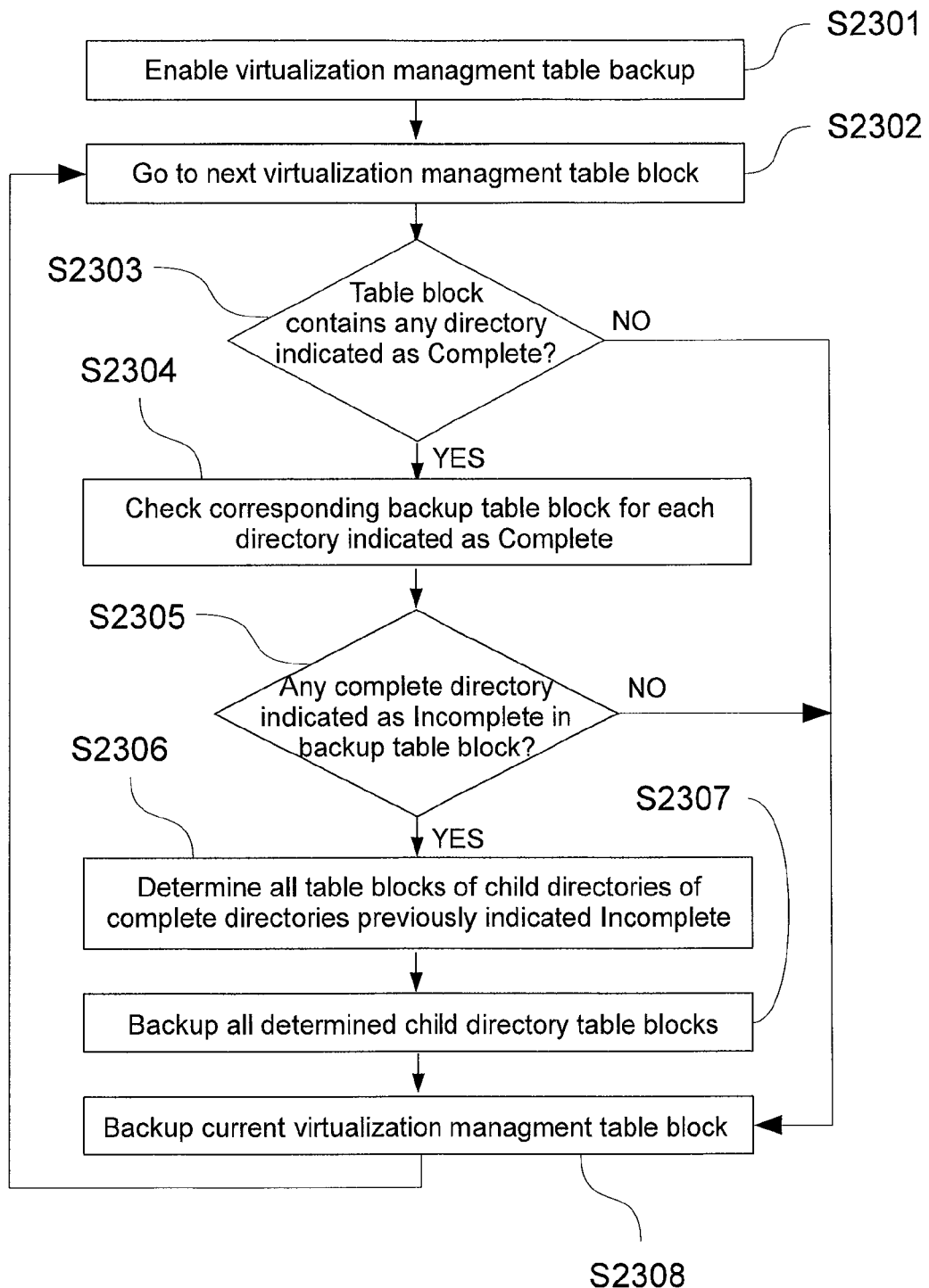
FIG. 23 shows an exemplary flow chart of a method for virtualization management table backup.

FIG. 23 shows an exemplary flow chart of a method for virtualization management table backup. As described above, the virtualization management information table 341 is stored in blocks (chunks) 341a to 341d of a predetermined size (i.e. having a certain number of entry lines).

During virtualization (and/or migration) processing, the virtualization management information table 341 will be held in the memory 314, but the virtualization management information backup unit 342 is adapted to repeatedly or even periodically perform creating backup copies of the virtualization management information table 341 and copying the created backup copies to the storage device 315.

However, since plural threads of the multi-threaded crawling unit 343, virtualization unit 344, and migration unit 345 may very often access the virtualization management information table 341 for updating the same, and since the total number of entries in the virtualization management information table 341 may become very large for file systems having millions to milliards (thousands of millions) of file system objects, backup execution can be made more efficient when the virtualization management information table 341 is not backup-copied as a whole but in units of the blocks 341a to 341d, wherein when access to a certain one block, which is currently backed up, is blocked, the crawling unit 343, virtualization unit 344, and migration unit 345 may still efficiently read-write-access all other blocks.

According to backup processing according to FIG. 23, virtualization management information table backup is enabled in step S2301 and the backup processing performed by the virtualization management information backup unit 342 goes to the next (or first) virtualization management information table block in step S2302.

In step S2302, it is checked whether that virtualization management information table block contains any directory that is indicated as having the object status "Complete". If no such directory exists (e.g. in case all entries in the block relate to files or file-like objects such as hard links or in case all directories indicated in the block have the object status "Incomplete") and step S2303 returns NO, the backup method immediately continues with step S2308 of creating a backup copy of the current virtualization management information block and storing the copy to the storage device 315 (and/or to a remote backup storage device). Then, the method continues with the next block in step S2302.

On the other hand, if step S2303 returns YES, it is checked whether there does exist a previous backup version of the respective block, and if it exists, the previous backup version is checked for each directory being indicated as "Complete" in the current block as to whether the same directory was previously indicated as "Incomplete" in the previous backup version of that particular block (step S2305). If step S2305 returns NO, i.e. if all directories indicated as being Complete in the current block have been indicated as being Complete already in the previous backup version of that particular block, the method continues with step S2308 of creating a backup copy of the current virtualization management information block and storing the copy to the storage device 315 (and/or to a remote backup storage device). Then, the method continues with the next block in step S2302.

However, if step S2305 returns YES, i.e. when at least one directory that has been indicated as being "Incomplete" in the previous backup version of that particular block but is now indicated as being "Complete" in the current version of the particular block, then the backup processing performed by the virtualization management information backup unit 342 first determines, in step S2306, all other table blocks of the virtualization management information table 341 which do contain at least one entry relating to a child directories of the directory (or directories) determined in step S2305, and performs backup of all the other table blocks as determined in step S2307 before performing backup of the current table block in step S2308.

Accordingly, even in case of interruption of the virtualization and loss of the data in the memory 314 including the data of the virtualization management information table 341 and data in the job queues 346A to 346C, the virtualization (and migration) could be restarted reliably in that the virtualization management information table 341 could be restored from the backup copies and a respective virtualization job could be created for all objects indicated as "needs virtualization" and a respective directory information job could be created for each directory having the object status "Incomplete", without the requirement of restarting the complete virtualization.

However, if blocks containing information of just completed directories were used for backup without also performing preliminary backup of the blocks having information on the child directories, objects being contained in the child directories could be missed. Specifically, when a directory is indicated as being COMPLETE, it means that all child objects have been virtualized, and all child directories do actually already exist (in the file system as well as in the virtualization management table), however, when data loss in the job queues leads to the situation in which the directory information request directed to one or more of these child directories are lost and their table blocks were not yet backed up since they were added to the table blocks, child entries of these child directories might never be virtualized by automatic background virtualization.

On the other hand, by performing backup of table blocks of completed directories not before performing also backup in connection with each further table block that contains at least on child directory entry, such undesirable situations can be reliably avoided even in worst case scenarios of virtualization interruption and data loss in the job queues and the virtualization management information table.

FIG. 24 shows an example of the virtualization management information table 341 upon completion of virtualization of the file system tree of FIG. 4. The table is exemplarily divided into four data blocks 341a to 341d, and contains one entry for each of the file system objects of the file system tree structure of FIG. 4. Each of the file objects indicated in the table 341 of FIG. 24 has the virtualization status "virtualized" indicating that a respective external link object exists for each of the files of the file system as managed by the second file system management unit 410 according to the structure of FIG. 5A, and each file object has the object status "needs migration" indicating that none of the actual file content data has been yet migrated from the storage unit 420 of the second storage apparatus 400 to the storage unit 320 of the first storage apparatus 300.

Each of the directory objects indicated in the table 341 of FIG. 24 has the virtualization status "virtualized" indicating that a respective directory of the same name exists for each of the directories of the file system as managed by the second file system management unit 410 according to the tree structures of both of FIGS. 4 and 5A, and each directory object has the object status "Complete" indicating that all child objects thereof have been virtualized as well.

In a second phase of migration, the crawling unit 343 may then re-walk the whole virtualization management information table 341 in order to create a respective migration job for each file object indicated as "needs migration" to be added to the job queue 346C, so that the migration unit 345 may successively execute one or more migration (e.g. in parallel as a multi-threaded migration unit 345) and migrate actual file content data to the storage unit 320 of the first storage apparatus 300.

Alternatively, it is of course possible to initiate the migration phase even before the completion of the virtualization phase. Then, the crawling unit 343 or also the virtualization unit 344 may create migration jobs already during virtualization, e.g. together with or after one of steps S1007, S1008, S1009, S1010, S1112, S1113, or S1114 discussed above.

As described above in connection with FIG. 6A, user access to the file system(s) handled by the second storage apparatus 400 will be indirectly enabled through the first storage apparatus 300 (step S8) almost immediately after interconnecting the second storage apparatus 400 (step S2) and enabling on-demand virtualization (step S7), wherein on-demand virtualization may be performed according to FIGS. 20 to 22B.

Then, in some embodiments, user access to virtualized objects may be enabled as discussed in the following in connection with FIGS. 25A to 25H. It is to be noted that FIGS. 25A to 25H relate to communication between a client computer (host) and the first file system managing unit (e.g. being at least a part of a first file server), and to communication between the first file system managing unit and the second file system managing unit (e.g. being part of at least a second file server). Plural different communication protocols may be used in these communications, even combinations of protocols (e.g. by using a standard protocol externally between apparatuses, e.g. between different interface ports of apparatuses, and internal standard or non-standard protocols between units of the same apparatus, e.g. between an interface of a file server and the file system management unit of the same file server). In particular, the same or different protocols or different combinations of protocols may be used between the client and the first file system management unit and between the first and second file system management units. Underlying communication protocol may be a Fibre Channel protocol or file based protocols, e.g. a file-based communication protocol such as e.g. FTP-based protocols, NFS-based protocols (e.g. NFSv3 or NFSv4) or SMB/CIFS-based protocols, or the like.

Figure 25A:
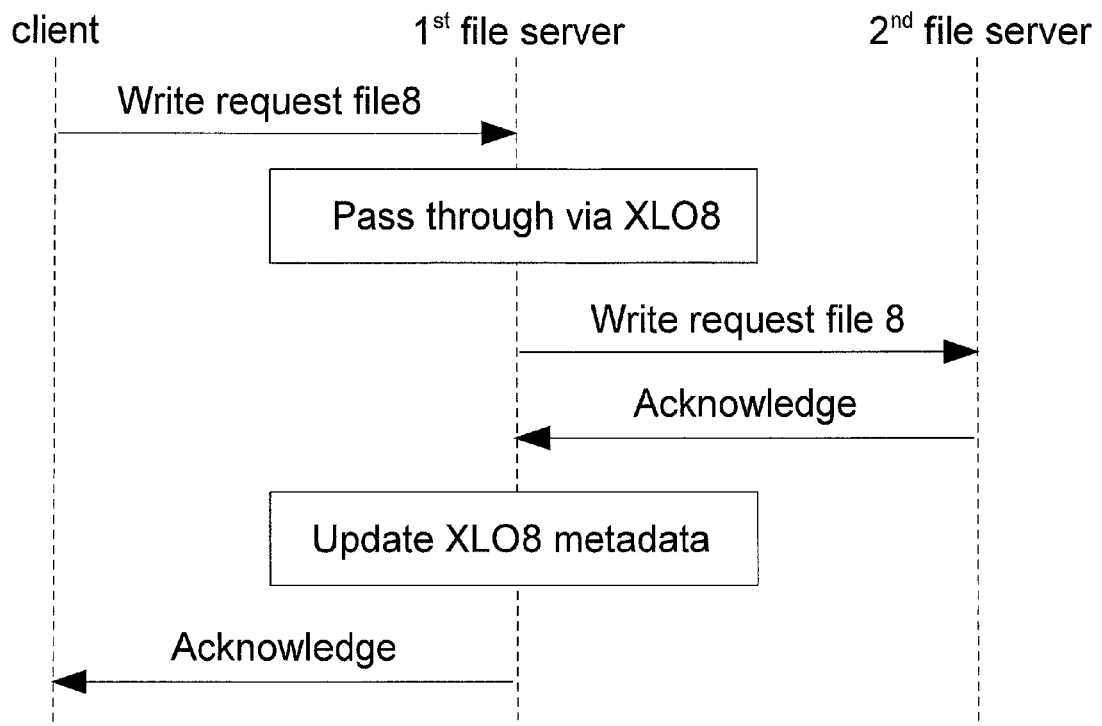
FIG. 25A shows an illustration of information exchange for write access to a virtualized file.

FIG. 25A shows an illustration of information exchange between a client 100, the first and second file system management units 310 and 410 for write access to a virtualized file. If a write access request to a non-virtualized file is received, the file is first virtualized (on-demand virtualization), and then the write access is executed as shown in FIG. 25A in some embodiments.

When a write request is received for a target file (e.g. file8 of FIG. 4) at the first file system management unit 310, the write request is passed through via the corresponding external link object (e.g. XLO8 of FIG. 5A) by issuing a corresponding write request for the target file from the first file system management unit 310 to the second file system management unit 410.

Upon receipt of the write acknowledgement from the second file system management unit 410 at the first file system management unit 310, the metadata of the corresponding external link object is updated (e.g. by updating the length of the file, the time stamp or other file attributes that changed by the write operation), and then the write is acknowledged to the client 100.

Figure 25B:
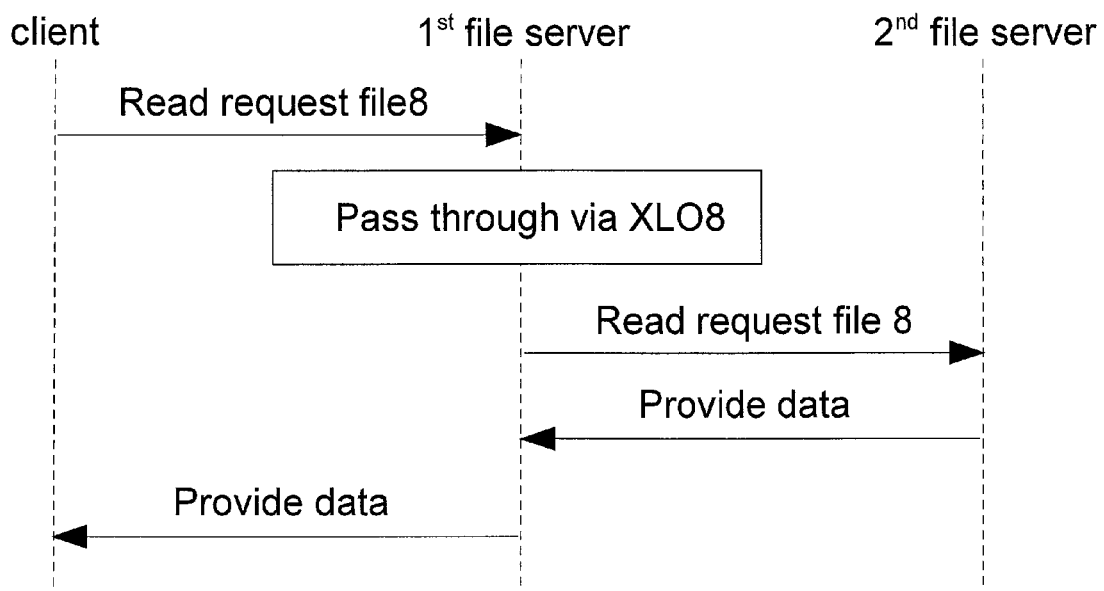
FIG. 25B shows an illustration of information exchange for read access to a virtualized file.

FIG. 25B shows an illustration of information exchange between a client 100, the first and second file system management units 310 and 410 for read access to a virtualized file. If a read access request to a non-virtualized file is received, the file is first virtualized (on-demand virtualization), and then the read access is executed as shown in FIG. 25B in some embodiments.

When a read request is received for a target file (e.g. file8 of FIG. 4) at the first file system management unit 310, the read request is passed through via the corresponding external link object (e.g. XLO8 of FIG. 5A) by issuing a corresponding read request for the target file from the first file system management unit 310 to the second file system management unit 410.

Upon receipt of the read response (including the read data) from the second file system management unit 410 at the first file system management unit 310, the received read data is transferred to the client 100 in response to the read request.

Figure 25C:
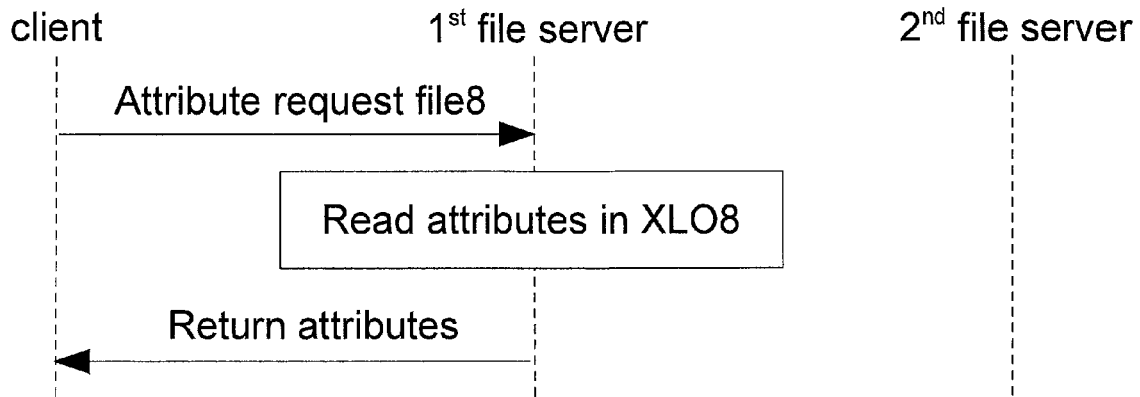
FIG. 25C shows an illustration of information exchange for attribute access to a virtualized file or directory.

FIG. 25C shows an illustration of information exchange between a client 100, the first and second file system management units 310 and 410 for attribute access to a virtualized file or directory. If a read attribute access request to a non-virtualized file is received, the file is first virtualized (on-demand virtualization), and then the attribute access is executed as shown in FIG. 25C in some embodiments.

When a read attribute request is received for a target file (e.g. file8 of FIG. 4) at the first file system management unit 310, the corresponding attributes are read locally from the corresponding external link object (e.g. XLO8 of FIG. 5A), and the requested attributes are efficiently and conveniently returned to the client 100 in response to the client's read attributes request without any delays from communication with the second file system management unit 410.

For directories, read attribute requests are similarly handled locally at the first file system management unit 310 by reading the corresponding attributes from the directory metadata, and the read attributes are efficiently and conveniently returned to the client 100 in response to the client's read attributes request without any delays from communication with the second file system management unit 410.

In case of an inquiry on the link count of the directory, the first file system management unit 310 does not return the actual link count of the corresponding directory on the file system as managed by the first file system management unit 310 but returns the actual link count of the corresponding directory on the file system as managed by the second file system management unit 410 by returning the sum of the real link count and the fake link count as described above.

Figure 25D:
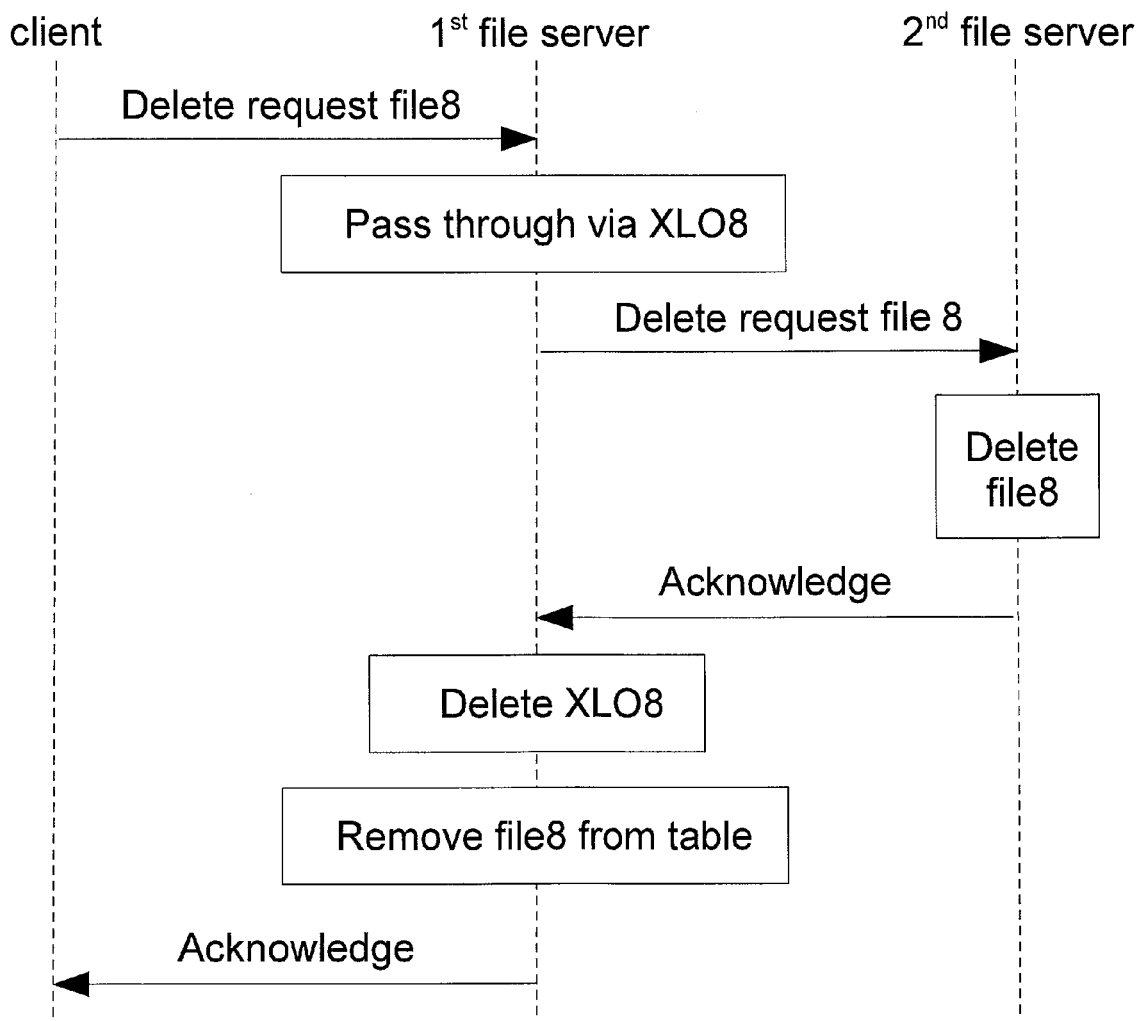
FIG. 25D shows an exemplary illustration of information exchange for deleting a virtualized file.

FIG. 25D shows an illustration of information exchange between a client 100, the first and second file system management units 310 and 410 for deleting a virtualized file. If a delete request to a non-virtualized file is received, the file is first virtualized (on-demand virtualization), and then the delete request is executed as shown in FIG. 25D in some embodiments. In some other embodiments the file may only be deleted on the second file system without being virtualized.

When a delete request is received for a target file (e.g. file8 of FIG. 4) at the first file system management unit 310, the delete request is passed through via the corresponding external link object (e.g. XLO8 of FIG. 5A) by issuing a corresponding delete request for the target file from the first file system management unit 310 to the second file system management unit 410.

Upon deletion of the target file (e.g. file8) by the second file system management unit 410 and receipt of the deletion acknowledgement from the second file system management unit 410 at the first file system management unit 310, the corresponding external link object (e.g. XLO8) is deleted and the corresponding entry in the virtualization management information table 341 is removed in order to avoid creation of a migration job for the deleted file, and then the deletion of the target file is acknowledged to the client 100.

Similar to the file deletion, a virtualized directory can be deleted by passing through the delete request to delete the target directory of the delete request at the file system as managed by the second file system management unit 410, and then deleting the "virtualized" target directory corresponding to the delete request at the file system as managed by the first file system management unit 310 and removing the corresponding entry in the virtualization management information table 341.

Figure 25E:
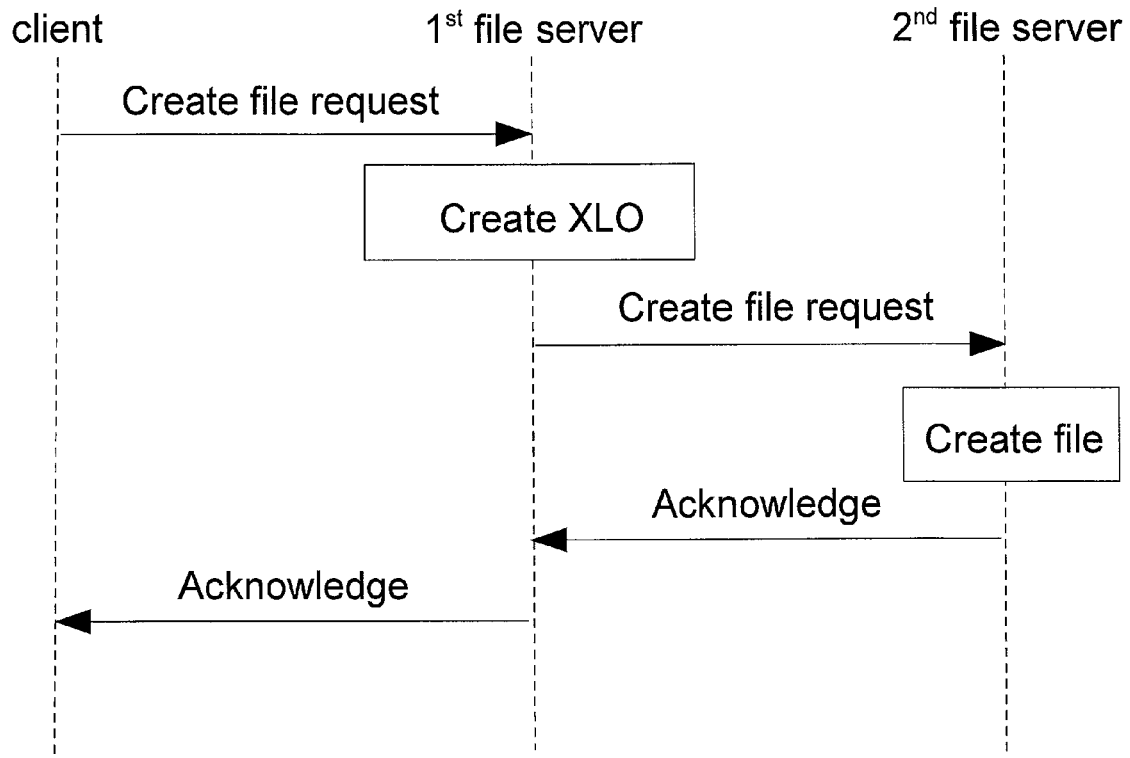
FIG. 25E shows an exemplary illustration of information exchange for file creation.

FIG. 25E shows an illustration of information exchange between a client 100, the first and second file system management units 310 and 410 for file creation. When a file creation request is received at the first file system management unit 310 for creating a new file in a target path location, a corresponding new external link object is created in the local path corresponding to the target path location, and the file creation request is passed through by issuing a corresponding file creation request for the target file in the target path location from the first file system management unit 310 to the second file system management unit 410.

Upon creation of the new file in the remote path corresponding to the target path location and receipt of the file creation acknowledgement from the second file system management unit 410 at the first file system management unit 310 (and potentially after updating the metadata of the corresponding external link object), the file creation of the target file is acknowledged to the client 100.

Figure 25F:
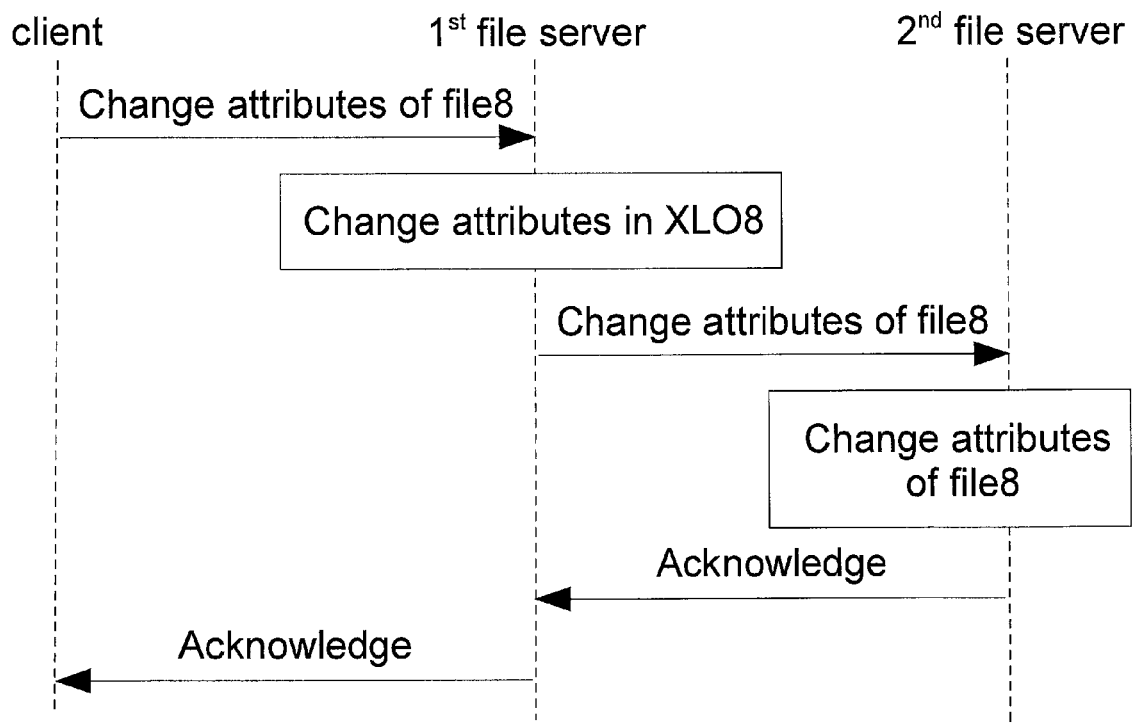
FIG. 25F shows an exemplary illustration of information exchange for changing attributes.

FIG. 25F shows an illustration of information exchange between a client 100, the first and second file system management units 310 and 410 for changing attributes. If a change attributes request to a non-virtualized file is received, the file is first virtualized (on-demand virtualization), and then the change attributes access is executed as shown in FIG. 25F in some embodiments.

When a change attribute request is received for a target file (e.g. file8 of FIG. 4) at the first file system management unit 310, the change attribute request is first executed in that the attributes in the corresponding external link object (e.g. XLO8 of FIG. 5A) are changed according to the change attribute request, and the change attribute request is then passed through via the corresponding external link object (e.g. XLO8) by issuing the corresponding change attribute request for the target file from the first file system management unit 310 to the second file system management unit 410.

Upon change of the attributes of the target file by the second file system management unit 410 and receipt of the attribute change acknowledgement from the second file system management unit 410 at the first file system management unit 310, the attribute change is acknowledged to the client 100.

Similarly, when receiving a change attribute request for a target directory at the first file system management unit 310, the directory metadata of the virtualized directory is updated for changing the attributes according to the request, and then the change attribute request is transferred to the second file system management unit 410.

Figure 25G:
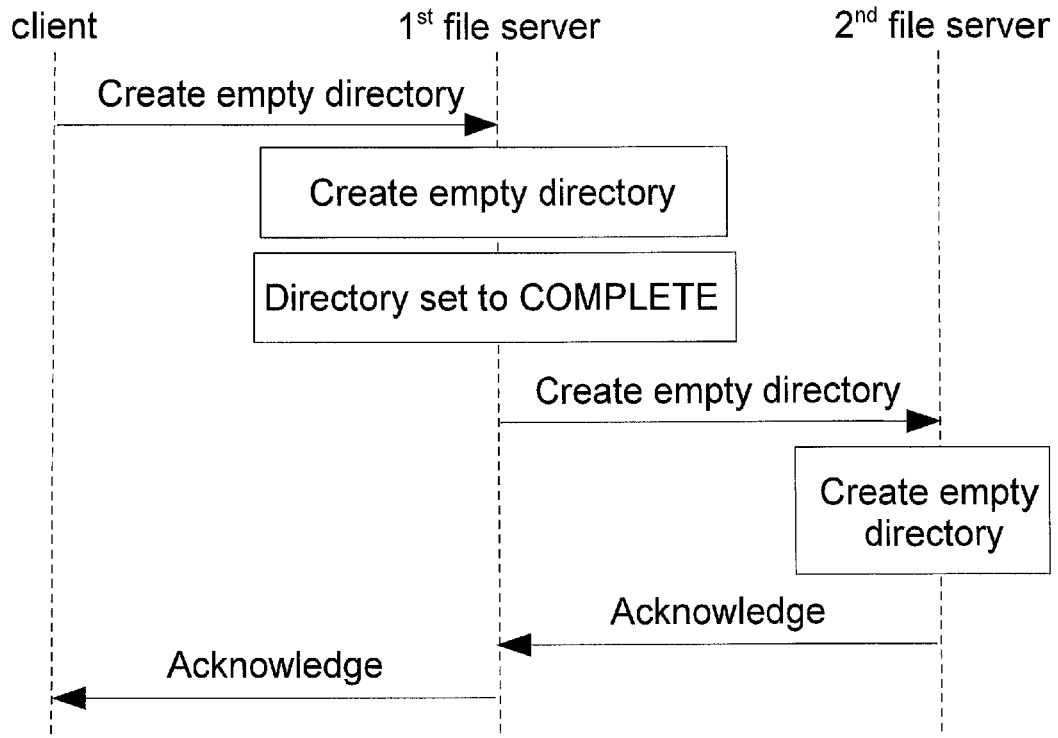
FIG. 25G shows an exemplary illustration of information exchange for directory creation.

FIG. 25G shows an illustration of information exchange between a client 100, the first and second file system management units 310 and 410 for directory creation. When a directory creation request is received at the first file system management unit 310 for creating a new empty directory in a target path location, a corresponding new empty directory and its directory metadata is created in the local path corresponding to the target path location and the new directory is indicated as being COMPLETE, and the directory creation request is passed through by issuing a corresponding directory creation request for the target directory in the target path location from the first file system management unit 310 to the second file system management unit 410.

Upon creation of the new empty directory in the remote path of the file system managed by the second file system management unit 410 corresponding to the target path location and receipt of the directory creation acknowledgement from the second file system management unit 410 at the first file system management unit 310 (and potentially after updating the metadata of the corresponding directory metadata), the directory creation of the target directory is acknowledged to the client 100.

Figure 25H:
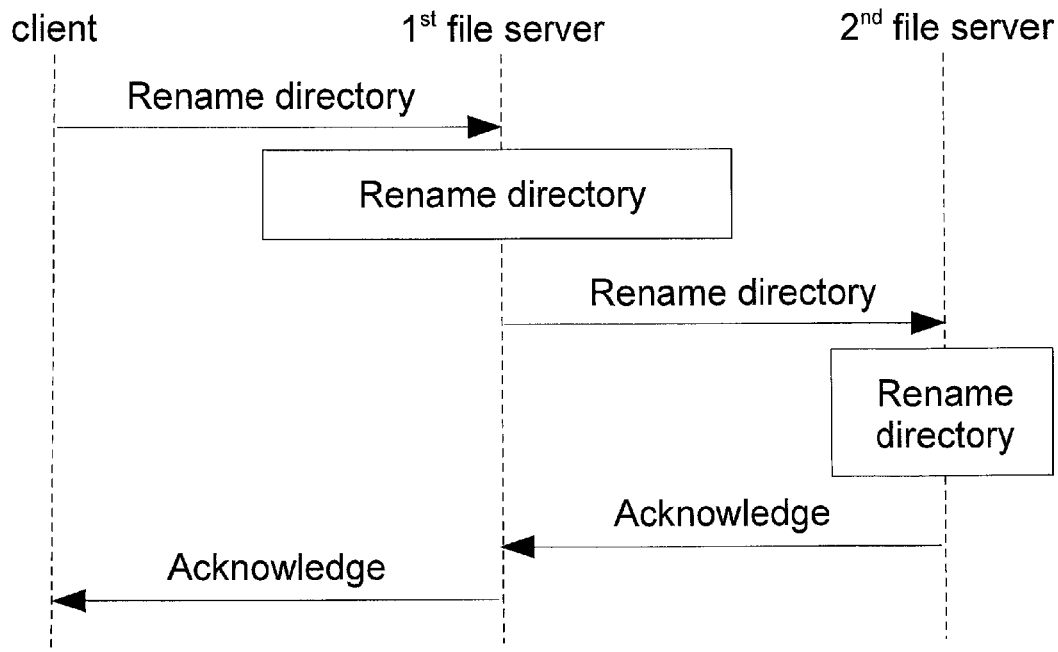
FIG. 25H shows an exemplary illustration of information exchange for directory renaming.

FIG. 25H shows an illustration of information exchange between a client 100, the first and second file system management units 310 and 410 for directory renaming. If a rename request to a non-virtualized directory is received, the directory is first virtualized (on-demand virtualization), and then the rename access is executed as shown in FIG. 25H in some embodiments.

When a directory rename request (changing name and/or path location of the directory) is received at the first file system management unit 310 for renaming an existing directory, the corresponding directory is renamed in accordance with the directory rename request in the file system as managed by the first file system management unit 310, and the directory rename request is passed through by issuing a corresponding directory rename request for the target directory from the first file system management unit 310 to the second file system management unit 410.

Upon renaming the target directory in accordance with the directory rename request in the file system as managed by the second file system management unit 410 and upon receipt of the rename acknowledgement at the first file system management unit 310 from the second file system management unit 410, the directory renaming of the target directory is acknowledged to the client 100. Renaming of files may be executed similarly.

Also, in other embodiments, user access to virtualized objects may be enabled as discussed in the following in connection with FIGS. 26A to 26H. Here, it is to be noted that operations at the side of the second file system management unit 410 are performed first.

Figure 26A:
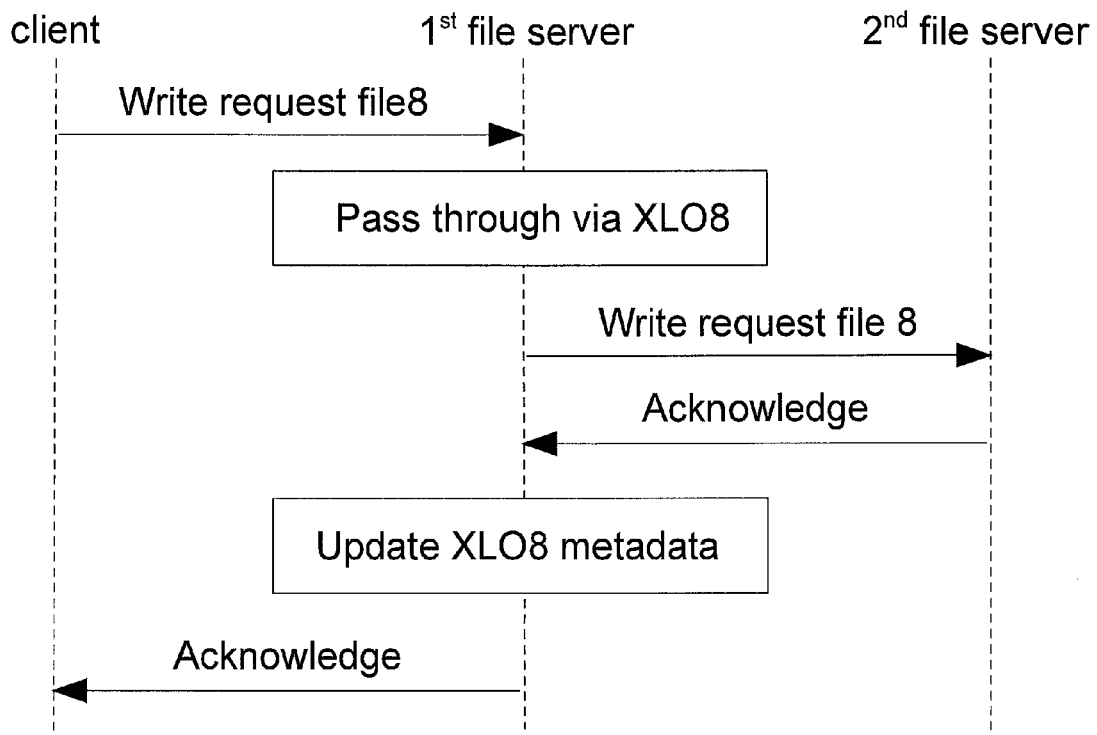
FIG. 26A shows another exemplary illustration of information exchange for write access to a virtualized file.

FIG. 26A shows an illustration of information exchange between a client 100, the first and second file system management units 310 and 410 for write access to a virtualized file. If a write access request to a non-virtualized file is received, the file is first virtualized (on-demand virtualization), and then the write access is executed as shown in FIG. 26A in some embodiments.

When a write request is received for a target file (e.g. file8 of FIG. 4) at the first file system management unit 310, the write request is passed through via the corresponding external link object (e.g. XLO8 of FIG. 5A) by issuing a corresponding write request for the target file from the first file system management unit 310 to the second file system management unit 410.

Upon receipt of the write acknowledgement from the second file system management unit 410 at the first file system management unit 310, the metadata of the corresponding external link object is updated (e.g. by updating the length of the file, the time stamp or other file attributes that changed by the write operation), and then the write is acknowledged to the client 100.

Figure 26B:
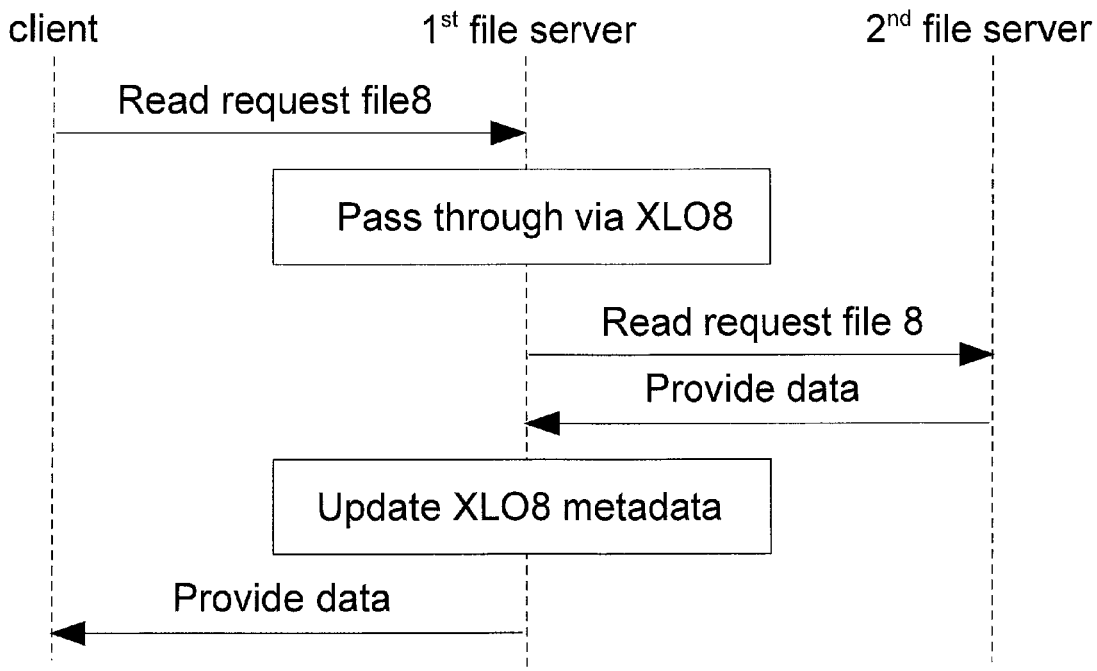
FIG. 26B shows another exemplary illustration of information exchange for read access to a virtualized file.

FIG. 26B shows an illustration of information exchange between a client 100, the first and second file system management units 310 and 410 for read access to a virtualized file. If a read access request to a non-virtualized file is received, the file is first virtualized (on-demand virtualization), and then the read access is executed as shown in FIG. 26B in some embodiments.

When a read request is received for a target file (e.g. file8 of FIG. 4) at the first file system management unit 310, the read request is passed through via the corresponding external link object (e.g. XLO8 of FIG. 5A) by issuing a corresponding read request for the target file from the first file system management unit 310 to the second file system management unit 410.

Upon receipt of the read response (including the read data) from the second file system management unit 410 at the first file system management unit 310, the first file system management unit 310 updates the metadata of the corresponding eXternal Link Object XLO, here exemplarily XLO8 (e.g. by updating the last access time), and the received read data is transferred to the client 100 in response to the read request.

Figure 26C:
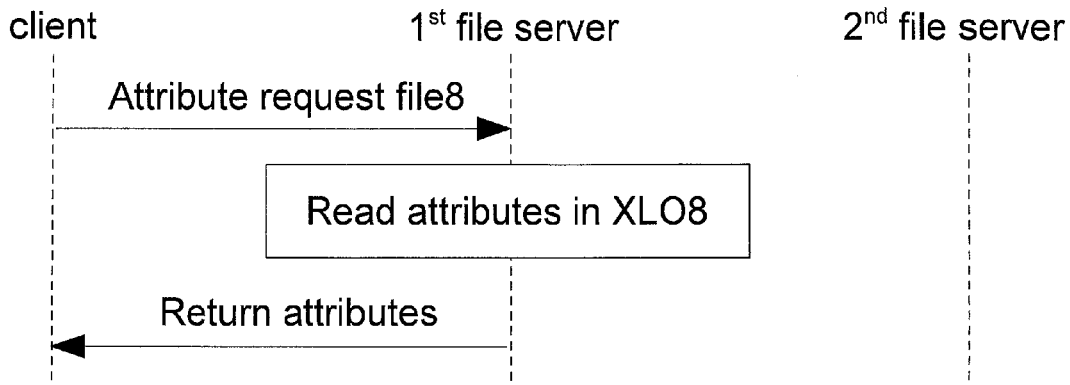
FIG. 26C shows another exemplary illustration of information exchange for attribute access to a virtualized file or directory.

FIG. 26C shows an illustration of information exchange between a client 100, the first and second file system management units 310 and 410 for attribute access to a virtualized file or directory. If a read attribute access request to a non-virtualized file is received, the file is first virtualized (on-demand virtualization), and then the attribute access is executed as shown in FIG. 26C in some embodiments.

When a read attribute request is received for a target file (e.g. file8 of FIG. 4) at the first file system management unit 310, the corresponding attributes are read locally from the corresponding external link object (e.g. XLO8 of FIG. 5A), and the requested attributes are efficiently and conveniently returned to the client 100 in response to the client's read attributes request without any delays from communication with the second file system management unit 410.

For directories, read attribute requests are similarly handled locally at the first file system management unit 310 by reading the corresponding attributes from the directory metadata, and the read attributes are efficiently and conveniently returned to the client 100 in response to the client's read attributes request without any delays from communication with the second file system management unit 410.

In case of an inquiry on the link count of the directory, the first file system management unit 310 does not return the actual link count of the corresponding directory on the file system as managed by the first file system management unit 310 but returns the actual link count of the corresponding directory on the file system as managed by the second file system management unit 410 by returning the sum of the real link count and the fake link count as described above.

Figure 26D:
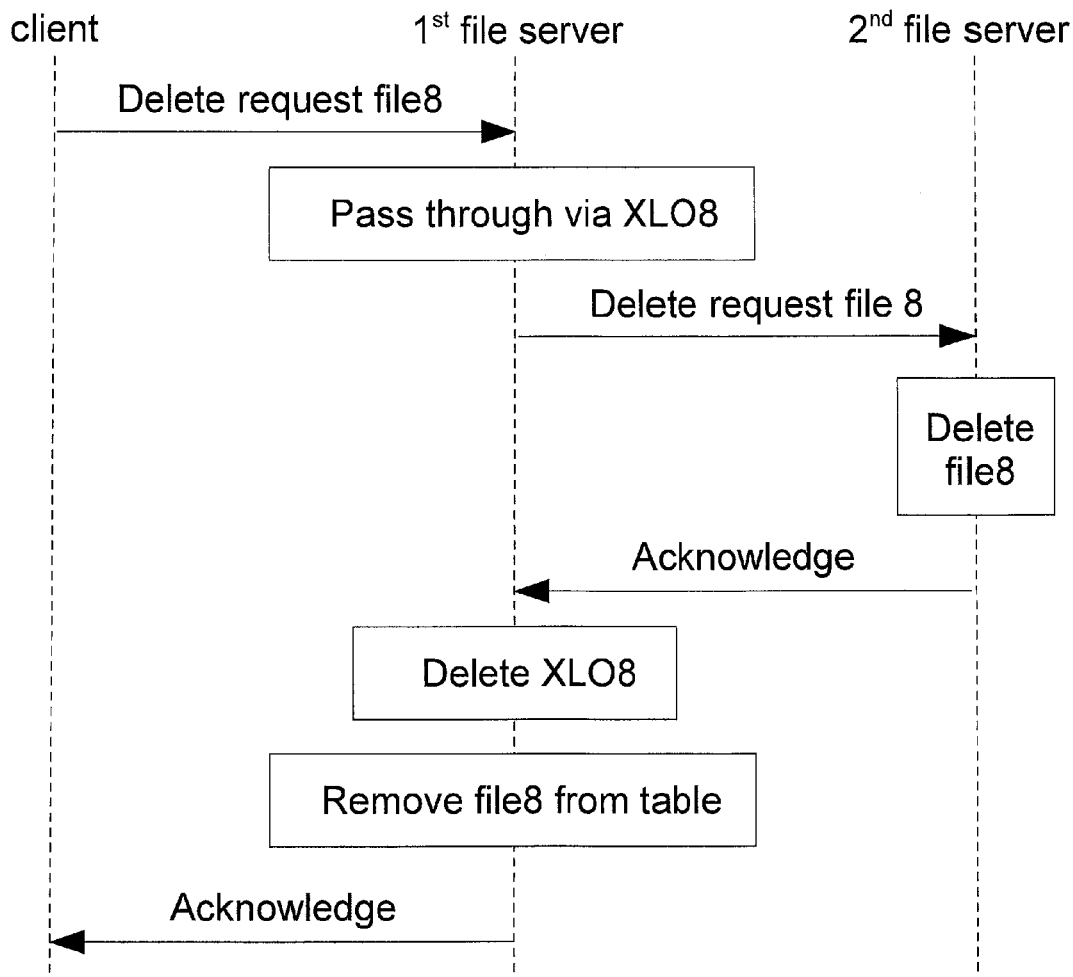
FIG. 26D shows another exemplary illustration of information exchange for deleting a virtualized file.

FIG. 26D shows an illustration of information exchange between a client 100, the first and second file system management units 310 and 410 for deleting a virtualized file. If a delete request to a non-virtualized file is received, the file is first virtualized (on-demand virtualization), and then the delete request is executed as shown in FIG. 26D in some embodiments. In some other embodiments the file may only be deleted on the second file system without being virtualized.

When a delete request is received for a target file (e.g. file8 of FIG. 4) at the first file system management unit 310, the delete request is passed through via the corresponding external link object (e.g. XLO8 of FIG. 5A) by issuing a corresponding delete request for the target file from the first file system management unit 310 to the second file system management unit 410.

Upon deletion of the target file (e.g. file8) by the second file system management unit 410 and receipt of the deletion acknowledgement from the second file system management unit 410 at the first file system management unit 310, the corresponding external link object (e.g. XLO8) is deleted and the corresponding entry in the virtualization management information table 341 is removed in order to avoid creation of a migration job for the deleted file, and then the deletion of the target file is acknowledged to the client 100.

Similar to the file deletion, a virtualized directory can be deleted by passing through the delete request to delete the target directory of the delete request at the file system as managed by the second file system management unit 410, and then deleting the "virtualized" target directory corresponding to the delete request at the file system as managed by the first file system management unit 310 and removing the corresponding entry in the virtualization management information table 341.

Figure 26E:
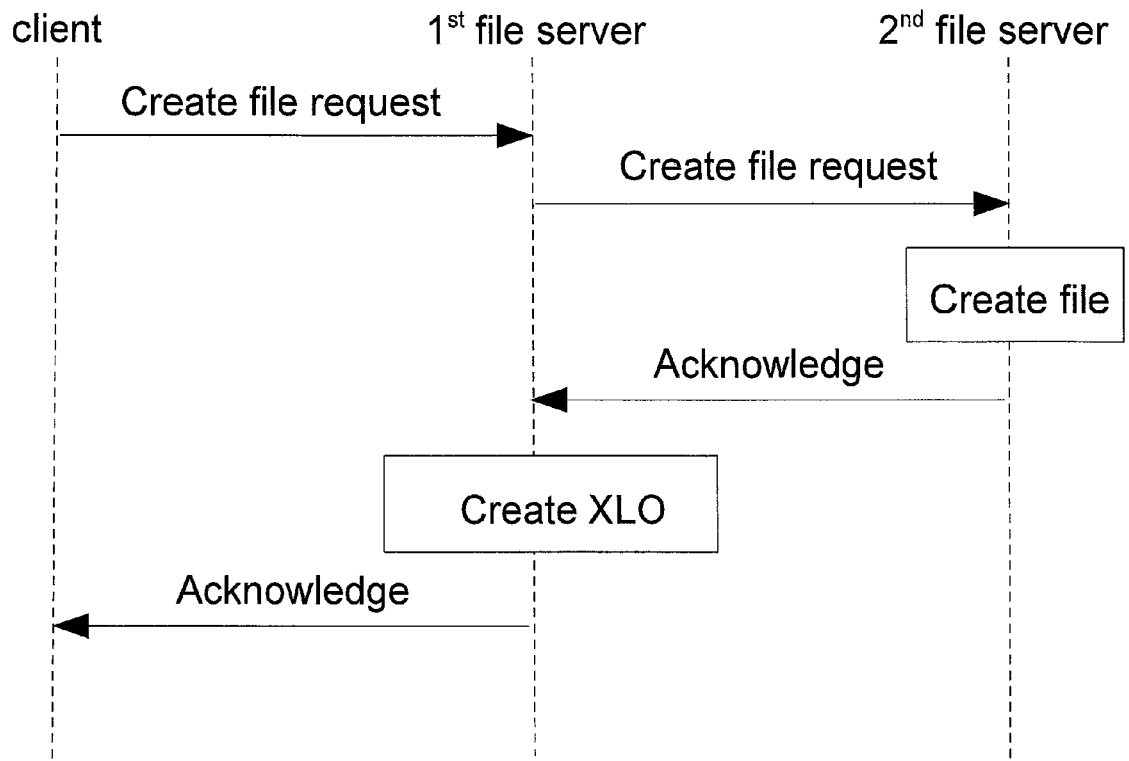
FIG. 26E shows another exemplary illustration of information exchange for file creation.

FIG. 26E shows an illustration of information exchange between a client 100, the first and second file system management units 310 and 410 for file creation. When a file creation request is received at the first file system management unit 310 for creating a new file in a target path location, the file creation request is passed through by issuing a corresponding file creation request for the target file in the target path location from the first file system management unit 310 to the second file system management unit 410.

Upon creation of the new file in the remote path corresponding to the target path location and receipt of the file creation acknowledgement from the second file system management unit 410 at the first file system management unit 310, the first file system management unit 310 creates a corresponding new external link object in the local path corresponding to the target path location, and, then the file creation of the target file is acknowledged to the client 100.

Figure 26F:
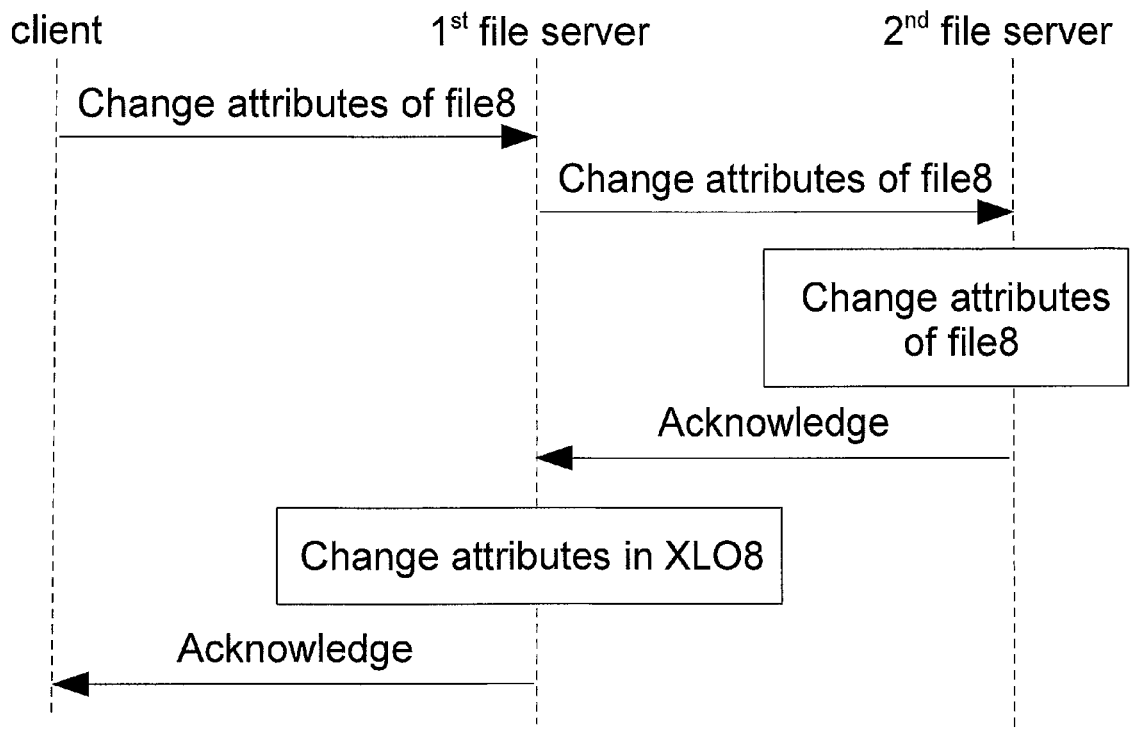
FIG. 26F shows another exemplary illustration of information exchange for changing attributes.

FIG. 26F shows an illustration of information exchange between a client 100, the first and second file system management units 310 and 410 for changing attributes. If a change attributes request to a non-virtualized file is received, the file is first virtualized (on-demand virtualization), and then the change attributes access is executed as shown in FIG. 26F in some embodiments.

When a change attribute request is received for a target file (e.g. file8 of FIG. 4) at the first file system management unit 310, the change attribute request is passed through via the corresponding external link object (e.g. XLO8) by issuing the corresponding change attribute request for the target file from the first file system management unit 310 to the second file system management unit 410.

Upon change of the attributes of the target file by the second file system management unit 410 and receipt of the attribute change acknowledgement from the second file system management unit 410 at the first file system management unit 310, the change attribute request is then executed at the file system managed by the first file system management unit 310 in that the attributes in the corresponding external link object (e.g. XLO8 of FIG. 5A) are changed according to the change attribute request, and then the attribute change is acknowledged to the client 100.

Similarly, when receiving a change attribute request for a target directory at the first file system management unit 310, the change attribute request is transferred to the second file system management unit 410, and upon receiving the acknowledgment from the second file system management unit 410 at the first file system management unit 310, the directory metadata of the virtualized directory is updated for changing the attributes according to the request.

Figure 26G:
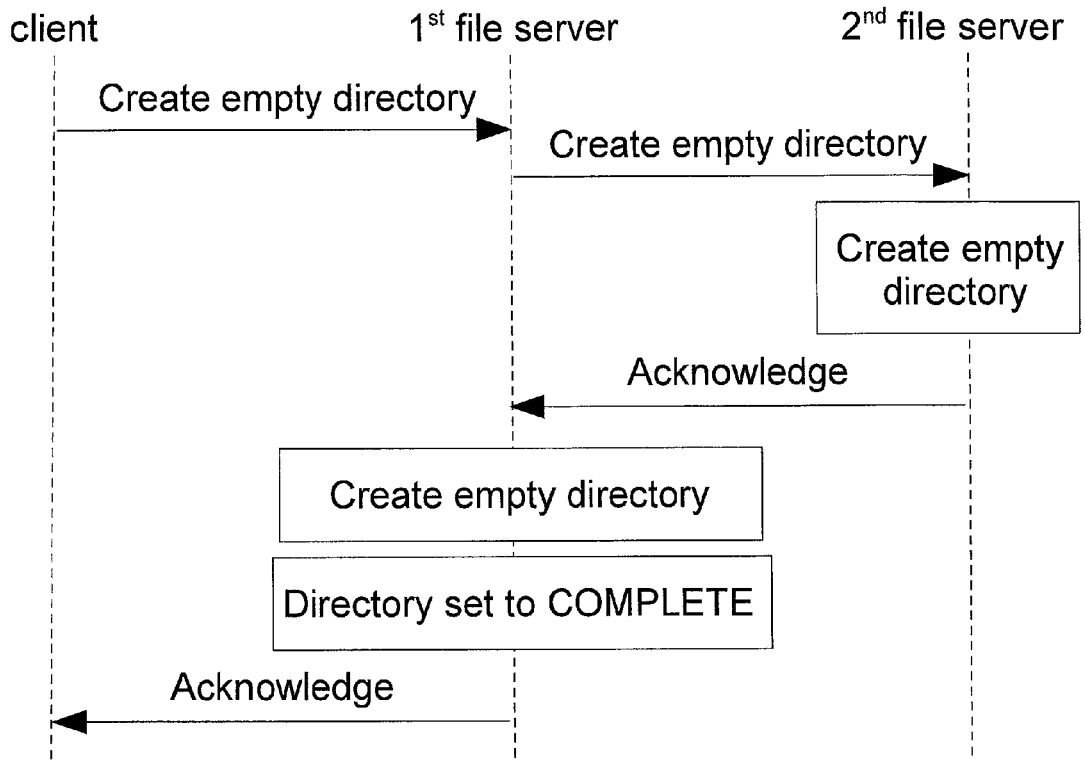
FIG. 26G shows another exemplary illustration of information exchange for directory creation.

FIG. 26G shows an illustration of information exchange between a client 100, the first and second file system management units 310 and 410 for directory creation. When a directory creation request is received at the first file system management unit 310 for creating a new empty directory in a target path location, the directory creation request is passed through by issuing a corresponding directory creation request for the target directory in the target path location from the first file system management unit 310 to the second file system management unit 410.

Upon creation of the new empty directory in the remote path of the file system managed by the second file system management unit 410 corresponding to the target path location and receipt of the directory creation acknowledgement from the second file system management unit 410 at the first file system management unit 310, a corresponding new empty directory and its directory metadata is created in the local path corresponding to the target path location and the new directory is indicated as being COMPLETE by the first file system management unit 310, and then the directory creation of the target directory is acknowledged to the client 100.

Figure 26H:
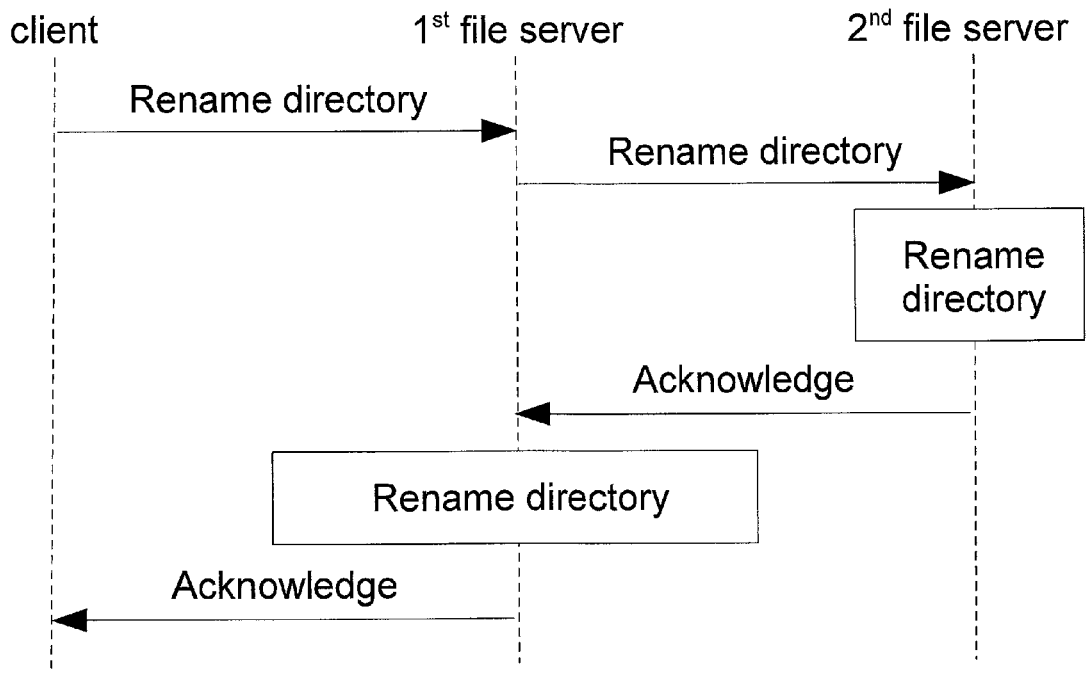
FIG. 26H shows another exemplary illustration of information exchange for directory renaming.

FIG. 26H shows an illustration of information exchange between a client 100, the first and second file system management units 310 and 410 for directory renaming. If a rename request to a non-virtualized directory is received, the directory is first virtualized (on-demand virtualization), and then the rename access is executed as shown in FIG. 26H in some embodiments.

When a directory rename request (changing name and/or path location of the directory) is received at the first file system management unit 310 for renaming an existing directory, the directory rename request is passed through by issuing a corresponding directory rename request for the target directory from the first file system management unit 310 to the second file system management unit 410.

Upon renaming the target directory in accordance with the directory rename request in the file system as managed by the second file system management unit 410 and upon receipt of the rename acknowledgement at the first file system management unit 310 from the second file system management unit 410, the corresponding directory is renamed in accordance with the directory rename request in the file system as managed by the first file system management unit 310, and then the directory renaming of the target directory is acknowledged to the client 100.

Renaming of files may be executed similarly.

In the above, the specification and some embodiments relate to providing and building a virtualized file system on a first storage apparatus (e.g. first file server) virtualizing one or more file systems of one or more second storage apparatuses (e.g. second file server(s)), and after or during the virtualization, also an additional migration of actual file content data from the second to the first apparatus may be performed. However, in some embodiments, migration of actual file content data does not have to be performed.

Such embodiments may have plural benefits. For example, after the virtualized file system tree structure has been build completely in the first storage apparatus 300, the canonical version of the file system may still be kept on the second storage apparatus 400, wherein the first storage apparatus 300 allows indirect access via the respective virtualized file system objects. Then, the operation and robustness of the management by the first apparatus may be tested (avoiding migration at first for test purposes) for a certain period of time, and if the reliable and robust operation of the first storage apparatus is confirmed by testing, the migration may be initiated, and otherwise, the first storage apparatus could be removed at any time during virtualization since the canonical file system is still kept on the second storage apparatus, even in case of failure of the first storage apparatus. It may also be possible, as an additional benefit, to manage an old file system of the second storage apparatus indirectly through a virtualized file system at the first storage apparatus, while establishing another one or more new file systems only on the first storage apparatus (advantageously providing better storage efficiency). Also, such scenarios may be used to provide a single first storage apparatus as a single access points to plural file systems on plural connected second storage apparatuses in order to make the access more convenient without actually migrating the data of the plural second storage apparatuses, e.g. merging plural file systems to one virtualized file system. Overall, management of file systems may be simplified and management efficiency may be improved.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. An apparatus being connectable to a computer and another apparatus managing a second file system, the apparatus comprising:
   a memory device configured to store a computer program, the computer program being configured to manage a first file system and to create a first structure information of the first file system based on a second structure information of the second file system received from the other apparatus, the second structure information linking among a plurality of file system objects existing in the second file system, the first structure information linking among a plurality of file system objects virtualizing the plurality of file system objects existing in the second file system, wherein, after starting the creating of the first structure information of the first file system and before completing the creating of the first structure information of the first file system, the apparatus is further configured, when receiving a request to modify a file system object at the first file system from the computer, to communicate with the other apparatus to update a file system object of the second structure information corresponding to the requested file system object and to update at least metadata of a file system object of the first structure information corresponding to the requested file system object, the file system object of the second structure information corresponding to the file system object of the first structure information.

2. The apparatus according to claim 1, wherein, during creating the first structure information of the first file system, the apparatus is configured to create virtualized file system objects in the first file system, each virtualized file system object of the first file system being associated with a respective file system object existing in the second file system, and to manage virtualization management information being indicative of virtualized file system objects existing in the first file system.

3. The apparatus according to claim 1, wherein, when receiving the request to modify the requested file system object at the first file system, the apparatus is configured to determine whether a respective virtualized file system object of the first structure information corresponding to the requested file system object exists in the first file system, and to create the respective virtualized file system object in the first file system if the respective virtualized file system object of the first structure information corresponding to the requested file system object is determined to not exist in the first file system.

4. The apparatus according to claim 1, wherein, when the received request is a request to modify a directory, the apparatus is configured, when a respective virtualized file system object of the first structure information corresponding to the requested directory is determined to not exist in the first file system, to create a respective directory in the first file system as the respective virtualized file system object of the first structure information corresponding to the requested directory, and to store metadata of a respective directory of the second structure information corresponding to the requested directory as metadata of the created directory in the first file system.

5. The apparatus according to claim 1, wherein, when the received request is a request to modify a directory, the apparatus is configured to send a corresponding request to modify a directory to the other apparatus to modify a respective directory of the second structure information corresponding to the requested directory, and to modify a respective directory in the first file system being a respective virtualized file system object of the first structure information corresponding to the requested directory.

6. The apparatus according to claim 1, wherein, when the received request is a request to rename a directory, the apparatus is configured to send a corresponding request to rename a directory to the other apparatus to rename a respective directory of the second structure information corresponding to the requested directory, and to rename a respective directory in the first file system being a respective virtualized file system object of the first structure information corresponding to the requested directory.

7. The apparatus according to claim 1, wherein, when the received request is a request to modify a file, the apparatus is configured, when a respective virtualized file system object of the first structure information corresponding to the requested file is determined to not exist in the first file system, to create a respective external link object in the first file system as the respective virtualized file system object of the first structure information corresponding to the requested file, and to store metadata of a respective file of the second structure information corresponding to the requested file as metadata of the created external link object in the first file system.

8. The apparatus according to claim 1, wherein, when the received request is a request to modify a file, the apparatus is configured to send a corresponding request to modify a file to the other apparatus to modify a respective file of the second structure information corresponding to the requested file, and to at least update metadata of a respective external link object in the first file system being a respective virtualized file system object of the first structure information corresponding to the requested file.

9. The apparatus according to claim 1, wherein, when the received request is a request to write to a file, the apparatus is configured to send a corresponding request to write to a file to the other apparatus to write a respective file of the second structure information corresponding to the requested file, and to at least update metadata of a respective external link object in the first file system being a respective virtualized file system object of the first structure information corresponding to the requested file.

10. The apparatus according to claim 1, wherein, when the received request is a request to delete a file, the apparatus is configured to send a corresponding request to delete a file to the other apparatus to delete a respective file of the second structure information corresponding to the requested file, and to delete a respective external link object in the first file system being a respective virtualized file system object of the first structure information corresponding to the requested file.

11. The apparatus according to claim 1, wherein, when the received request is a request to change attributes of a file, the apparatus is configured to send a corresponding request to change attributes of a file to the other apparatus to change attributes of a respective file of the second structure information corresponding to the requested file, and to change attributes of a respective external link object in the first file system being a respective virtualized file system object of the first structure information corresponding to the requested file.

12. The apparatus according to claim 1, wherein, during creating the first structure information of the first file system, the apparatus is configured, when receiving a request to create a file, to send a corresponding request to create the file to the other apparatus to create the file in the second structure information of the second file system, and to create a respective external link object in the first file system as the respective virtualized file system object of the first structure information corresponding to the created file in the second structure information of the second file system.

13. The apparatus according to claim 1, wherein, during creating the first structure information of the first file system, the apparatus is configured, when receiving a request to create a directory, to send a corresponding request to create the directory to the other apparatus to create the directory in the second structure information of the second file system, and to create a respective directory in the first file system as the respective virtualized file system object of the first structure information corresponding to the created directory in the second structure information of the second file system, and to store metadata of the respective directory of the second structure information corresponding to the requested directory as metadata of the created directory in the first file system.

14. A non-transitory computer readable storage medium including computer program code adapted to cause an apparatus, which is connectable to a computer and another apparatus managing a second file system, the apparatus managing a first file system, to execute:
creating a first structure information of the first file system based on a second structure information of the second file system received from the other apparatus, the second structure information linking among a plurality of file system objects existing in the second file system, the first structure information linking among a plurality of file system objects virtualizing the plurality of file system objects existing in the second file system; and
communicating, when receiving a request to modify a file system object at the first file system after starting the creating of the first structure information of the first file system and before completing the creating of the first structure information of the first file system, with the other apparatus to update a file system object of the second structure information corresponding to the requested file system object, and updating at least metadata of a file system object of the first structure information corresponding to the requested file system object, the file system object of the second structure information corresponding to the file system object of the first structure information.

15. The non-transitory computer readable storage medium according to claim 14, wherein, during creating the first structure information of the first file system, the apparatus is caused to create virtualized file system objects in the first file system, each virtualized file system object of the first file system being associated with a respective file system object existing in the second file system, and to manage virtualization management information being indicative of virtualized file system objects existing in the first file system.

16. The non-transitory computer readable storage medium according to claim 14, wherein, when receiving the request to modify the requested file system object at the first file system, the apparatus is caused to determine whether a respective virtualized file system object of the first structure information corresponding to the requested file system object exists in the first file system, and to create the respective virtualized file system object in the first file system if the respective virtualized file system object of the first structure information corresponding to the requested file system object is determined to not exist in the first file system.

17. The non-transitory computer readable storage medium according to claim 14, wherein, when the received request is a request to modify a directory, the apparatus is caused, when a respective virtualized file system object of the first structure information corresponding to the requested directory is determined to not exist in the first file system, to create a respective directory in the first file system as the respective virtualized file system object of the first structure information corresponding to the requested directory, and to store metadata of a respective directory of the second structure information corresponding to the requested directory as metadata of the created directory in the first file system.

18. The non-transitory computer readable storage medium according to claim 14, wherein, when the received request is a request to modify a directory, the apparatus is caused to send a corresponding request to modify a directory to the other apparatus to modify a respective directory of the second structure information corresponding to the requested directory, and to modify a respective directory in the first file system being a respective virtualized file system object of the first structure information corresponding to the requested directory.

19. The non-transitory computer readable storage medium according to claim 14, wherein, when the received request is a request to rename a directory, the apparatus is caused to send a corresponding request to rename a directory to the other apparatus to rename a respective directory of the second structure information corresponding to the requested directory, and to rename a respective directory in the first file system being a respective virtualized file system object of the first structure information corresponding to the requested directory.

20. The non-transitory computer readable storage medium according to claim 14, wherein, when the received request is a request to modify a file, the apparatus is caused, when a respective virtualized file system object of the first structure information corresponding to the requested file is determined to not exist in the first file system, to create a respective external link object in the first file system as the respective virtualized file system object of the first structure information corresponding to the requested file, and to store metadata of a respective file of the second structure information corresponding to the requested file as metadata of the created external link object in the first file system.

21. The non-transitory computer readable storage medium according to claim 14, wherein, when the received request is a request to modify a file, the apparatus is caused to send a corresponding request to modify a file to the other apparatus to modify a respective file of the second structure information corresponding to the requested file, and to at least update metadata of a respective external link object in the first file system being a respective virtualized file system object of the first structure information corresponding to the requested file.

22. The non-transitory computer readable storage medium according to claim 14, wherein, when the received request is a request to write to a file, the apparatus is caused to send a corresponding request to write to a file to the other apparatus to write a respective file of the second structure information corresponding to the requested file, and to at least update metadata of a respective external link object in the first file system being a respective virtualized file system object of the first structure information corresponding to the requested file.

23. The non-transitory computer readable storage medium according to claim 14, wherein, when the received request is a request to delete a file, the apparatus is caused to send a corresponding request to delete a file to the other apparatus to delete a respective file of the second structure information corresponding to the requested file, and to delete a respective external link object in the first file system being a respective virtualized file system object of the first structure information corresponding to the requested file.

24. The non-transitory computer readable storage medium according to claim 14, wherein, when the received request is a request to change attributes of a file, the apparatus is caused to send a corresponding request to change attributes of a file to the other apparatus to change attributes of a respective file of the second structure information corresponding to the requested file, and to change attributes of a respective external link object in the first file system being a respective virtualized file system object of the first structure information corresponding to the requested file.

25. The non-transitory computer readable storage medium according to claim 14, wherein, during creating the first structure information of the first file system, the apparatus is caused, when receiving a request to create a file, to send a corresponding request to create the file to the other apparatus to create the file in the second structure information of the second file system, and to create a respective external link object in the first file system as the respective virtualized file system object of the first structure information corresponding to the created file in the second structure information of the second file system.

26. The non-transitory computer readable storage medium according to claim 14, wherein, during creating the first structure information of the first file system, the apparatus is caused, when receiving a request to create a directory, to send a corresponding request to create the directory to the other apparatus to create the directory in the second structure information of the second file system, and to create a respective directory in the first file system as the respective virtualized file system object of the first structure information corresponding to the created directory in the second structure information of the second file system, and to store metadata of the respective directory of the second structure information corresponding to the requested directory as metadata of the created directory in the first file system.

* * * * *